United States Patent [19]

Lomicka, Jr. et al.

[11] 4,326,813

[45] Apr. 27, 1982

[54] DOT MATRIX CHARACTER PRINTER CONTROL CIRCUITRY FOR VARIABLE PITCH PRINTING

[75] Inventors: Roy F. Lomicka, Jr., Chelmsford; Peter N. Heller, Newton, both of Mass.

[73] Assignee: Digital Equipment Corporation, Maynard, Mass.

[21] Appl. No.: 87,681

[22] Filed: Oct. 23, 1979

Related U.S. Application Data

[63] Continuation-in-part of Ser. No. 955,525, Oct. 30, 1978, abandoned.

[51] Int. Cl.³ ............................................. B41J 3/12
[52] U.S. Cl. .................................. 400/124; 400/306; 400/322; 400/323
[58] Field of Search ............... 400/124, 119, 120, 121, 400/320, 322, 323, 328, 305, 306; 328/151; 101/93.04, 93.05

[56] References Cited

U.S. PATENT DOCUMENTS

| | | | |
|---|---|---|---|
| 3,858,703 | 1/1975 | Duley | 400/124 |
| 3,891,077 | 6/1975 | Sauerbrunn | 400/124 |
| 3,950,685 | 4/1976 | Kramer | 400/124 X |
| 3,970,183 | 7/1976 | Robinson et al. | 400/124 |
| 3,990,559 | 11/1976 | Martin et al. | 400/124 |
| 3,999,168 | 12/1976 | Findley et al. | 400/306 X |
| 4,005,772 | 2/1977 | Kieffer et al. | 400/306 X |
| 4,026,402 | 5/1977 | Byrd | 400/124 X |
| 4,050,563 | 9/1977 | Menhennett | 400/124 |
| 4,079,824 | 3/1978 | Ku | 400/124 |
| 4,114,750 | 9/1978 | Baeck et al. | 400/124 X |
| 4,116,567 | 9/1978 | San Pietro | 400/124 |
| 4,125,336 | 11/1978 | Chu | 400/124 |
| 4,169,683 | 10/1979 | Bernardis et al. | 400/124 |
| 4,169,684 | 10/1979 | Blom | 400/124 |
| 4,210,404 | 7/1980 | Hanger | 400/124 |
| 4,213,714 | 7/1980 | Jones et al. | 400/306 X |
| 4,220,924 | 9/1980 | Osann | 328/151 X |
| 4,255,061 | 3/1981 | Beery | 400/124 |

*Primary Examiner*—Paul T. Sewell
*Attorney, Agent, or Firm*—Cesari and McKenna

[57] ABSTRACT

A dot matrix character printer having the capability of printing characters at variable speeds and with variable pitches. Variable pitch is provided through the use of programmable radix counters which control actuation of the printing solenoids. Solenoid actuation is based on print head position, with the actuation position being varied with print head velocity, to compensate for the distance travelled by the print head during the time between solenoid actuation and print wire impact; this permits operation at variable printing rates. Printing rate is limited by the cyclic rate of the print head, with an additional limitation based on dot printing density which prevents excessive heating of the printing solenoids. Control functions are provided by a firmware-controlled microprocessor and a special purpose integrated circuit (PCC). The operation of the microprocessor and PCC are time-independent of each other. For initiating printing, the microprocessor provides a coarse time window and the PCC controls operations within that window.

22 Claims, 142 Drawing Figures

| INPUTS | | | STATE | | OUTPUTS |
|---|---|---|---|---|---|
| PRINT START | CHAR. BOUND | PRINT DONE | STATE | NEXT STATE | PRINT ENABLE |
| 0 | X | 0 | 114 | 114 | 0 |
| 1 | X | 0 | 114 | 115 | 0 |
| X | 0 | 0 | 115 | 115 | 0 |
| X | 1 | 0 | 115 | 116 | 1 |
| X | X | 0 | 116 | 116 | 0 |
| X | X | 1 | X | 114 | 0 |

Fig. 17A

| APPARATUS BLOCK NAME | NO. | FIG. NO. | CORRESPONDING CIRCUIT FIG. NO. |
|---|---|---|---|
| ENCODER SIGNAL FILTER | 204 | 16A | 18X |
| TRANSITION DETECTOR | 508 | 16A | 18Y |
| RESET CIRCUIT | 540 | 16A | 18A |
| CLOCK GENERATOR | 510 | 16A | 18B |
| POSITION COUNTER | 72 | 16A | 18J |
| READ DATA LATCH | 570 | 16A | 18G |
| DATA OUTPUT MULTIPLEXER | 560 | 16A | 18F |
| DATA OUTPUT BUFFER | 78 | 16A | 18E |
| READ CONTROL CIRCUIT | 590 | 16A | 18D |
| INTERRUPT CONTROL CIRCUIT | 550 | 16A | 18C |
| WRITE CONTROL CIRCUIT | 610 | 16A | 18I |
| WRITE DATA BUFFER | 620 | 16A | 18H |
| COMMAND DECODER | 66 | 16A | 18K |
| TRANSITION ADD CIRCUIT | 720 | 16B | 18Z |
| NET TRANSITION GENERATOR | 252A | 16B | 18AA |
| TRANSITION COUNTER | 254 | 16B | 18AB(1),(2) |
| INCREMENT COUNTER | 256 | 16B | 18AC |

Fig. 17B

| APPARATUS BLOCK | | | CORRESPONDING CIRCUIT |
|---|---|---|---|
| NAME | NO. | FIG. NO. | FIG. NO. |
| PULSE STRETCHER | 88 | 16B | 18M |
| SPEED STEERING CIRCUIT | 142 | 16B | 18N |
| BIT RATE MULTIPLEXER (BRM) | 132 | 16B | 18L |
| CLOCK DIVIDER | 876 | 16B | 18Q |
| TICK INTERRUPT CONTROL | 880 | 16B | 18(O) |
| DIVIDE-BY-3 | 890 | 16B | 18P |
| MODE CONTROL CIRCUIT | 740 | 16C | 18AD |
| TIMER A CONTROLLER | 762 | 16C | 18AI |
| TIMER A | 760 | 16C | 18AG |
| PRELOAD LATCH A | 764 | 16C | 18AE |
| TIMER B CONTROLLER | 772 | 16C | 18AJ-1 |
| TIMER B | 770 | 16C | 18AH |
| PRELOAD LATCH B | 774 | 16C | 18AF |
| INCREMENT SHIFT REGISTER | 100 | 16C | 18AJ-2 |
| PRIMARY/SECONDARY INCREMENT STEERING CONTROL | 750 | 16C | 18AM |
| DOT BUFFER CONTROLLER | 800 | 16D | 18AN |
| DOT BUFFER A | 810 | 16D | 18AK |
| DOT BUFFER B | 820 | 16D | 18AL |
| DOT INTERRUPT CONTROL CIRCUIT | 815 | 16D | 18AP |
| FIFO EMPTY GATE | 830 | 16D | 18AO |

Fig. 17C

| APPARATUS BLOCK NAME | NO. | FIG. NO. | CORRESPONDING CIRCUIT FIG. NO. |
|---|---|---|---|
| DOT OUTPUT CONTROL CIRCUIT A | 840 | 16D | 18AQ |
| DOT OUTPUT CONTROL CIRCUIT B | 850 | 16D | 18AR |
| BAND COMMAND LATCH | 930 | 16D | 18R |
| HIGH RATE GEN. | 900 | 16D | 18S |
| BELL CONTROLLER | 940 | 16D | 18T |
| BAND OUTPUT SEL | 920 | 16D | 18U |
| LOW RATE GENERATOR | 910 | 16D | 18V |
| LINE FEED CONTROLLER | 950 | 16D | 18W |

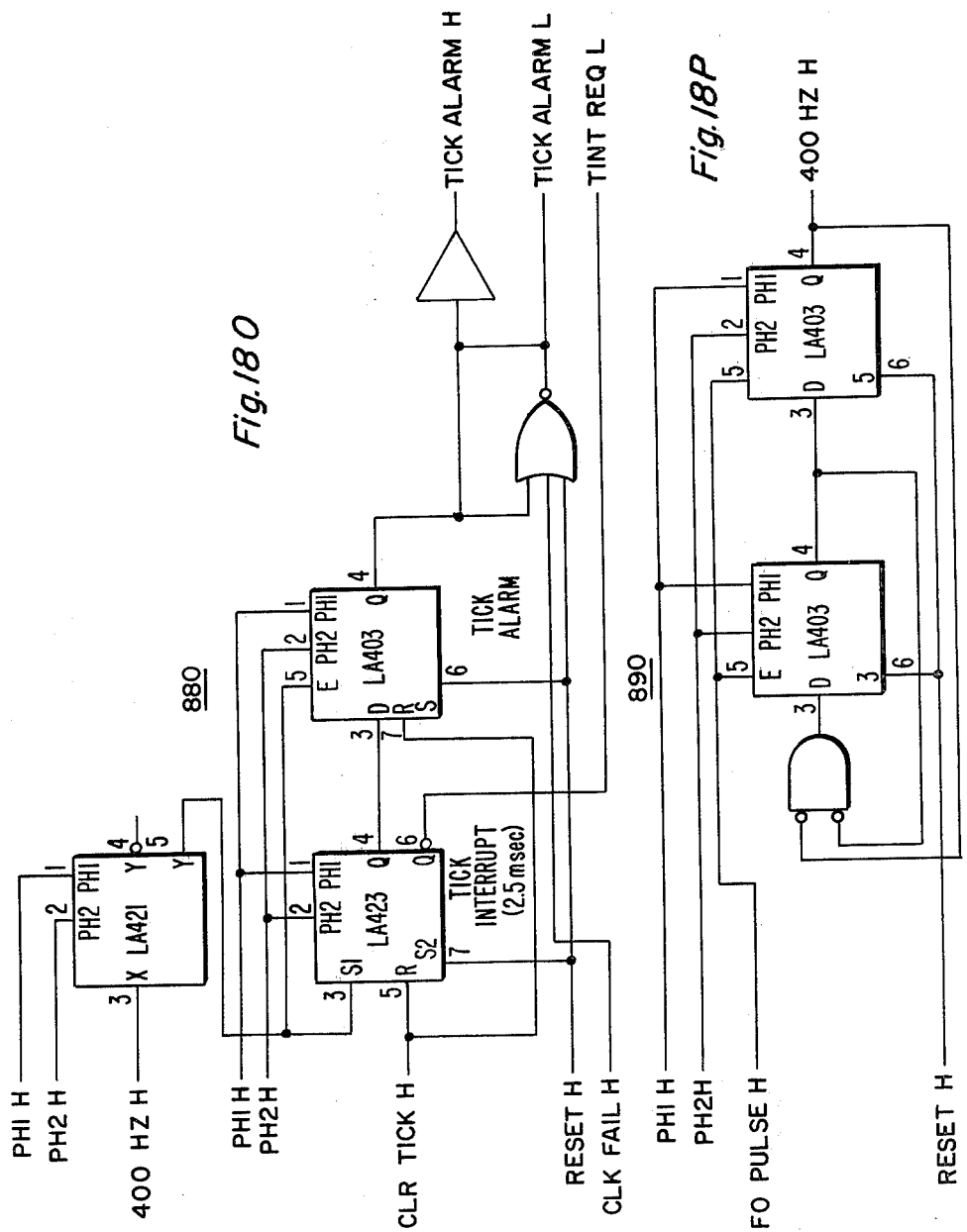

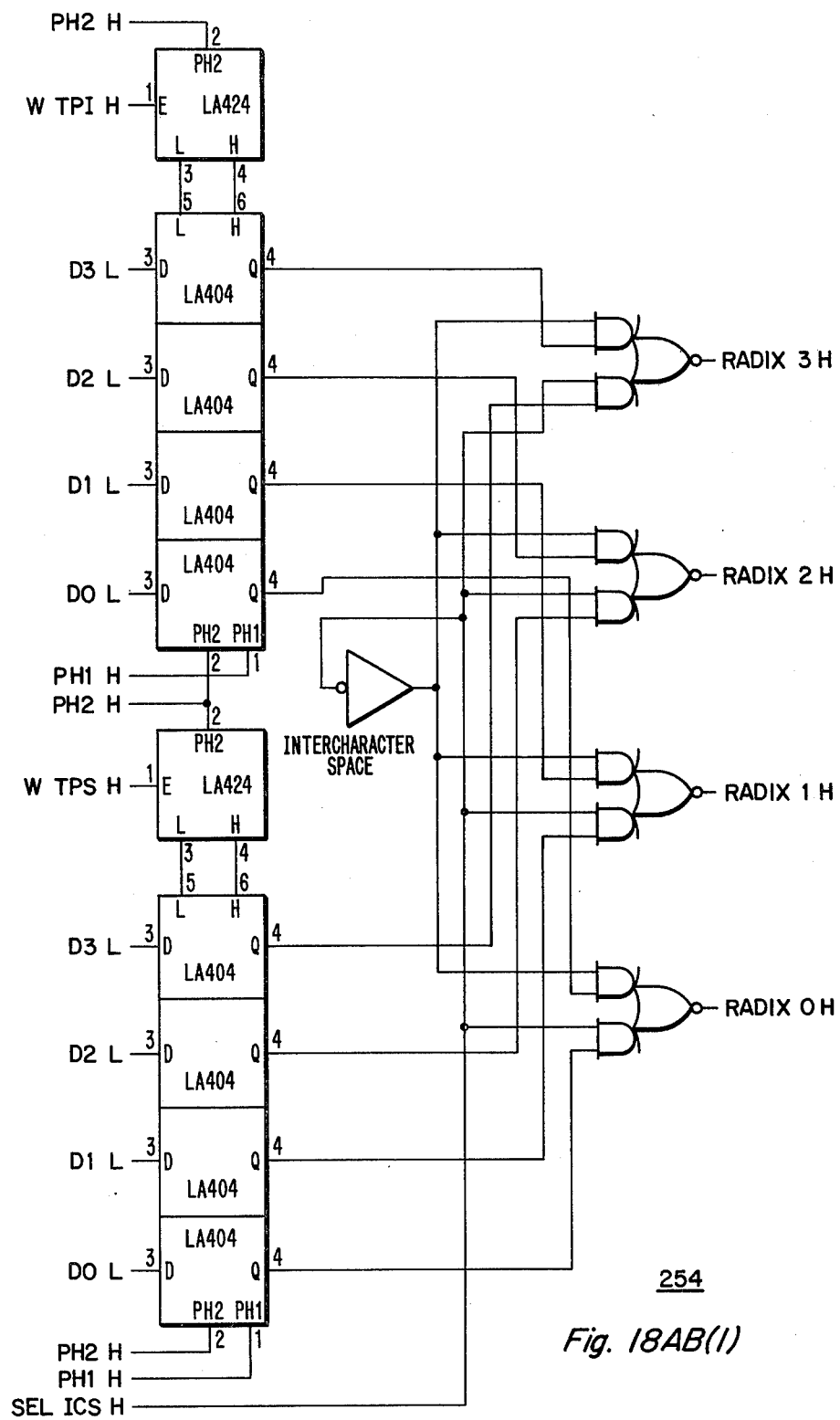
Fig. 18AB(1)

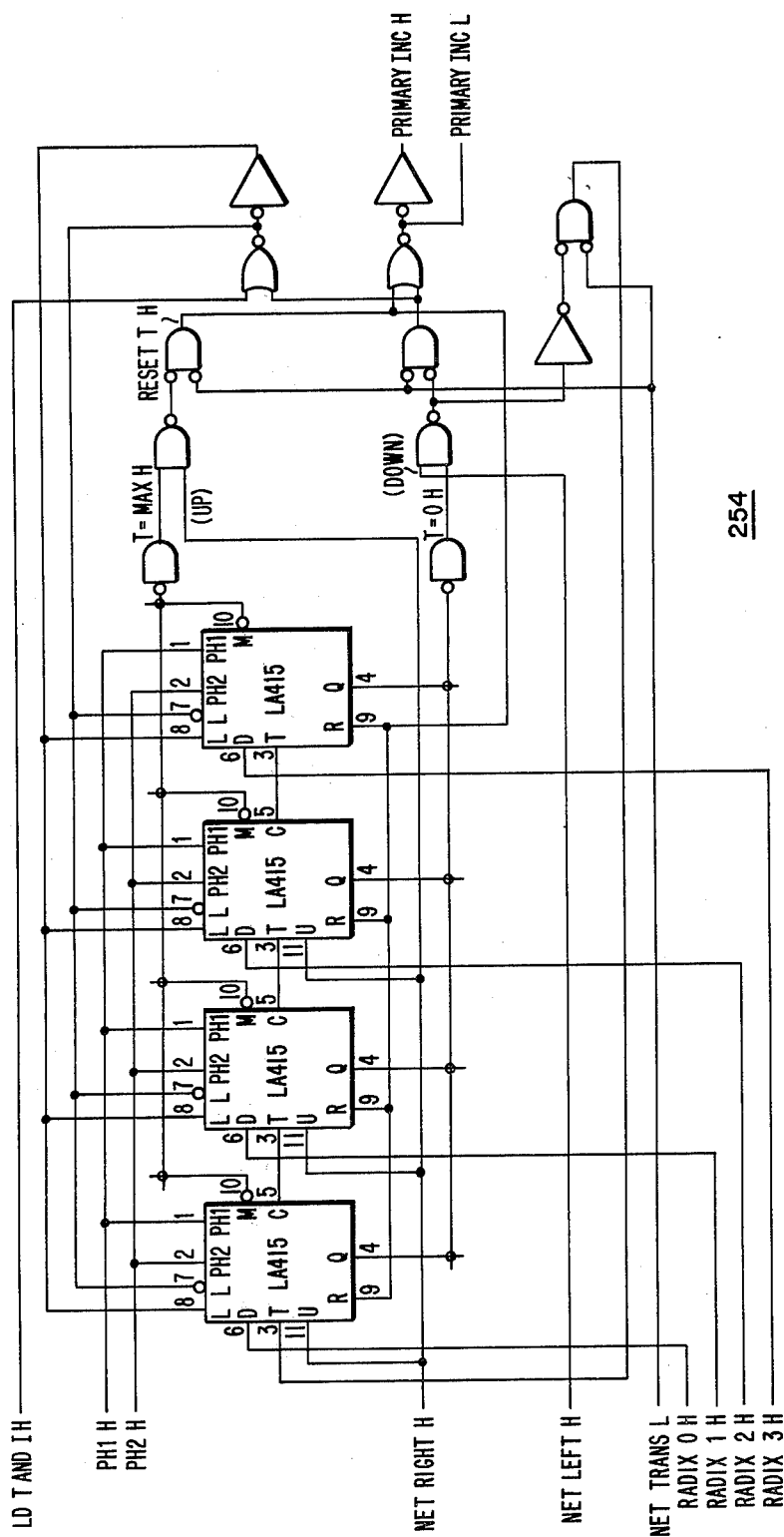
Fig. 18AB(2)

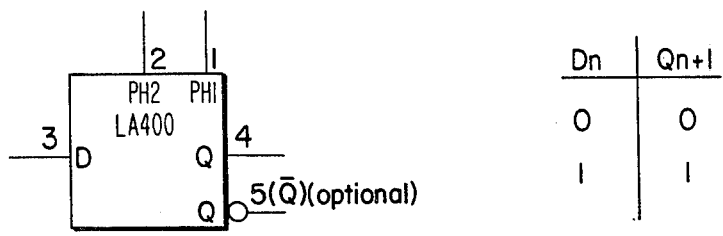
Fig. 19A(1)  Fig. 19A(2)
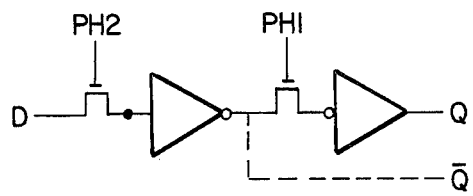
Fig. 19A(3)
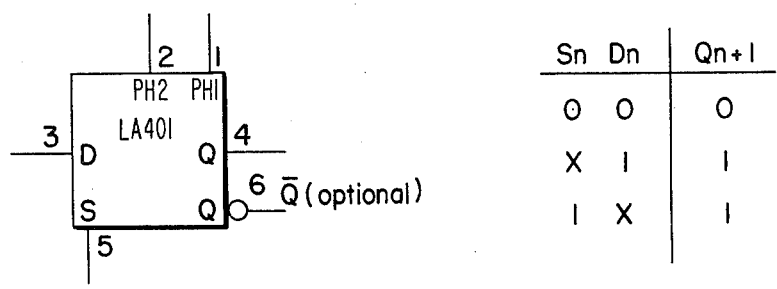
Fig. 19B(1)  Fig. 19B(2)
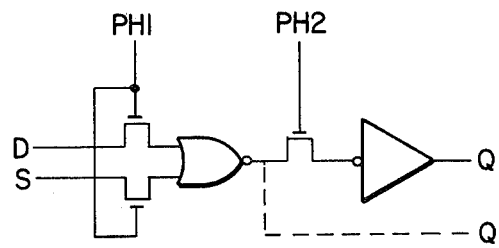
Fig. 19B(3)

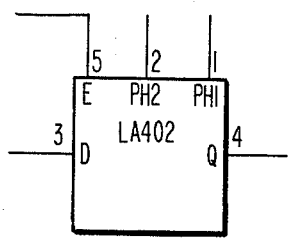
Fig. 19C(1)
| En | Dn | Qn | Qn+1 |
|----|----|----|------|
| 0  | X  | 0  | 0    |
| 0  | X  | 1  | 1    |
| 1  | 0  | X  | 0    |
| 1  | 1  | X  | 1    |
Fig. 19C(2)
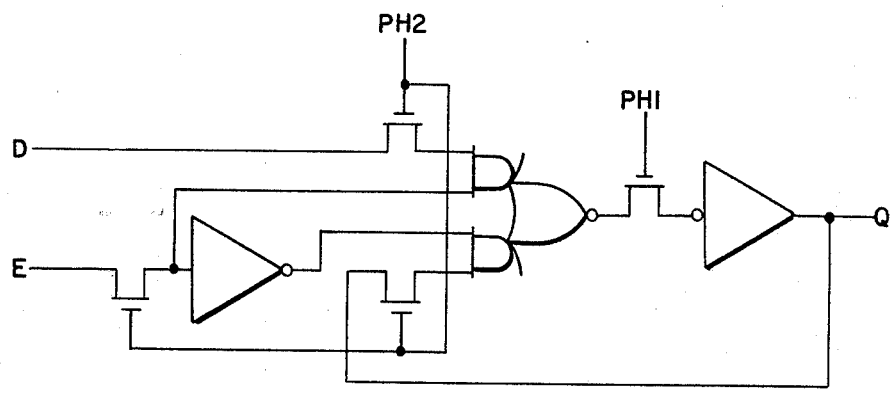
Fig. 19C(3)

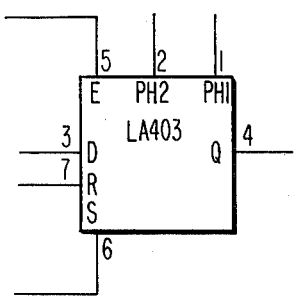
Fig. 19D(1)
Fig. 19D(2)
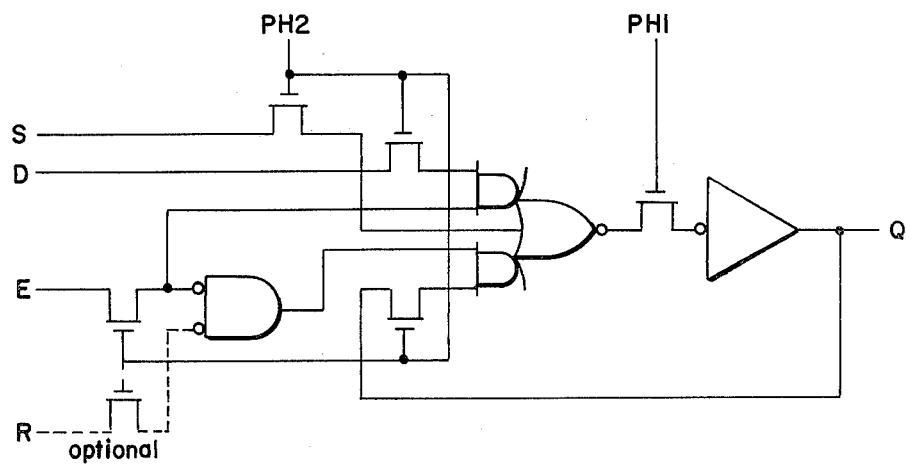
Fig. 19D(3)

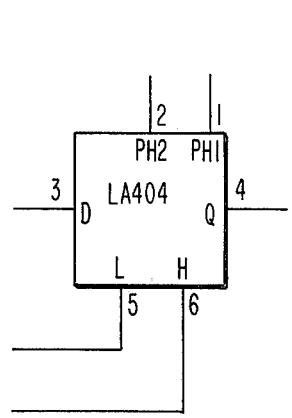
Fig. 19E (1)
| Dn | Ln | Hn | Qn | Qn+1 |
|---|---|---|---|---|
| X | 0 | 0 | X | 0 |
| X | 0 | 1 | 0 | 0 |
| 0 | 1 | 0 | X | 0 |
| 0 | 1 | 1 | 0 | 0 |
| 1 | 1 | X | X | 1 |
| X | X | 1 | 1 | 1 |
Fig. 19E (2)
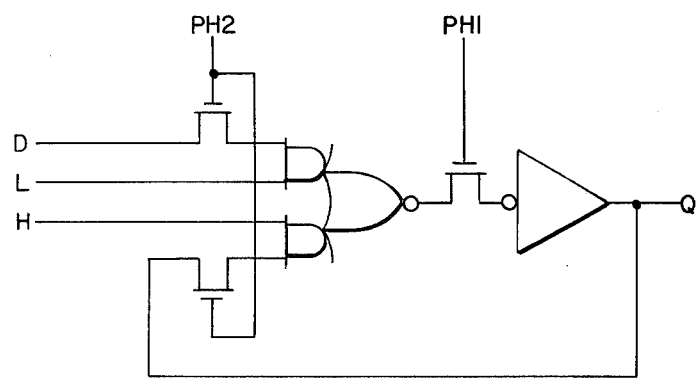
Fig. 19E (3)

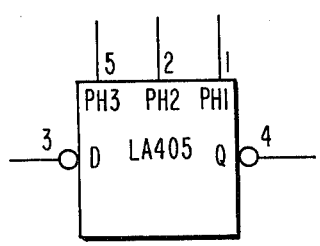
Fig. 19F(1)
| Qn | Dn-1/2 | Dn | Qn+1 |
|----|--------|----|------|
| 0  | 0      | X  | 0    |
| 0  | X      | 0  | 0    |
| 0  | 1      | 1  | 1    |
| 1  | 1      | X  | 1    |
| 1  | X      | 1  | 1    |
| 1  | 0      | 0  | 0    |
Fig. 19F(2)
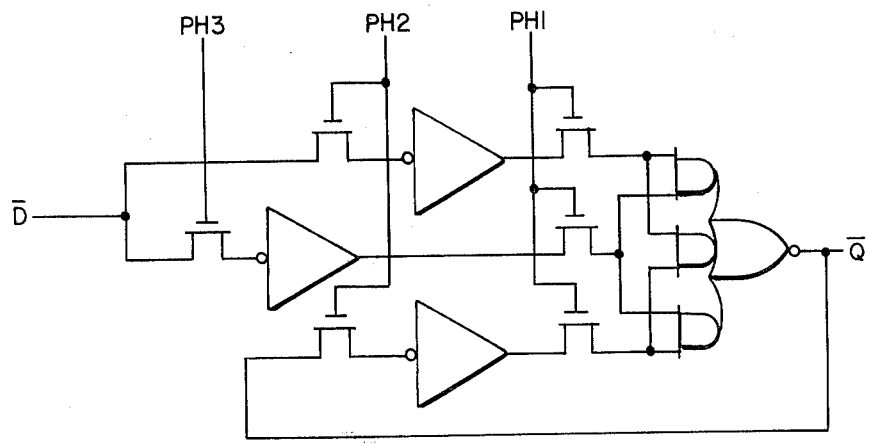
Fig. 19F(3)

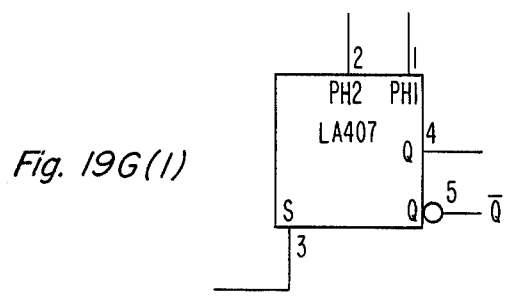
Fig. 19G(1)
| Sn | Qn | Qn+1 |
|----|----|------|
| 0  | 0  | 1    |
| 0  | 1  | 0    |
| 1  | X  | 1    |
Fig. 19G(2)
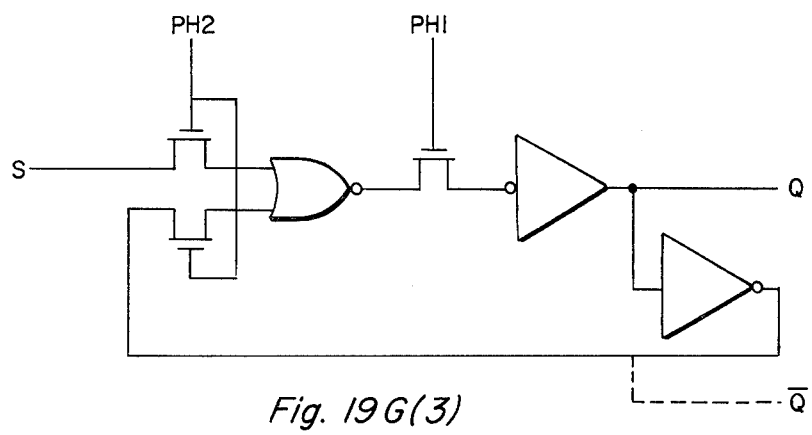
Fig. 19G(3)

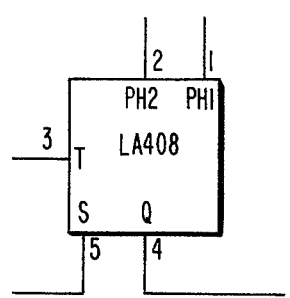
Fig. 19H(1)
| Sn | Tn | Qn | Qn+1 |
|---|---|---|---|
| 0 | 0 | 0 | 0 |
| X | 0 | 1 | 1 |
| X | 1 | 0 | 1 |
| 0 | 1 | 1 | 0 |
| 1 | X | X | 1 |
Fig. 19H(2)
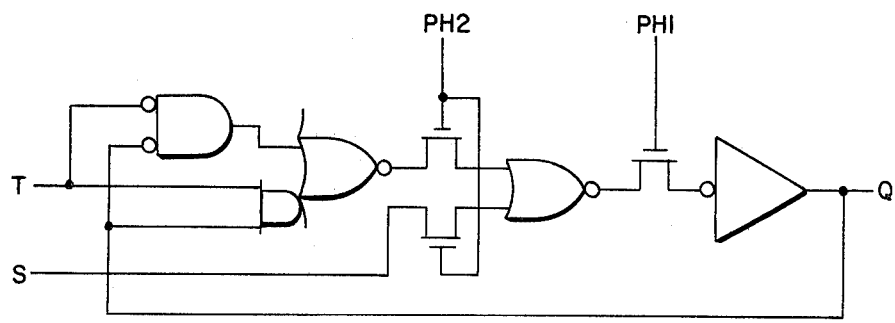
Fig. 19H(3)

| Sn | Tn | Qn | Cn | Qn+1 |
|---|---|---|---|---|
| 0 | 0 | 0 | 0 | 0 |
| X | 0 | 1 | 0 | 1 |
| X | 1 | 0 | 0 | 1 |
| 0 | 1 | 1 | 1 | 0 |
| 1 | 0 | 0 | 0 | 1 |
| 1 | 1 | 1 | 1 | 1 |
Tn ⟶ Cn : 2 LEVELS
Qn ⟶ Cn : 2 LEVELS
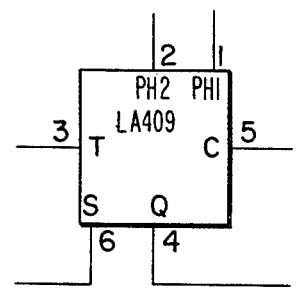
Fig. 191(1)
Fig. 191(2)
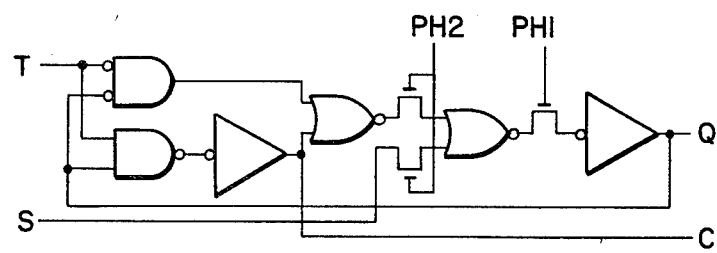
Fig. 191(3)

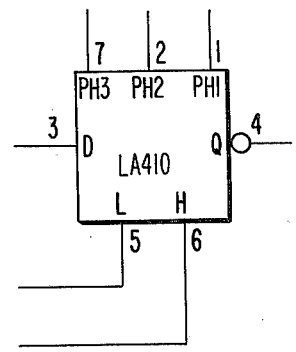
Fig. 19J(1)
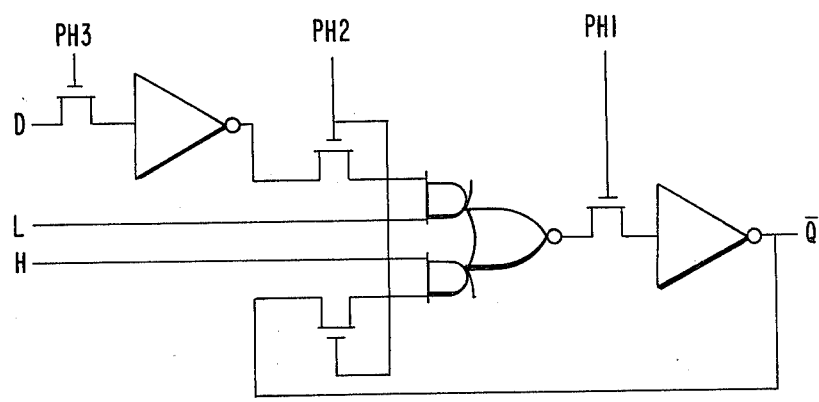
Fig. 19J(2)

Fig. 19K(2)
| Sn | Un | Tn | Qn | Cn | Qn+1 |
|---|---|---|---|---|---|
| 0 | X | 0 | 0 | 0 | 0 |
| X | X | 0 | 1 | 0 | 1 |
| X | 0 | 1 | 0 | 1 | 1 |
| 0 | 0 | 1 | 1 | 0 | 0 |
| X | 1 | 1 | 0 | 0 | 1 |
| 0 | 1 | 1 | 1 | 1 | 0 |
| 1 | 0 | 1 | 1 | 0 | 1 |
| 1 | 1 | 1 | 1 | 1 | 1 |
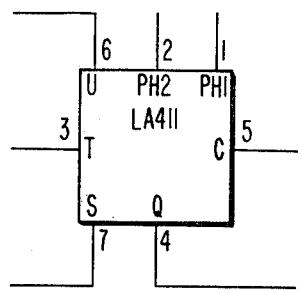
Fig. 19K(1)
Tn ⟶ Cn: 2 LEVELS
Un ⟶ Cn: 3 LEVELS
Qn ⟶ Cn: 3 LEVELS
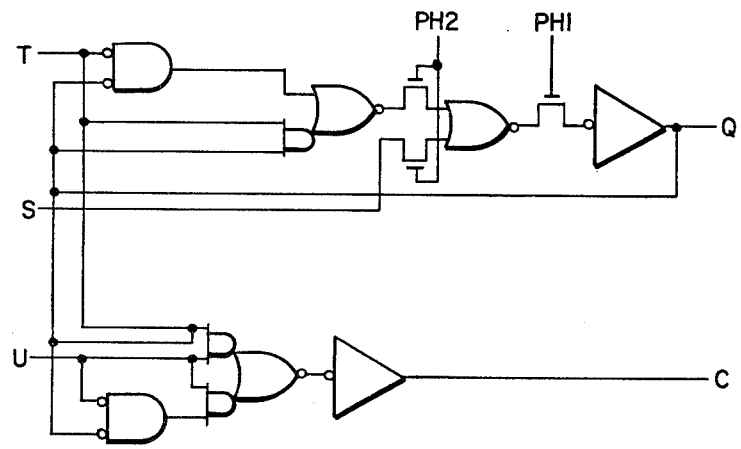
Fig. 19K(3)

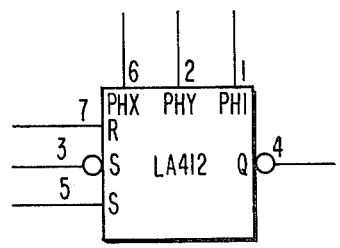
*Fig. 19L(1)*
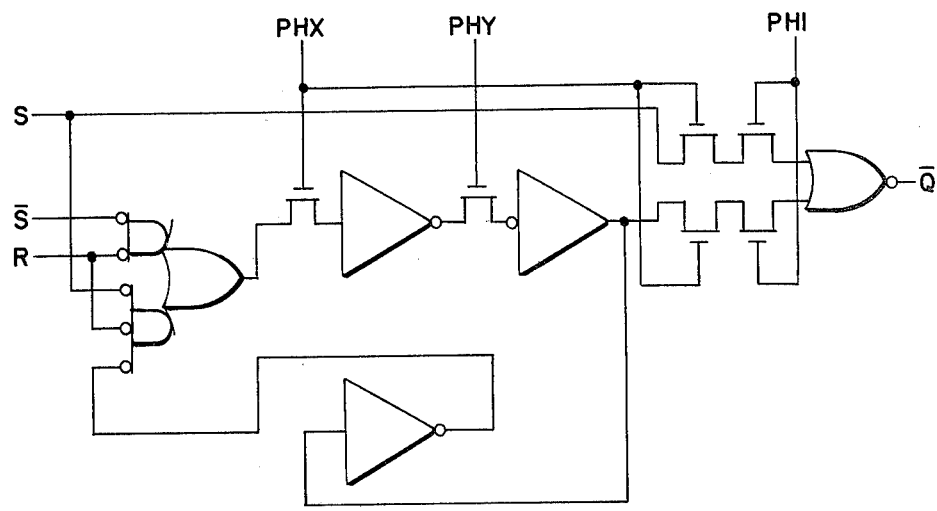
*Fig. 19L(2)*

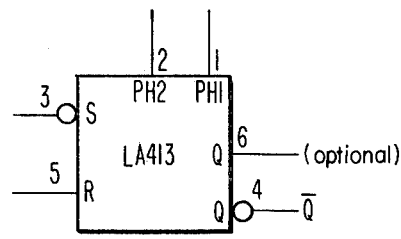
Fig. 19M(1)
| $\overline{S}$ | R | Qn | Qn+1 |
|---|---|---|---|
| 1 | 0 | 0 | 0 |
| X | 0 | 1 | 1 |
| 1 | 1 | X | 0 |
| 0 | X | X | 1 |
Fig. 19M(2)
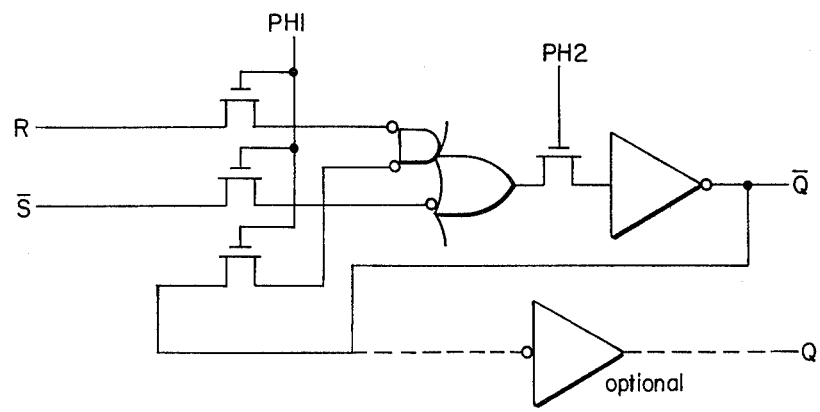
Fig. 19M(3)

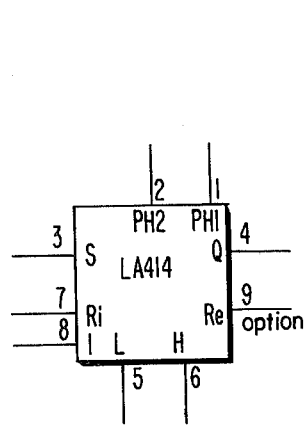
Fig. 19N (1)
| In | Rn | Sn | Qn | Qn-1 | Ln-1/2 | Hn-1/2 | Ron |
|----|----|----|----|------|--------|--------|-----|
| 0 | X | 0 | 0 | 0 | 0 | 1 | 0 |
| 0 | 0 | 0 | 1 | 1 | 0 | 1 | 0 |
| 0 | X | 1 | 0 | 1 | 1 | 0 | 1 |
| 0 | 0 | 1 | 1 | 1 | 0 | 1 | 0 |
| 0 | 1 | 0 | 1 | 0 | 0 | 1 | 0 |
| 0 | 1 | 1 | 1 | 1 | 1 | 0 | 1 |
| 1 | X | X | X | 0 | X | X | X |
Fig. 19N (2)
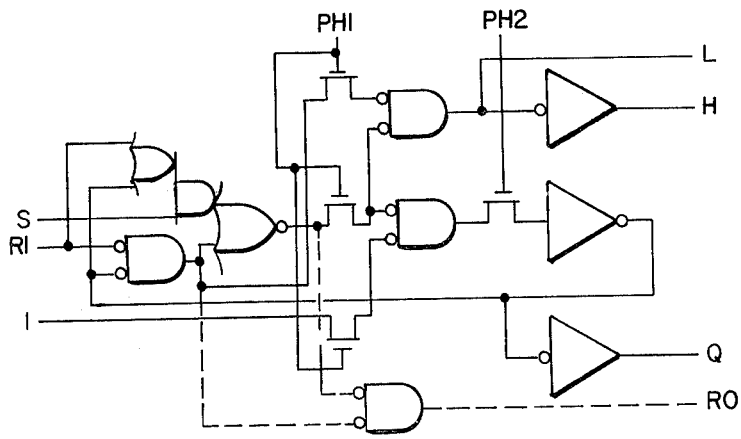
Fig. 19N (3)

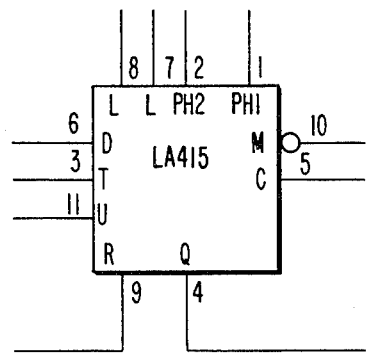
Fig. 19 O (1)
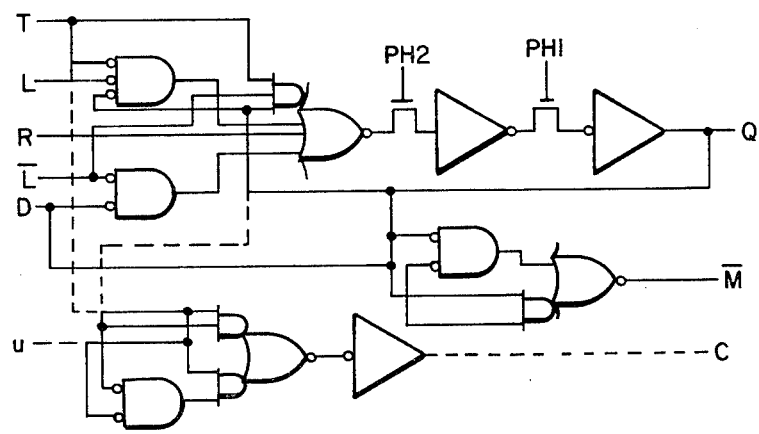
Fig. 19 O (2)

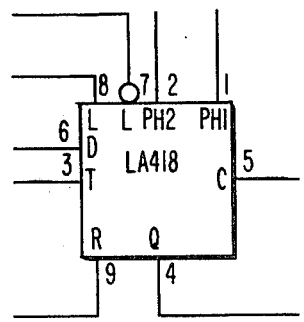
Fig. 19P (1)
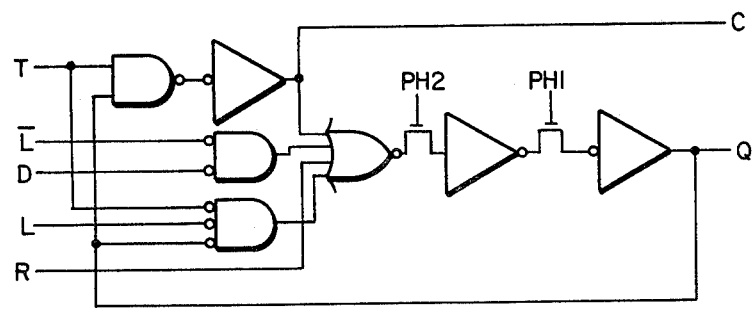
Fig. 19P (2)

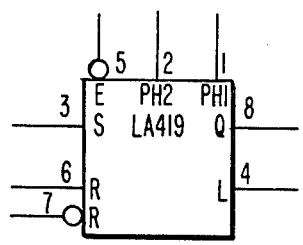
Fig. 19Q(1)
| $\overline{E}n$ | Sn | Rn | Qn | Qn+1 | Ln |
|---|---|---|---|---|---|
| X | X | X | X | 0 | 0 |
| 0 | 0 | X | 0 | 0 | 0 |
| 0 | 0 | 0 | 1 | 0 | 1 |
| 0 | 0 | 1 | 1 | 1 | 0 |
| 0 | 1 | 0 | 0 | 0 | 1 |
| 0 | 1 | X | 1 | 1 | 1 |
| 0 | 1 | 1 | 0 | 1 | 0 |
Fig. 19Q(2)
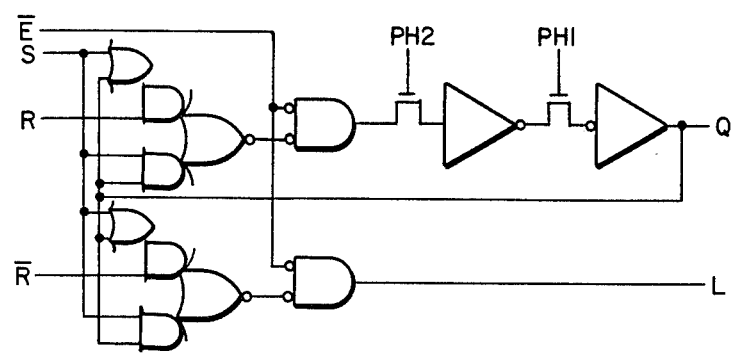
Fig. 19Q(3)

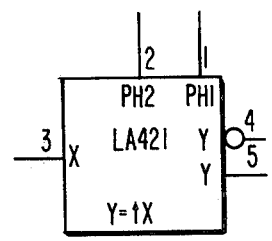
Fig. 19R (1)
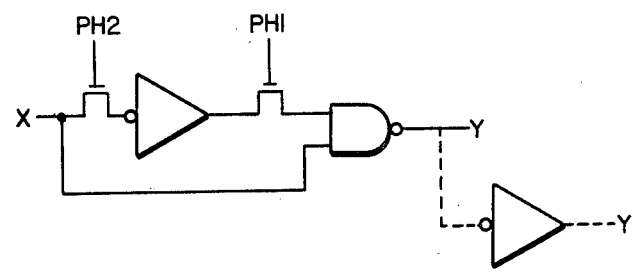
Fig. 19R (2)

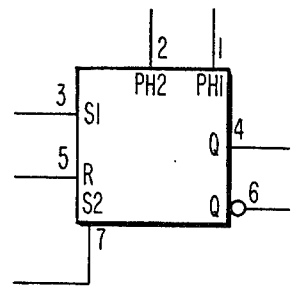
Fig. 19 S (1)
| Sn | Rn | Qn | Qn-1 |
|----|----|----|------|
| 0  | X  | 0  | 0    |
| X  | 0  | 1  | 1    |
| 1  | X  | X  | 1    |
| 0  | 1  | 1  | 0    |
Fig. 19 S (2)
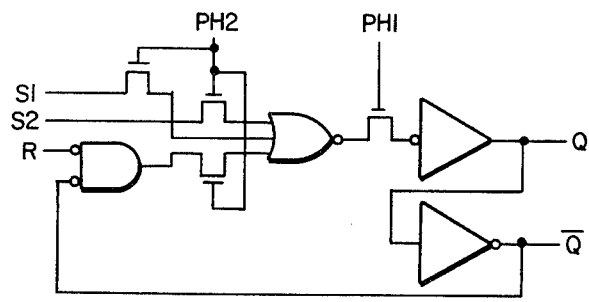
Fig. 19 S (3)

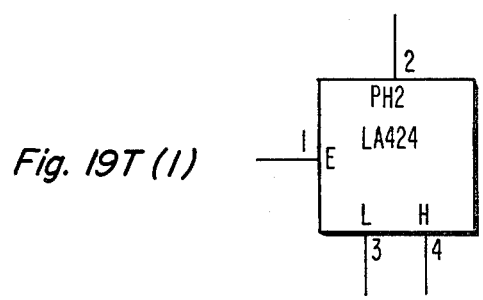
Fig. 19T (1)
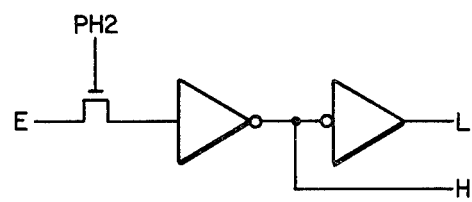
Fig. 19T (2)
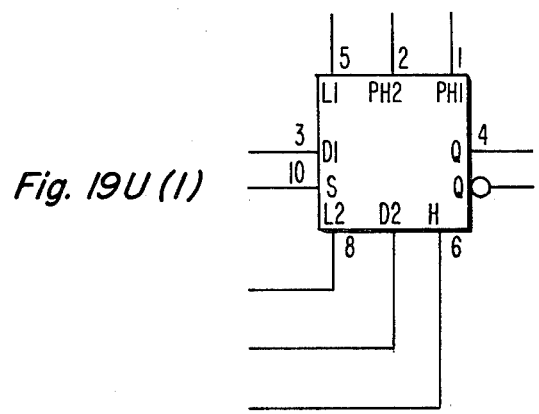
Fig. 19U (1)
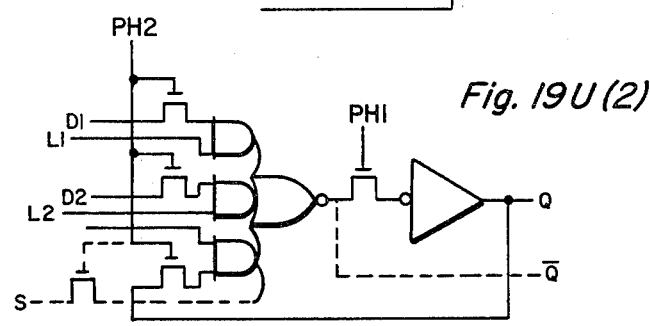
Fig. 19U (2)

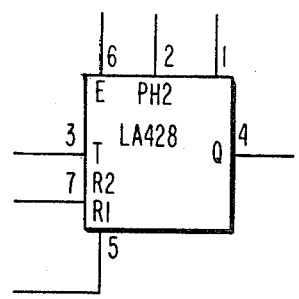
Fig. 19 V (1)
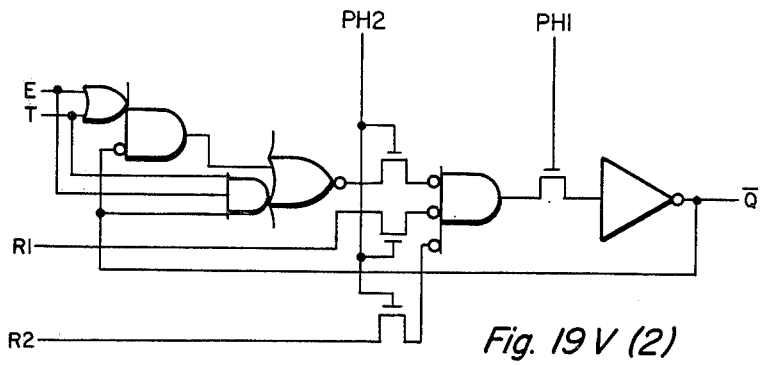
Fig. 19 V (2)
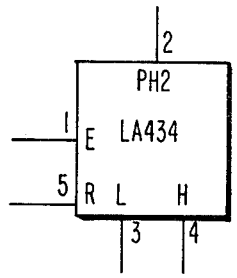
| E | R | L | H |
|---|---|---|---|
| 0 | 0 | 0 | 1 |
| 0 | 1 | 0 | 0 |
| 1 | X | 1 | 0 |
Fig. 19 W (1)　　　Fig. 19 W (2)
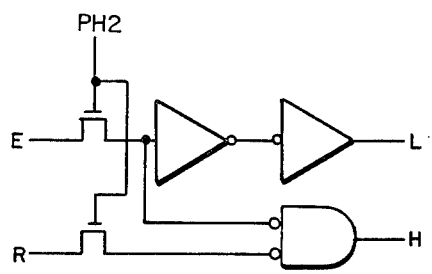
Fig. 19 W (3)

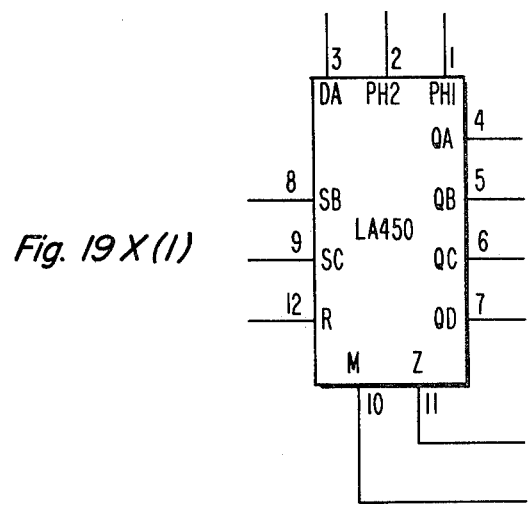
Fig. 19X(1)
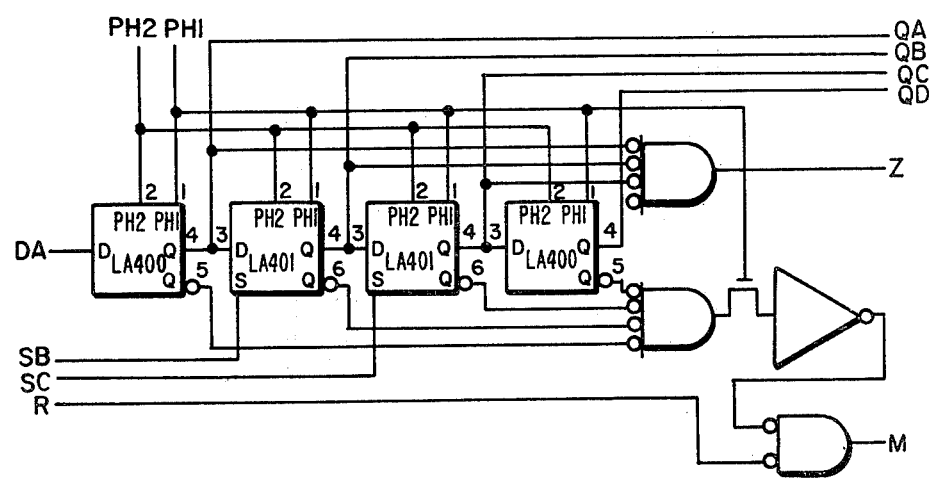
Fig. 19X(2)

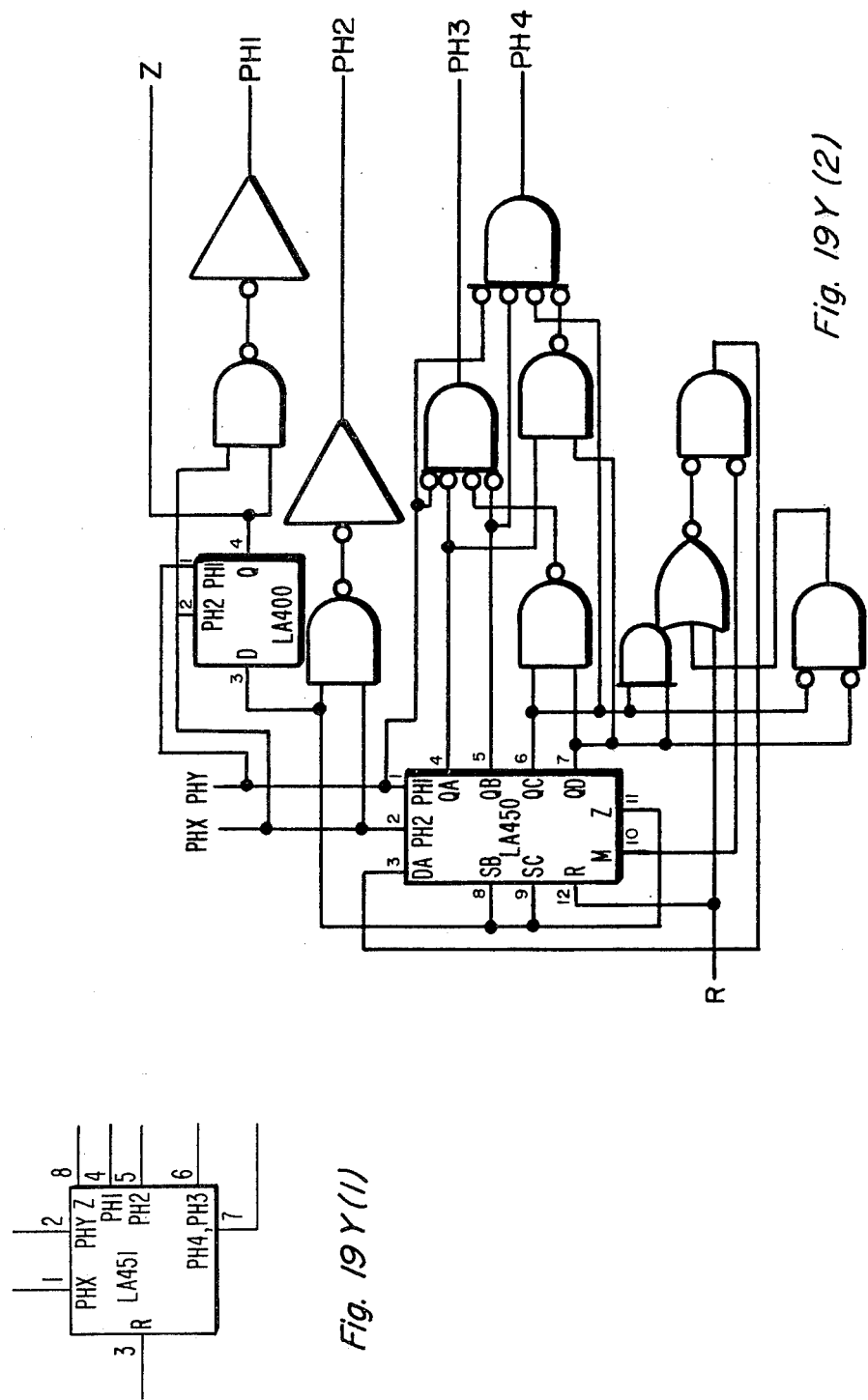
Fig. 19Y(2)
Fig. 19Y(1)

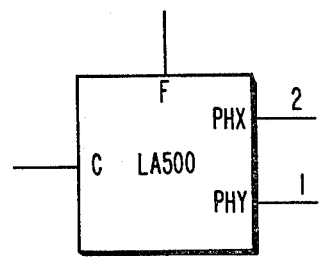
Fig. 19Z (1)
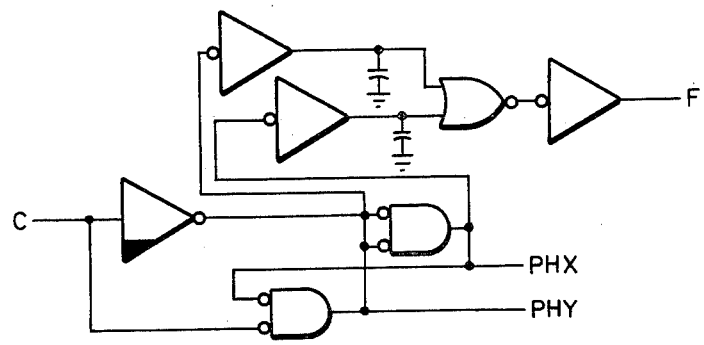
Fig. 19Z (2)

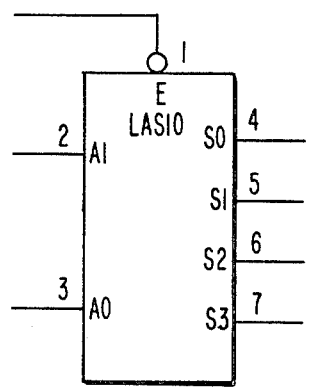
*Fig. 19AA (1)*
| E | AI | AO | SO | SI | S2 | S3 |
|---|----|----|----|----|----|----|
| 0 | 0  | 0  | 1  | 0  | 0  | 0  |
| 0 | 0  | 1  | 0  | 1  | 0  | 0  |
| 0 | 1  | 0  | 0  | 0  | 1  | 0  |
| 0 | 1  | 1  | 0  | 0  | 1  | 1  |
| 1 | X  | X  | 0  | 0  | 0  | 0  |
*Fig. 19AA (2)*
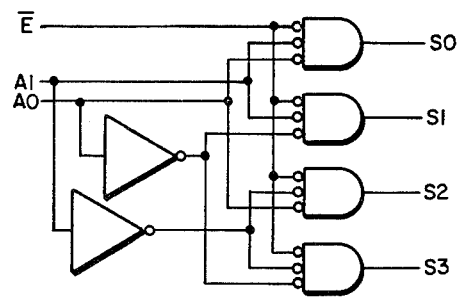
*Fig. 19AA (3)*

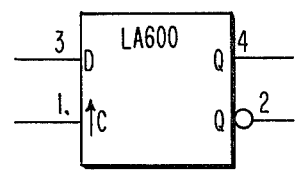
Fig. 19 AB (1)
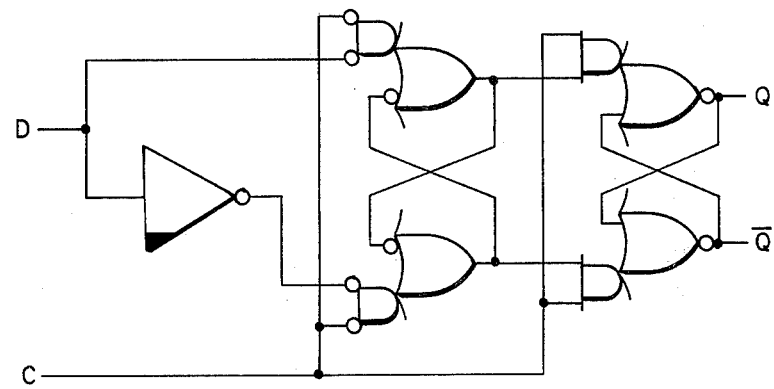
Fig. 19 AB (2)

DOT MATRIX CHARACTER PRINTER CONTROL CIRCUITRY FOR VARIABLE PITCH PRINTING

CROSS REFERENCE TO RELATED APPLICATION

This application is a continuation-in-part of copending U.S. application Ser. No. 955,525, filed Oct. 30, 1978 and entitled Dot Matrix Character Printer With Variable Speed Control, now abandoned.

FIELD OF THE INVENTION

This invention relates to the field of electronically controlled character printers, particularly dot matrix printers which form characters as an array of dots at available locations. More specifically, this invention relates to a control system for such printers to permit the printing, at variable speeds, of characters having different pitch, with the capability of printing characters of different pitch on the same line.

BACKGROUND OF THE INVENTION

Dot matrix character printers are well known in the art, particularly for use as output devices for computers and other electronic devices. These printers are used to produce printed character output on a paper medium in response to receiving electronic signals which correspond to the characters of the available character sets. Individual characters are formed from an appropriate combination of dots selected from an array of available dot locations. Generally, these dot locations are arranged in an n-column by m-row matrix. A printing head contains a solenoid-operated print rod for each row location in the matrix. When the printing of a character requires that a dot be written in a particular row, the corresponding solenoid in the printing head is activated; this causes the associated printing rod to be flung (or "fired") in the direction of the paper (i.e., "target"). An inked printing ribbon is interposed between the printing head and the paper. Thus, the fired printing rod impacts the ribbon and prints an impression of its end surface on the paper. The printing rod is actually a thin wire-shaped element with a flat end having a round cross section. It is this end which forms a dot on the paper.

Typically, the printing head of a dot matrix printer contains printing solenoids. These are assembled into close proximity with each other. The activation of these printing solenoids causes them to heat up. Dissipation of solenoid heat is normally not a problem in slow speed character printers. However, it has been observed to sometimes become a problem in high speed dot matrix character printers. When the print head is activated for a substantial time and the characters to be generated in a relatively short interval require the printing of a somewhat higher than average number of dots during that interval, solenoid heat may be inadequately dissipated. When that happens, solenoid response characteristics may be altered due to parametric variations, and one or more of the printing rods may cause a dot to be printed slightly earlier or later than intended, or even not at all. This degrades the appearance of dots and characters printed under such conditions and may, under severe conditions, even lead to the printing of unrecognizable or incorrect characters. Solenoid power supply failure or degraded performance may also result, as a greater load is imposed thereon. And excessive heat may cause permanent damage to the solenoids or other components. Considerable efficiency is lost if the character printing rate is significantly reduced in order to avoid the solenoid heat dissipation problem, since high reliability would require a substantial reduction in speed.

Typically, in the prior art, in order to change the pitch of printed characters, it has been necessary to provide additional tracks on the encoder at different pitches or to physically change the encoder-to-carriage "gear" ratio. These approaches have typically been cumbersome and not conducive to changing pitch on a character to character basis.

It should also be noted that the printing heads of prior art printers generally have their print rods all arrayed in a single vertical column. Unless the print head is capable of vertical motion, this means that dots formed by adjacent print wires (or rods) cannot overlap; some dot spread caused by the ribbon may, however, allow some blending together of adjacent dots, but resolution is ultimately limited to that provided by tangentially touching dots.

SUMMARY OF THE INVENTION

The above-identified application Ser. No. 955,525 discloses an invention designed to permit the printing of dot-matrix characters of different pitches (i.e., horizontal widths). Character pitch is selectable and variable on a character by character basis, if desired. Electronic signals under the user's control provide for pitch selection. Provision is also made to control the printing speed electronically, to achieve smooth starting and stopping of the carriage while maximizing the character printing rate.

The present invention pertains to circuitry which operates under microprocessor control to provide actuation and control signal for the printer's motors and print head solenoids.

The maximum printing speed is limited by the speed at which the print head solenoids can operate. However, if the text to be printed requires a dot printing rate which would result in overheating of the print solenoids or their power supply, the printing speed is reduced until a safe dot printing rate is achieved. The maximum permissible dot printing rate is a system parameter empirically derived.

Variable rate character printing requires that the printing head carriage traverse the paper at a variable rate. Because the rate of carriage travel is appreciable with respect to the time between a solenoid actuation command and the time the associated printing rod strikes the paper, it is necessary to compensate for variations in the carriage motion in order to always have the printing rods strike the paper in a desired position; this position is, of course, intended to be insensitive to the character printing rate. The situation is analagous to the case of a hunter shooting at a moving duck from a fixed location. In order to allow for the motion of the duck during the time his bullet is in flight, the hunter must aim ahead of the duck; this character printer merely presents the converse situation since the target is fixed and the projectile is fired from a moving platform, although the relative motion problem is the same. Means are therefore provided for deriving a correction factor for actuating the solenoids at the proper times to compensate for the instantaneous rate of carriage motion relative to the paper.

Additionally, in the preferred embodiment of the invention, the print rods are arranged in two columns such that the print rods in one of the columns are vertically displaced with respect to the print rods in the other column. This permits a higher resolution (i.e., density) dot printing and allows dots to be overlapped a significant amount, so that the dot matrix characters more nearly approximate conventionally printed characters. Separate solenoid firing time signals are required for each column of print rods, to account for their different horizontal positions at any given time.

The present invention also provides such features as the capability of allowing the user to change type fonts and pitch from character to character within the line.

Control responsibility is divided between a microprocessor and dedicated, special purpose control circuiting suitable for implementation on a single large scale integration (LSI) "chip". Hardware control functions and microprocessor firmware control functions are maximally independent. In general, operations which must take place at high speeds are performed in the hardware control circuitry, to permit high speed printing without the need for an expensive, high speed microprocessor or multiple microprocessor.

BRIEF DESCRIPTION OF THE DRAWINGS

These and other features of this invention will become apparent from the following description taken in conjunction with the accompanying drawings in which:

FIGS. 17A-17C comprise a cross-reference table relating the blocks of FIGS. 16A-16D to more detailed diagrams in FIGS. 18A-18R;

DESCRIPTION OF AN ILLUSTRATIVE EMBODIMENT

Figure 1:
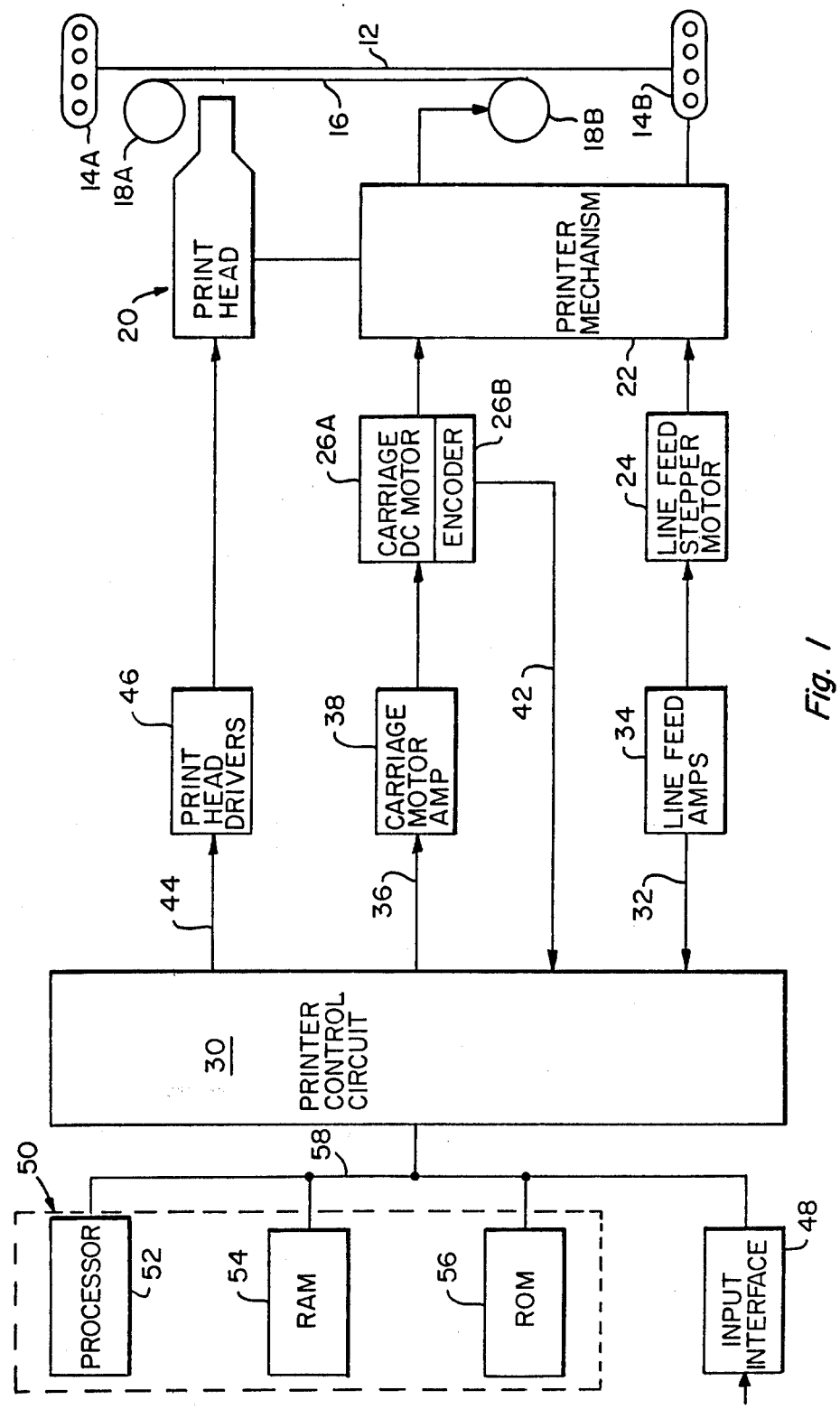
FIG. 1 is a high level functional block diagram of a dot matrix character printer according to the present invention.

Referring now to FIG. 1, there is shown a high-level functional block diagram of a dot matrix character printer according to the present invention. Paper 12 is the output medium on which the printing is performed. The paper is normally carried on sprockets 14A, 14B past a print bar not shown, according to conventional practice. The print bar serves the same basic purpose as a platen (i.e., acts as a hard backing surface to print against) except that it does not move the paper. The edges of the paper contain evenly spaced vertical holes which mate with the teeth of drive sprockets 14A and 14B for vertically feeding the paper. Images are formed on the paper by a ribbon 16 which may be carried between a pair of ribbon reels 18A and 18B or may be a cartridge type ribbon wound on one reel or spool. The print rods or wires from print head 20 force the inked ribbon 16 onto the paper 12 and against the print bar, to cause an image of the print rod to be formed on the paper. Print head 20 is carried on a carriage which traverses the paper for positioning the print head in the proper location as each column of dots is printed. Printing mechanism 22 comprises a mechanical assembly which includes the carriage and the necessary linkages and so forth for moving the carriage, together with a ribbon advancement mechanism for winding the ribbon (e.g., onto reel 18B) as it is used. The printer mechanism also includes conventional mechanical linkages for connecting the line feed stepper motor 24 to the tractors or drive sprockets 14b and for connecting the carriage motor 26a to the carriage motion mechanism.

A printer control circuit (PCC) 30 provides the actual control signals which cause the carriage to move to the proper location and the appropriate print solenoids to be energized. PCC 30 provides basically three types of control signals as outputs. A line feed control signal is provided as the first output on line 32 to line feed amplifier 34. In turn, line feed amplifier 34 provides the required drive signal to the line feed stepper motor 24, to cause the line feed advance mechanism to move the drive sprockets an appropriate distance to advance the paper one line space. A carriage drive control signal is the second PCC output; it is provided on line 36 to carriage motor amplifier 38. The carriage motor amplifier, in turn, provides the drive signal to carriage motor 26A, for controlling the motion of the carriage. The carriage motor is also equipped with an incremental shaft position encoder 26B for providing an output signal on line 42, to the PCC, representative of the change in angular position of the motor shaft. Since the rotational position of the carriage motor shaft directly corresponds to the position of the carriage and, in particular, the print head, the signal on line 42 represents the position and position changes of the print head. The third output of the PCC is a print head control signal provided on line 44 to the print head driver 46. The print head driver 46, responsive to signals provided on line 44, provides an actuation signal to appropriate solenoids in the print head 20 to cause the associated dots to be printed at a desired location.

For use with a computer, or other similar source of data to be printed, the printer is provided with an input interface 48. This interface provides appropriate input buffering for capturing the data to be printed. A table of character-to-dot patterns stored in ROM 56 of sequential controller 50 is used to convert the character information provided by the input data source into dot matrix information representing each character to be printed. By varying the character-to-dot pattern mapping, different fonts (such as different typefaces or typefaces for different alphabets—e.g., Cyrillic, Greek, etc.) may be printed. Characters having the same basic font (i.e., typeface) may be spread or compressed in the horizontal dimension by altering the spaces between dots and the blank spaces between characters, thereby altering the pitch of the characters. And, since the mapping must be done on a character-by-character basis, it is possible to change character size and font on the same basis. There is no provision for changing the size of printed characters in the vertical dimension if the number of vertical print rod positions would thereby be exceeded, but various character widths can be accommodated, and vertically compressed or stretched characters can be generated using less than, or at most, the full number of vertically available print rod positions.

A sequential controller 50 for generating PCC control or command signals and provided character-to-dot mapping comprises a processor unit 52, random access memory (RAM) 54 and a read only memory (ROM) 56. Interface 48, processor 52, RAM 54, ROM 56 and PCC 30 are all interconnected via a bus or communication link 58.

Character information to be printed is fed from the input interface 48, via bus 58, to RAM 54, where it is temporarily stored. ROM 56 controls the operation of the processor 52 and the data paths between the various elements connected to the bus 58. Using the character-dot mapping provided by the ROM, processor 52 provides instructions to PCC 30 regarding the dot pattern to be printed. In turn, PCC 30 determines the appropriate times, as a function of carriage position, for activating the print head driver to fire the print head solenoids.

While various components may be used to fabricate the box described above, it is particularly noted that the models 8080A and 8085 microprocessors manufactured by Intel Corporation have been found suitable for the processor 52. Accordingly, the particular embodiment disclosed in detail herein is described with reference to the use of the aforesaid Model 8080A. The printer control circuit 30 could also be implemented in a number of ways. However, in order to minimize cost and number of interconnections, we have implemented it as a single large scale integrated circuit using metal oxide semiconductor technology, with a design architecture suitable for control by a microprocessor.

Figure 2:
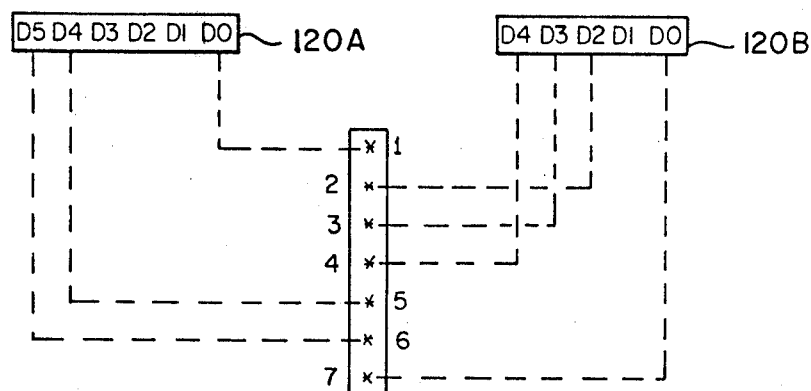
FIG. 2 is a diagrammatic illustration of a seven-wire printing head, further depicting one possible mapping of dot buffer output lines to solenoids.
Figure 3:
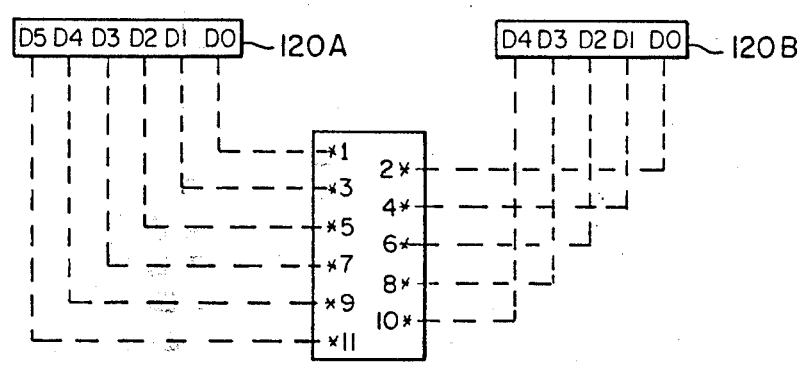
FIG. 3 is a diagrammatic illustration of an eleven-wire printing head, further depicting one possible mapping of dot buffer output lines to solenoids.
Figure 4:
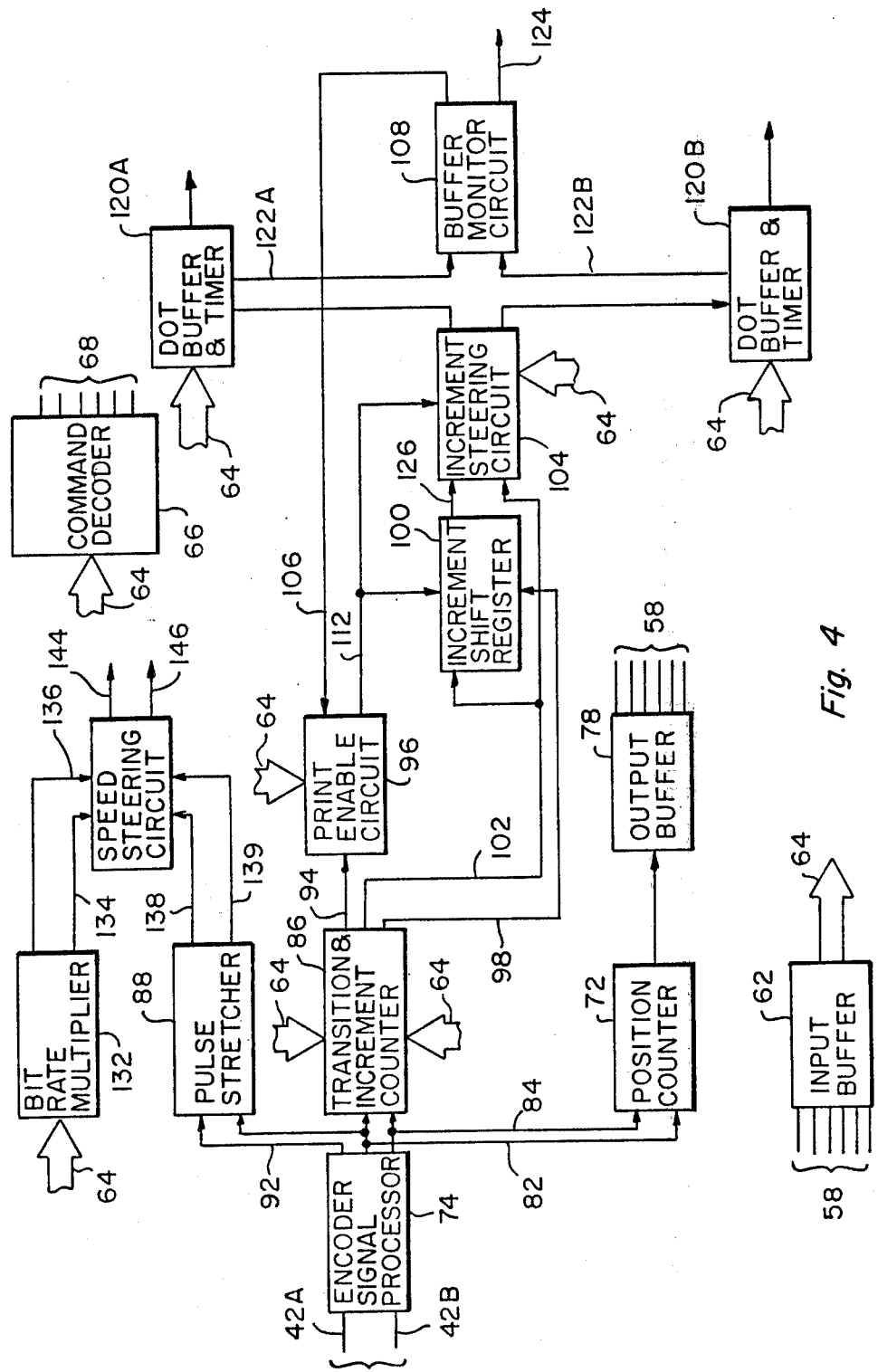
FIG. 4 is a functional block diagram of the Printer Control Circuit (PCC) of FIG. 1.

The printer control circuit is capable of operating in two modes for generating characters of different pitches. The first mode permits the use of a conventional seven wire print head containing seven print rods arranged in a single vertical column. The second mode is unique to this invention and permits use of two, horizontally displaced columns of print rods. The specific illustration of this mode, described below, shows the use of an eleven wire print head having a first vertical column of six print rods and a second vertical column of five print rods. The embodiment illustrated further shows the rod positions in the second row vertically spaced from the rod positions in the first row so as to achieve a vertical interleaving of positions and permit the printed dots formed by vertically adjacent rods in the two rows to overlap. FIG. 2 illustrates the print rod positions in a seven wire head and FIG. 3 illustrates the print rod positions in an eleven wire head. A functional block diagram for the printer control circuit (PCC) 30 is shown in FIG. 4, to which reference will now be made. Character data to be printed and supervisory commands to the PCC are received via the bus 58 which enables the PCC to communicate with the sequential controller and input interface, as required. Information received by the PCC upon the bus 58 is captured by an input buffer 62. The input buffer 62 feeds this information to the various functional elements of the PCC via a parallel bus 64. In the drawing, bus 64 is indicated separately at the appropriate functional blocks (by an arrow comprising two spaced, short parallel lines terminated by an arrowhead at one end and broken off at the opposite end); it should be understood that the bus interconnects all of the indicated blocks even though the full interconnection is not illustrated.

One of the elements connected to bus 64 is a command decoder 66. This command decoder is also connected via lines 68 to the various other elements of the PCC; such connections are not explicitly shown, however, in order to maintain clarity in the drawing. Command decoder 66 detects and decodes the commands provided by the sequential controller and through the use of appropriate steering logic activates, deactivates and controls the functional blocks shown in FIG. 4 to achieve the operation directed by the commands.

As briefly stated above, the function of the PCC is to supply appropriate signals to drive the line feed amplifier 34, carriage motor amplifier 38 and print head driver 46. The dominant function of the PCC is to implement the required control of the print head driver 46 for printing, with variable pitch and performing the "duck shooting" operation involved in printing with a variable carriage speed. The desired carriage speed is a function of carriage position in the line, with the objective being to maintain maximum throughput of characters within the limits imposed by available acceleration, start/stop dynamics of the print head, and solenoid actuation rates which avoid excessive heating. The processor 52 determines the appropriate carriage speed and the PCC actuates the print head driver accordingly. Thus, the basic information required by the processor 52 is the position and velocity of the print head. This information is obtained from encoder 26B which is driven by the carriage motor 26A. Encoder 26B is an incremental two-channel encoder which provides a digital output. A short up-down position counter 72 receives the output of the incremental encoder 26B via an encoder signal processor 74 which suitably conditions and formats the output of the encoder. Thus, the position counter 72 keeps track of the relative position of the print head, modulo its radix. The output of position counter 72 is supplied to the output buffer 78 on demand, and, from the output buffer, to bus 58 and processor 52. Processor 52 periodically examines the position information provided by the position counter 72 and calculates print head velocity from the change in position during the inter-sample time. In the particular embodiment heretofore implemented, the processor 52 samples the output of the position counter approximately once every 2.5 ms. The change in position observed at each sample time is summed in a position register (i.e., address location) in RAM 54. Absolute position information is obtained by initializing the position register to a known value when the carriage is forced against a fixed stop.

The initialization procedure of the printer requires that the carriage motor be commanded to drive the carriage in the direction of the stop. When the processor detects no change in the position counter's output during a predetermined number of sample times in which the carriage is being commanded to move toward the stop, it "knows" that the carriage has already reached the stop; the position register is then initialized. All relative motion can then be compared against this initial position, to be transformed to absolute position.

While various encoder designs well suited to this application will be apparent to those skilled in the art, this system has been successfully implemented with an encoder of the type which uses two tracks to provide a pair of (phase) quadrature output signals; these encoder signals are supplied to the PCC encoder signal processor (ESP) 74 via lines 42A and 42B (which are collectively shown as line 42 in FIG. 1). Encoder signal processor 74 is used to give "clean" position decoding and insure that only valid state changes on line 42A and 42B are interpreted by the PCC as indicative of carriage motion. ESP 74 may, for example, comprise a so-called "majority vote" circuit which uses a high sampling rate to distinguish between valid and invalid state changes in the encoder's quadrature output signals.

At this point it would be helpful to the further understanding of the operation of the PCC to digress briefly for an explanation of character "cell" structure. All printing of characters by this system takes place within programmable character cells whose fundamental units are encoder "transitions" (i.e., logic state changes in the encoder quadrature output signals). As successfully implemented, for example, each encoder transition may correspond to print head or carriage motion of 1/660 of an inch. A character cell consists of two sections, the first (from the left) is the increment field in which dots may be printed; the second is the inter-character space. Within the increment field, two or more increments are equally spaced. Their spacing is a programmable parameter called "transitions per increment," TPI. TPI is often also referred to as the radix of the character and is a function of character width or pitch. The number of increments per character, IPC, is also programmable. Since an increment occurs at both the beginning and end of the increment field, the width of the increment field (in transitions) is given by TPI×(IPC−1). The inter-character space has no fine structure and is directly programmed as transitions per space, TPS. As the name implies, dot printing is inhibited (i.e., no increments occur) in the inter-character space. A character cell's width is equal to the sum of the widths of the increment field and the inter-character space, so that total width is given by:

WIDTH   TPI×(IPC−1)+TPS.

The diagram below illustrates a single cell of width 40, IPC 13, TPI   3, and TPS   4:

I..I..I..I..I..I..I..I..I..I..I..I..Isss where I represents an increment, s represents a space, and the "." symbol represents any other transition.

Each of the parameters mentioned above—TPI, IPC and TPS—can be programmed into the PCC from the processor 52 to select a particular font compression or pitch. While printing, the PCC counts transitions and increments so that it knows when a character boundary, increment or space is occurring.

Figure 11:
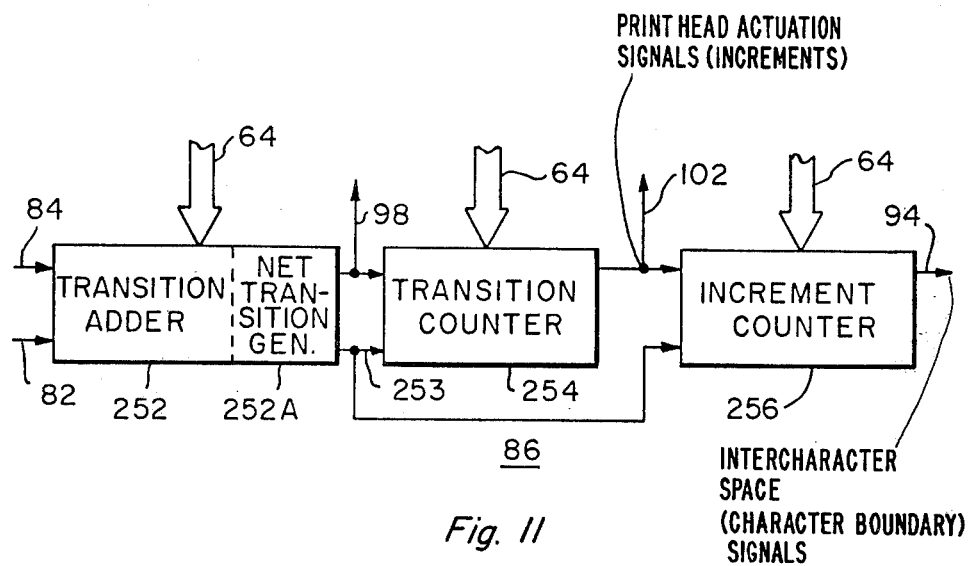
FIG. 11 is a detailed block diagram of the transition and increment counter of FIG. 4.

The counting of transitions and increments is done by a transition and increment counter 86, which includes a transition counter for counting transitions and an increment counter for counting increments (see FIG. 11). Each of these counters is a programmable radix up-counter which provides an overflow signal as its output. The overflow signal occurs on the arrival of the next counting pulse after (i.e., the stored count equals the counter's radix).

When the printing of a character is begun, the transition counter uses the value of TPI as a radix. Every time the transition counter overflows, an increment is generated which, among other things, causes the increment counter to change its count. When the increment counter reaches a count equal to IPC, the radix of the transition counter is changed to TPS, so that the proper inter-character space is generated. When the next increment is received, the increment counter goes to a value less than IPC (either 0 or IPC−1, depending on direction). At this time, a character boundary signal is generated and the radix of the increment counter again becomes TPI.

It can be seen that the transitions per space could be any non-zero number. However, the fact that the timers operate on every increment makes it desirable for TPC to be at least equal to the value of TPI. The counters involved can be initialized by a command from the sequential controller 50. Table 1, below lists several character pitches and the parameters that generate them.

TABLE 1

| CPI | TPC | IPC | TPI | TPS |
|---|---|---|---|---|
| 10 | 66 | 11 | 6 | 6 |
| 12 | 55 | 11 | 5 | 5 |
| 13.2 | 50 | 10 | 5 | 5 |
| 16.5 | 40 | 10 | 4 | 4 |
| 5 | 132 | 11 | 12 | 12 |
| 6 | 110 | 11 | 10 | 10 |
| 6.6 | 100 | 10 | 10 | 10 |
| 8.25 | 80 | 10 | 8 | 8 |

Where CPI means characters per inch and TPC means transitions per character (i.e., pitch). The first four rows represent normal pitches and the second four rows represent double width pitches.

Encoder signal processor 74 provides three output signals derived from the quadrature signals received from the shaft encoder. The first of these signals is a direction signal, on line 82, indicative of the direction of carriage motion. The direction signal is provided to position counter 72 in order to cause it to count either up or down, as appropriate. Carriage motion in a first direction will cause the position counter to count up and carriage motion in the other direction will cause the position counter to count down. A second output of the ESP, provided on line 84, is an encoder transition pulse signal. The latter signal comprises a pulse each time one of the two quadrature encoder signals on lines 42A and 42B changes state, indicating that the carriage has moved one transition distance from its prior position.

The pulses in the encoder transition pulse signal on line 84 are supplied to and counted by the position counter 72 for keeping track of changes in carriage position. Lines 82 and 84 are also connected to transition and increment counter (T&IC) 86 and line 82 is further connected to a pulse stretcher 88. The third output signal from the ESP 74 is a speed transition pulse signal on line 92; this signal comprises the second input signal to the pulse stretcher 88.

To implement the above-described performance capabilities, print commands must be given to the solenoids at varying (i.e., not fixed) positions relative to the "target" location at which printing is desired; the solenoid actuation (i.e., "firing") positions are functionally related to print head velocity, since the distance travelled by the print wires is fixed. Sequential controller 50 computes the required solenoid firing position and PCC 30 generates the actual signals which control solenoid actuation in accordance with the calculations of the sequential controller. The transition and increment counter 86 is the starting point within the PCC for the generation of the necessary control signals. T&IC 86, as its name implies, comprises a pair of counters for respectively tracking transitions and increments. Signal inputs for the T&IC 86 are the direction signal on line 82 and the encoder transition pulse signal on line 84. Since the carriage is moving while the printing operation takes place, the print rods must be "fired" from the moving print head before the carriage reaches the impact location. Normally, the mean value of this lead "time" is known for an average carriage speed, one of the system design parameters. However, carriage speed is variable in this invention and other, non-average speeds will require a greater or smaller lead (i.e., positional displacement) between print wire firing and impact, depending upon whether the speed is below or above average. Translating the lead into position units, there is a nominally known displacement (in transitions) between the impact position on the paper and the position of the print head when the solenoids are actuated. Appropriate circuitry is provided for reading the "position" indicated by the T&IC and triggering the firing of the solenoids when the position of the carriage indicated by the T&IC is the correct distance from the target position on the paper, for the then current carriage velocity. Thus, a preselected transition count (e.g., a count equal to the transition counter radix) in the T&IC comprises a trigger signal for the printing solenoids. The solenoids are actuated in response to the appearance of this count. Processor 52 supplies a transition add/subtract command to the T&IC via bus 64 to cause the transition count stored therein to be either increased or decreased. This creates a false or pseudo-transition reading in the T&IC; this reading may be used to actuate the printing solenoids by forcing the "triggering" count to appear at the position suggested by print head velocity. Thus, the transition count indicated in the T&IC to is shifted from the count registered in position counter 72 by an amount representing a flight time compensation count. That is, this difference represents the displacement, in transitions, between the point of solenoid actuation and the point of impact.

The transition counter portion of the T&IC 86 comprises a programmable radix counter, the radix of which may be set to correspond to either the parameter TPI or the parameter TPS. The increment counter portion of the T&IC comprises a counter having a single programmable radix corresponding to the parameter IPC. The radices are supplied from the sequential controller 50 via bus 64.

The transition and increment counter 86 provides three output signals. The first of these is a character boundary signal provided on line 94 to the print enable circuit (PEC) 96. The character boundary signal merely defers the execution of the print-start command until the print wire input position enters the cell of the character to be printed. The second signal provided by the T&IC, on line 98, is a net transition signal. Line 98 is connected to increment shift register 100 for supplying the net transition signal thereto. The third output signal provided by the T&IC, on line 102, is a primary increment signal. The primary increment signal is supplied to increment shift register 100 and to increment steering circuit 104.

Figure 5:
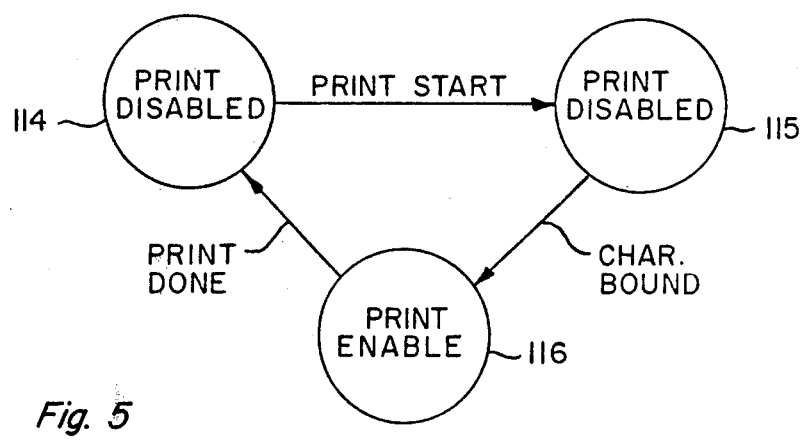
FIG. 5 is a state transition diagram of the Print Enable Circuit of FIG. 4.
Figures 6, 7:
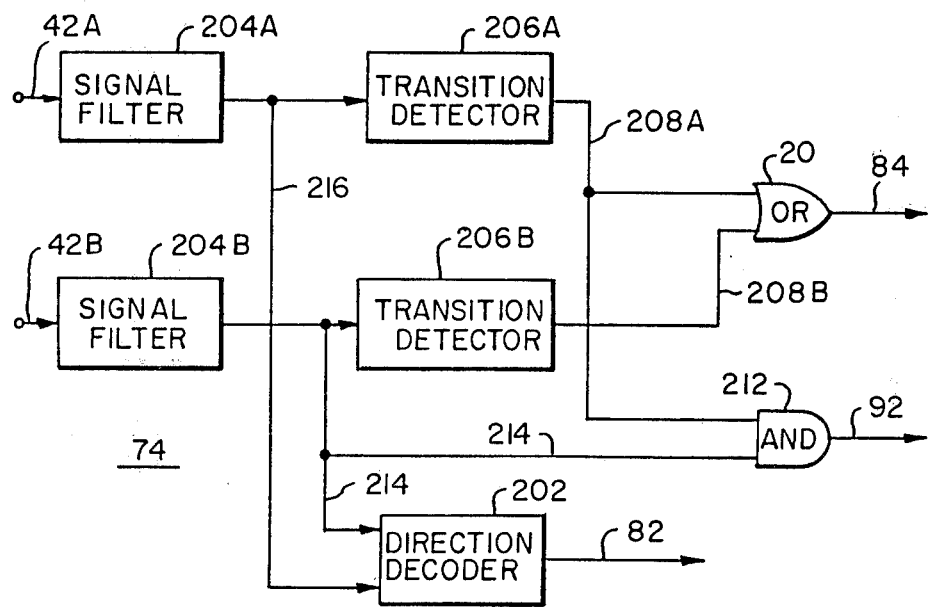
FIG. 6 is a state table for the Print Enable Circuit.
FIG. 7 is an overall functional block diagram of the encoder signal processor of FIG. 4.

The function of print enable circuit 96 is to provide internal PCC control (i.e., enablement and disablement) of the elements used to trigger the solenoids. Basically, the print enable circuit is a finite state machine the operation of which is defined in FIGS. 5 and 6. Remaining briefly with FIG. 4, however, it will be seen that the PEC 96 has three signal inputs and one signal output. The first signal input is the character boundary signal on line 94. The second signal input is a printing done signal on line 106 from buffer monitor circuit 108. Sequential controller 50 provides the third input signal, a print start signal, via bus 64. The output of PEC 96 is a print enable signal on line 112. The print enable signal is supplied to increment shift register 100 and to increment steering circuit 104. The print enable signal will assume a first logic state when printing is to be enabled and will assume a second logic state when printing is to be disabled. Referring now to FIG. 5, there is shown a state transition diagram illustrating the normal operational sequence of the print enable circuit. The PEC has three states, labeled respectively, 114, 115, and 116. Printing is disabled in states 114 and 115; only in state in 116 is printing enabled. Assuming initially that the PEC is in state 114, as it would be after printing has previously been terminated or at a time following initialization but prior to the start of any printing, a print start command from the sequence controller received via bus 64, will cause a change to state 115; at this point the PEC assumes control over the printing operation. Once the PEC is in state 115, it monitors the character boundary signal on line 94; when that signal indicates that the leading edge of the character cell boundary has been crossed, the PEC advances to its third state, 116, and provides the print enable signal on line 112 in the state which permits printing. The printing operation will continue until buffer monitor circuit 108 provides a printing done signal on line 106 to indicate that there is no more information to be printed. Upon receipt of the printing done signal, the PEC will return to state 114 and disable printing by changing the state of the print enable signal on line 112. Printing will not resume until another print start command is received from the sequence controller. Thus, the state 114 may be called an idle state, state 115 corresponds to a state of waiting for a character cell boundary and state 116 corresponds to the active printing state. The state transition table shown in FIG. 6 provides another description of the PEC, assuming a particular implementation in which the printing disabled condition corresponds to a logical "0" print enable signal and a logical "1" print enable signal permits printing to be performed. Corresponding assumptions are made with respect to the logic values of the PEC input signals. The symbol "X" is used in FIG. 6 to indicate, with respect to input, that either logic level may exist and, with respect to states, that any state satifies the condition.

It is noted that in the above description the term "character boundary" corresponds to the increment which makes the increment counter in the T&IC exit the intercharacter space. The term "increment" refers to that transition which makes the transition counter in the T&IC overflow; that is, count up from maximum to zero or down from zero to maximum. And "intercharacter space" is that interval during which the increment counter value is equal to its radix, (i.e., its maximum value).

Two dot buffer and timer circuits, 120A and 120B are provided. When a two-column (e.g., eleven-wire) print head is employed, one of the dot buffer and timers is associated with a first of the columns and the other dot buffer and timer is associated with the other of the columns. These might correspond, respectively, to five and six dot columns, respectively. When only one column of print rods is provided in the print head, such as for a seven-wire head, both dot buffer and timer circuits are operated in parallel. The dot buffer and timer circuits receive character dot data from the processor and fire the corresponding print solenoids at appropriate times. Each dot buffer and timer circuit includes a plurality of registers, a register controller, an output buffer and a timer. The registers are preferably arranged as a first-in-first-out (or fifo) stack buffer. One of the registers in the stack is an input register which is loaded by the processor; another register comprises an output register. Data propagates through each register, beginning with the input register, until it eventually reaches the final, output register. The output of the output register is gated to the print head amplifiers at a precise point in the head travel and is held for a precise amount of time, as controlled by a timer in the dot buffer and timer circuit. The purpose of the dot buffer and timer circuits is to allow the processor 52 to supply dot data for the print head asynchronously with respect to the time that such data is needed for actuation of the solenoids. The controller in the dot buffer and timer circuits consists of a memory which tracks the presence, in each register, of data to be printed together with logic which causes all data to advance as far as possible through the fifo stack. The controller detects when the timer has ceased actuating the output buffer and thereupon advances the data in the registers. This creates space at the input of the stack. A buffer status signal is supplied on lines 122A and 122B to buffer monitor circuit 108. When a predetermined number of spaces exist in the fifo stack(s), as indicated by the buffer stack signals to the buffer monitor, the buffer monitor generates a dot data request signal to the processor, on line 124. The processor then supplies more data into the dot buffer input register. When both buffer stacks are completely empty, the buffer monitor generates a printing done signal on line 106, to reset the PEC 96.

The timer in each of the dot buffer and timer circuits is used to cause the dot data to be presented to the printing element (i.e., solenoid) for a programmable amount of time determined by the characteristics of the element being controlled. The timer consists of a binary counter which counts a programmable number of clock cycles. It starts counting on command of the increment steering circuit 104, unless already running. Each time the timer halts, it supplies a signal to the stack controller to allow new data to be presented to the output buffer.

The output buffer in the dot buffer and timer circuit allows the output of the stack to propagate to the print head whenever the timer is running.

Each register in the fifo stack in the dot buffer and timer circuits 120A and 120B contains storage sufficient for one vertical column of dots. In the particular implementation shown in the drawings and discussed herein, one of the dot buffers contains five-bit registers and the other contains six-bit registers, thus providing for the control of a maximum of eleven printing solenoids in the print head. It is readily possible, of course, if only a single column print head is to be employed, to use but one dot buffer and timer circuit having the same number of bits per register as the number of print wires. The increment shift register 100 and increment steering circuit 104 also become unnecessary in the latter application, as the single dot buffer and timer circuit is directly controllable by the primary increment signal, explained below.

With a two column printing head, solenoid control is complicated by the fact that the two columns of wires are physically displaced, or separated from each other, in the horizontal direction. Therefore, in order to print a single vertical line of dots, the trailing set (i.e., column) of wires must be fired a number of transitions later than the leading set—the number of transitions corresponding to the displacement between the two columns of wires, measured in transitions. Thus, the two columns of wires are provided with two different firing control signals. These are referred to as primary and secondary increment signals. The primary increment signal fires the leading set of wires and the secondary increment signal fires the trailing set of wires. When printing, the secondary increment repeats the primary increment pattern, only delayed by the necessary number of transitions. It should further be noted that printing may be done either left to right or right to left. In one direction, one of the columns will be the leading set and the other will trail; but the situation will be reversed in the opposite direction, with the other column being the leading set.

The primary increment signal is generated by the transition and increment counter 86 and is provided on line 102 to the increment shift register 100 and increment steering circuit 104. Increment shift register 100 performs the transition delay function for generating the secondary increment signal therefrom. The secondary increment signal is provided on line 126 to increment steering circuit 104. Net transition signal 98 is essentially used as a clocking signal for increment shift register 100.

When the printer is operated in the two column print head mode, the increment steering circuit directs the primary increment signal to the dot buffer and timer for the leading set of print wires and the secondary increment signal to the dot buffer and timer for the trailing set of print wires. When the printer is operated in the single column print wire mode, increment steering circuit 104 directs the primary increment signal to both dot buffer and timer circuits, as the secondary increment signal is not used.

The PCC also drives the carriage motor amplifier in the carriage servomotor system, for controlling carriage motor speed. Carriage motor speed control is accomplished by a servo system. Processor 52 determines the maximum possible carriage speed based upon the highest solenoid actuation rate at which the print solenoids will operate properly and which may be maintained without causing overheating. It provides a speed command signal via bus 64 to bit rate multiplier (BRM) 132. The BRM is of conventional design and provides two output signals. The first of these is a command sign signal, on line 134, to indicate the direction in which the motor is being commanded to operate; the second of the BRM output signals is a command pulse signal on line 136, which provides the actual motor velocity information. The speed transition pulse signal on line 92 and the direction signal on line 82 comprise corresponding signals indicative of the actual motion of the carriage motor. These latter two signals are received by pulse stretcher 88 which, in turn, supplies the feedback signals required in the servo loop. A feedback sign signal is provided on line 138 and a feedback pulse signal is provided on line 139. The speed steering circuit 142 connects lines 136 and 139 to the appropriate output pins 144 and 146 in accordance with the associated sign signals carried on lines 134 and 138 respectively. These pulse trains are received by the carriage motor amplifier 38 which integrates these pulse signals to obtain their average values. The carriage motor amplifier is the "error" amplifier of the carriage motor servo; it determines the difference between the commanded speed and direction and the actual speed and direction of the motor and provides a drive signal to the carriage motor to drive the carriage motor toward the commanded speed.

The command given to the servo mechanism by the BRM consists of a stream of narrow pulses. The pulses in the speed transition pulse signal on line 92, containing the motor speed information used for feedback, have the same width as the BRM command pulses; however, there are several, e.g., eight, command pulses for every speed transition pulse provided on line 92. The servo mechanism is designed, typically, to respond to the average value of the command pulse the feedback pulse signals; thus, it becomes necessary to "stretch" the speed transition pulses a commensurate amount. This is done by producing for every speed transition pulse on line 92, one feedback pulse on line 139, which feedback pulse is eight times as long as the speed transition pulse. For example, if the command pulses are each 6.5 ms in width, the feedback pulses are approximately 52 ms in width.

In FIGS. 7-12, there is a further breakdown, still on the block diagram level, of some more of the blocks shown in FIG. 4. FIGS. 7-10 provide a breakdown of the encoder signal processor 74. An overall block diagram of the encoder signal processor is shown in FIG. 7. The purpose of the encoder signal processor is to convert quadrature encoded squarewave position signals, received on lines 42A and 42B from the two encoder tracks, into transition event and direction signals that can be counted in up/down counters and used to trigger transition-related events. The encoder signal processor which performs these functions consists of a direction decoder 202 and, for each of the two channels of encoder signal input, a signal filter, 204A or 204B, and an associated transition detector 206A and 206B. The outputs of the transition detectors on lines 208A and 208B, respectively, are combined together by OR gate 210 to provide the encoded transition pulse signal which is supplied to the position counter 72 and T&IC 86 on line 84. The speed transition pulse signal is provided on line 92 by AND gate 212 which receives as its inputs the transition detector output signal on line 208A from one of the channels and the input of the transition detector 206B of the other channel, on line 214. Direction decoder 202 receives the outputs of the two signal filters on lines 214 and 216 to provide the direction signal on line 82. It will thus be seen that the encoder transition pulse signal provides a pulse each time there is a state transition in either of the two signals provided by the encoder, and that the speed transition pulse signal provides a pulse when there is a transition on one of the channels while the other channel is in the "1" state. In steady state operation, a speed transition pulse will appear on line 92 every fourth transition. In the specific implementation discussed herein, the width of these pulse signals corresponds to one clock period of the system clock.

The output of the direction decoder is, by contrast, a level which represents the sign (+ or −) of the transition and identifies which of the two quadrature signals leads in phase.

The purpose of signal filters 204A and 204B is to remove short duration noise pulses from the signals on line 42A and 42B so that they do not cause false outputs and false responses by the transition detectors and direction decoder. It has been found particularly desirable to implement the signal filters as majority vote circuits which compare two new samples of their input with the previous output. The outputs of the signal filters are allowed to change state only if the two new samples agree with each other. For further reliability, an even greater number of samples could be used. The two samples of the input of the signal filter are taken at a normal system clock rate but approximately 180° out of phase with each other, thereby yielding a net sampling rate which is twice the normal clock rate.

Figure 8:
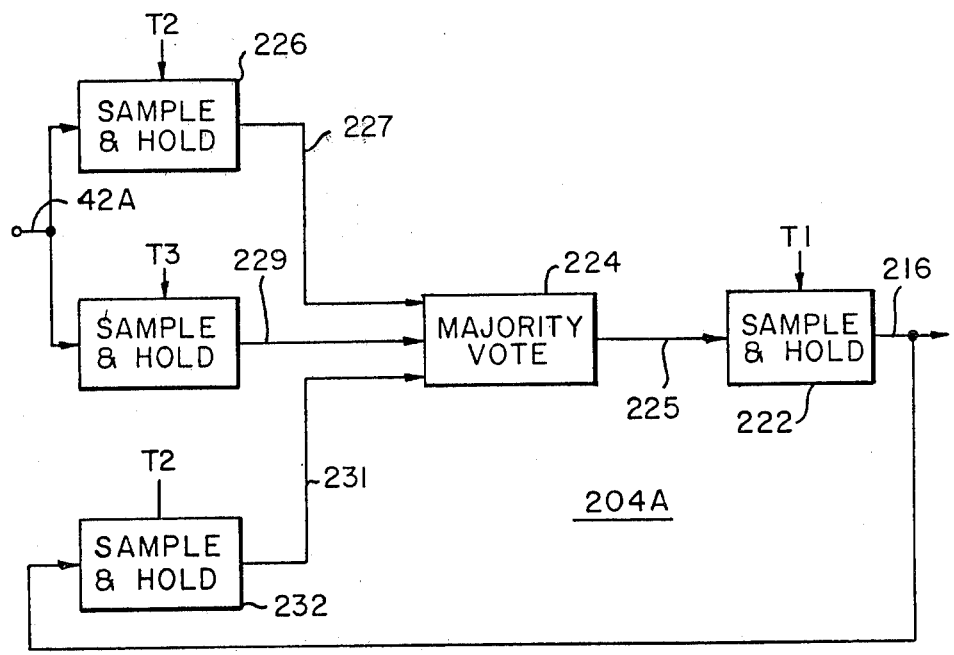
FIG. 8 is a detailed block diagram of the signal filters of FIG. 7.
Figure 9:
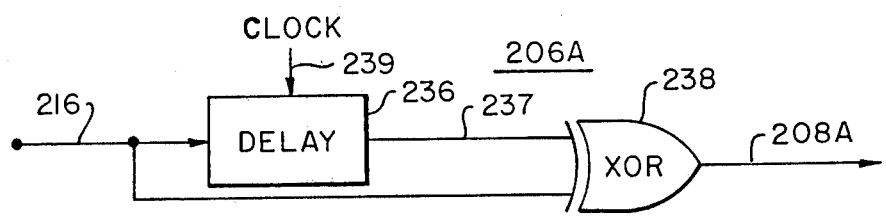
FIG. 9 is a detailed block diagram of the transition detector of FIG. 7.

An appropriate block diagram for each of the signal filter elements 204A, 204B is shown in FIG. 8. While the example is described in terms of signal filter 204A, it is equally applicable to signal filter 204B, of course. Four conventional sample-and-hold (S & H) circuits and a majority vote circuit are employed in each signal filter. The sample-and hold-circuit 222 provides the output of the signal filter which represents the signal provided by the majority vote circuit 224 at sampling time T1. The two signal samples are taken at times T2 and T3, respectively, by S & H circuits 226 and 229. The fourth sample and hold circuit 232, samples the prior output which is present on line 216 at time T2, as well. As explained above, sample times T2 and T3 are displaced from each other by approximately 180° but occur at the same rate, being derived from the same clock. Majority vote circuit 224 reads the outputs of S & H circuits 226, 229 and 232 appearing on lines 227, 229, and 231, respectively, and provides an output on line 225 corresponding to the state of the majority of its inputs. The signal input on line 42A is preferably synchronized so as to be stable at the T2 and T3 sample times. A clocked D-type flip-flop, Schmitt trigger or similar device (not shown) may be used for this purpose.

The purpose of the transition detectors 206A and 206B is to produce an event pulse each time their input signals change state. This is accomplished, for example, with the arrangment shown in FIG. 9. As shown therein, the transition detector 206A, for example, consists of a delay element 236 and an exclusive-OR gate 238. The output of the delay element, on line 237 and the input, on line 216, provide two inputs of the exclusive OR gate 238. This produces at the output of the exclusive OR gate, on line 208A, a stream of pulses each of whose width is equal to the delay time of the delay element. The delay time of one clock period of the system clock is satisfactory for this purpose. Thus, delay element 236 is shown as also receiving the system clock on line 239.

Figure 10:
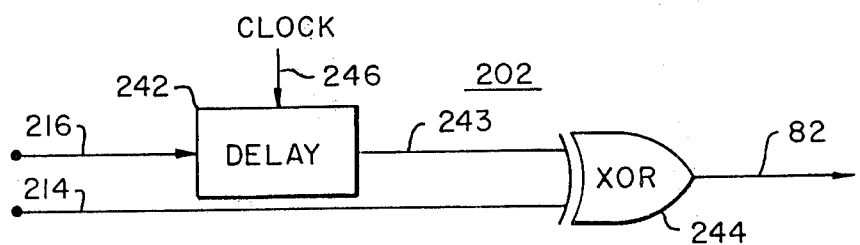
FIG. 10 is a detailed block diagram of the direction decoder of FIG. 7.

The output of the direction decoder 202 in the encoder signal processor accompanies each of the transition event signals (i.e., the speed transition pulse signal and the encoder transition pulse signal) to their destinations. The purpose of the direction decoder is to decode the quadrature encoded direction information in the two input signals on lines 42A and 42B, producing an output signal whose states correspond to the directions associated with the transition event pulses. One satisfactory exemplary implementation of the direction decoder is shown in FIG. 10. As illustrated therein, the direction decoder 202 consists of a delay element 242 and then exclusive-OR gate 244. One of the inputs, such as the one on line 216, is delayed by the delay element 242 and the delayed signal is provided on line 243 to one of the inputs of the exclusive-OR gate 244. The other input, such as the one on line 14, is supplied directly to the other input of the exclusive-OR gate. The output on line 82, if observed only during the periods when the encoder transition event signal is asserted, will (at those times) be in one state when the transition was in one direction and then the other state when the transition was in the opposite direction. Delay element 242, like delay element 236 provides a single clock period delay and receives a system clock as an input on line 246. It will be observed that if the clocking signals on lines 246 and 239 are the same, the outputs of the delay elements 236 and 242 are the same. Hence, a single delay element may be shared between the direction decoder and one of the transition detectors.

Referring to FIG. 11, there is shown a block diagram breakdown of the T&IC 86. The transition and increment counter 86 has three component elements: transition adder 252, transition counter 254 and increment counter 256. The transition counter and increment counter have already been alluded to above. The transition adder 252 basically operates under the control of the sequential controller 50 to provide the required offset in the count maintained in the transition counter from the count maintained in the position counter (i.e., the flight time compensation count) so as to cause the transition counter to produce the solenoid-actuating count at the appropriate location. When a two-column print head is used, the transition adder also "moves" the primary increment when the direction of printing changes, to account for the displacement between the two columns of print wires. Additionally, the transition adder serves to eliminate single transitions having opposite signs (i.e., direction) from the immediately preceding and following transitions, such as are produced by the operation of the transition add/subtract circuit. Other such signal transitions should not and would not occur but for the presence of "noise" and sampling inaccuracies.

Included within the transition adder 252 is a net transition generator 252A which actually provides the two transition adder output signals, the net transition signal (on line 98) and the net direction signal (on line 253). In addition to eliminating pairs of single transitions of opposite sign, the net transition generator 252A operates under the command of the sequential controller 50 to either add transitions on line 98 which are in addition to those provided on line 84, or to prevent pulses on line 84 from reaching line 98, in order to force the transition counter 254 to reflect properly the positional correction required for actuating the solenoids at the proper time. The net direction signal on line 253 is simply the direction signal which corresponds to the net transition signal on line 98; it is the direction signal on line 82 as modified by the operation of the net transition generator 252A in adding, subtracting or eliminating pulses.

Transition counter 254 comprises a programmable radix counter which may select its radix from two possible parameters, TPI and TPS, the values of which are set by the sequential controller 50 via the bus 64. Transition counter 254 is an up/down counter which receives counting direction control from the net direction signal on line 253 and which counts the pulses in the net transition signal on line 98. The output of the up/down counter is decoded to provide as the output of the transition counter a signal, termed the primary increment signal, on line 102 when the transition count of the up/down counter corresponds to the position at which the printing solenoids should be actuated. Increment counter 256 receives the primary increment signal and the net direction signal as inputs and provides the character boundary signal as an output, on line 94. The increment counter is a simple, programmable radix counter whose radix, corresponding to the parameter IPC, is set by the sequential controller via the bus.

Figure 12:
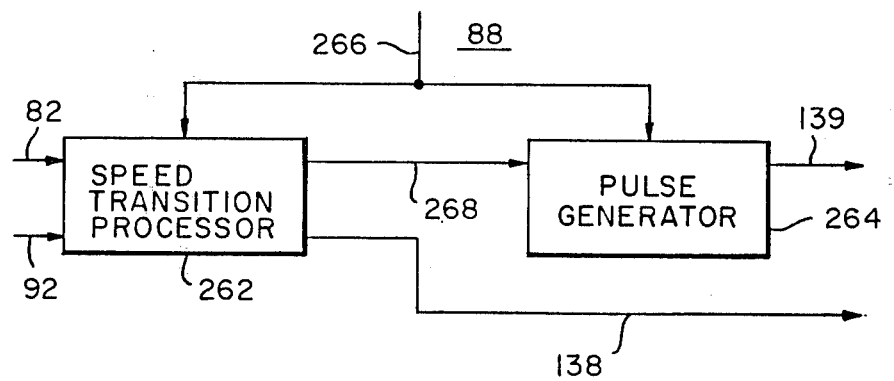
FIG. 12 is a detailed block diagram of the pulse stretcher of FIG. 4.

The third block shown on FIG. 4 to be broken down for further explanation of its structure is the pulse stretcher 88, shown in FIG. 12. The pulse stretcher comprises two components: speed transition processor (STP) 262 and pulse generator 264. The speed transition processor receives the direction signal on line 82 and the speed transition signal on line 92 as well as a 19.2 kHz pulse on line 266; its outputs are the feedback sign signal on line 138 and a feedback pending signal on line 268. The feedback pending signal comprises one of the inputs to pulse generator 264. The 19.2 kHz pulse signal on line 266 is the other input to the pulse generator, and the feedback pulse signal on line 139 is its output. The STP contains a one-bit memory of feedback sign and one-bit memory of feedback pending. If a speed transition occurs with a direction (i.e., sign) which matches the previously established feedback sign, the feedback pending signal is then asserted. The feedback pending signal is deasserted immediately after the next occurence of the 19.2 kHz pulse. If the direction of the speed transition pulse does not match the feedback sign, the feedback sign is changed, but no feedback pending signal is generated. The pulse generator 264 samples the feedback pending signal on line 268 each time a 19.2 KHz pulse occurs and asserts a feedback pulse on line 139 appropriately, thus producing pulses approximately 52 microseconds wide, eight times the width of the command pulses on line 136 from the bit rate multiplier 132.

As stated above, the sequential controller 50 is the commanding agent, or "brain," driving the PCC 30. Among other things, the sequential controller determines the flight time compensation count which is necessary and provides transition add/subtract commands to the transition adder to cause the net transition generator to feed a lesser or greater number of pulses to the transition counter, to produce the correct flight time compensation count. The sequential controller drives the carriage motor to the highest available speed consistent with satisfactory acceleration and solenoid operation. The upper limit on carriage motor speed is partially a function of the dot density of characters to be printed over a preselected time interval, so that the solendoid actuation rate does not exceed empirically derived bounds for satisfactory operation. Accordingly, the carriage speed is greater in blank regions, as the solenoid actuation rate does not impose a limit at all in those areas.

In the present implementation, the system clock speed of 2 MHz has been selected because it allows operation of the model 8080A microprocessor at nearly its maximum speed and when divided by 13, yields 153.6 kHz, to provide the 6.5 microsecond sampling interval used by the encoder signal processor 74. It also provides the clock signal needed by input interface 48 for serial data communication; in particular, it permits the use of many standard signaling rates such as 9600 bits per second and derivatives thereof. The same 153.6 kHz signal drives BRM 132. As a byproduct, the BRM provides a signal at 1/128 this frequency which, when divided by 3, provides the 2.5 ms sampling interval used by sequential controller 50 to process the readings of position counter 72.

Figure 13:
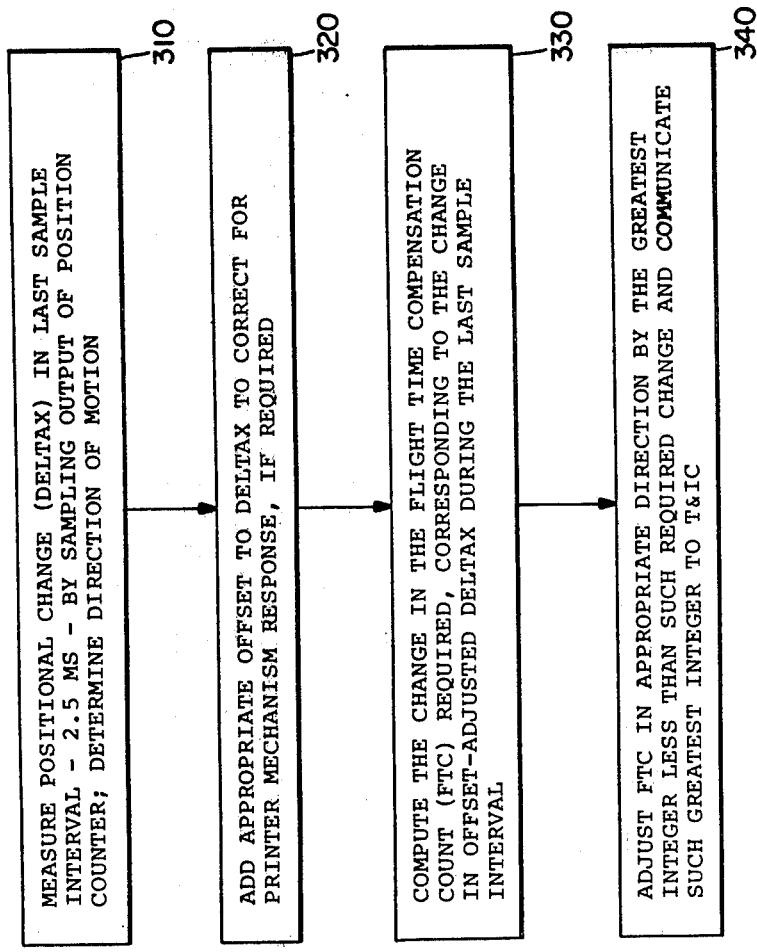
FIG. 13 is a diagram of the method steps involved in computing the flight time compensation count and for controlling the transition adder.

While the method employed by the sequential controller for flight time compensation may be generalized to the extent illustrated in FIG. 13, the flight time compensation count needed by a particular embodiment of this invention is a function of carriage velocity; if carriage acceleration is not kept low enough, the compensation function must depend on that parameter too, of course. The compensation available is limited by the velocity range resolved by minimally incrementing or decrementing the flight time compensation count. Since the compensation required is dependent on the mechanical parameters of the printer (i.e., the goal is to compensate for the finite flight time of print wires and other dynamically induced positional offsets), the actual compensation function needed is characteristic of the particular printer. The appropriate printer parameters may be obtained either by modeling or by empirical evaluation.

An illustration of the sequential method steps required for flight time compensation count derivation is shown in FIG. 13. The first step, 310, is to measure the positional change of the carriage which occurred during the previous inter-sample interval; this is labelled DELTAX. DELTAX is obtained by sampling the output of position counter 72 at each sample time (i.e., at the beginning and end of that interval). DELTAX is a signed variable and its sign indicates the direction of carriage motion during the interval time. Next, if required by the nature of the printer mechanism, an appropriate offset may be added to DELTAX, in step 320. The purpose of the offset is to compensate for mechanical "play" in the printer drive or other such factors which are functions primarily of direction and not velocity. In some systems, such offsets may not be needed for acceptable registration of printed dots. The next step, 330, is to compute the change in FTC required by virtue of the change in the offset-adjusted DELTAX observed during the last sampling period. The required value of FTC may generally be expressed as a function of offset-adjusted DELTAX. In the particular implementation using a printer mechanism similar to that employed in the model LA36 terminal manufactured by Digital Equipment Corporation, Maynard, MA, it has been found that this function may be expressed as a proportionality constant whose value is primarily determined by print wire flight time and secondarily determined by velocity-related mechanism variations, such as elasticity of the carriage driving linkage. Thus, the FTC connection function may be obtained from an expression in the form:

desired $FTC = KFTC$ (DELTAX + OFFSET ADJUSTMENT), where KFTC represents the proportionality constant.

Since the transition counter can only resolve integer multiples of a transition and the above calculation may lead to the computation of a desired FTC which differs from the position count by a non-integral number of transitions, the desired FTC can only be approached on a greatest integer basis. Specifically, the resolution obtained in the above calculation is equal to one transition divided by KFTC. Thus, in step 340, an add/subtract command is sent to the T&IC 86 to cause the net transition generator to add or subtract a number of transitions corresponding to the greatest integer in the difference between the prior FTC and the desired FTC, to cause the greatest integer in the desired FTC to become the new FTC.

While it may be possible to complete the above updating of FTC in its entirety during one inter-sample period, it has also been found that if acceleration is low enough, the updating may be done at a slower rate, even as slow as one transition add or subtract per sample interval.

With the foregoing as background, a specific embodiment of circuitry for the printer control circuit will now be described. First, however, to aid in understanding the actual circuitry, certain aspects of the system will be explained in greater detail and the circuitry will be introduced in the form of an apparatus block diagram. With that foundation, the detailed circuitry will be readily explainable and understandable.

Figure 14:
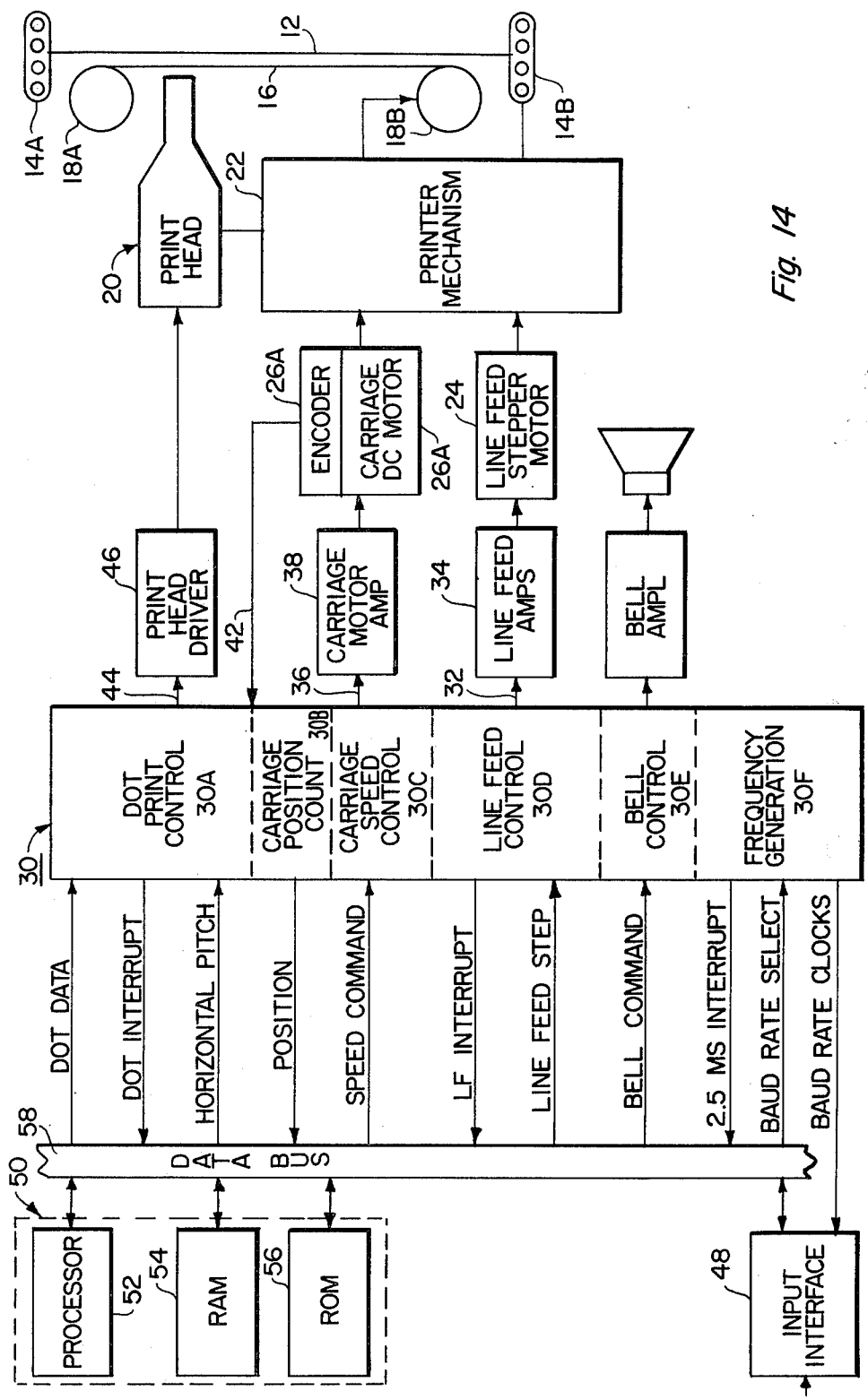
FIG. 14 is a functional block diagram similar to that of FIG. 1 but further detailing the microprocessor—PCC signal interchange.

FIG. 14 shows a system level block diagram in slightly greater detail than that shown in FIG. 1. FIG. 14 differs from FIG. 1 principally in that it shows the type of signals to be transmitted over the data bus 58. The printer control circuit is also shown in greater detail, illustrating its various functional subsections.

As shown in FIG. 14, the printer control circuit (PCC) 30 has six subsections: a dot print control section 30A, carriage position count section 30B, carriage speed control section 30C, line feed control section 30D, bell control section 30E, and frequency generation section 30F.

The PCC 30 performs functions which are beyond the capabilities of the microprocessor 52 and provides an interface between the microprocessor and the printer electromechanical components.

The dot print control section 30A provides the print head control signal which appears on line 44. It receives horizontal pitch information and dot data over the bus and supplies dot interrupts to the microprocessor to request additional dot data and signal when the dot buffer is empty.

The carriage position count section 30B receives the output signal on line 42 from the incremental shaft position encoder 26B and supplies a position signal to the bus, indicative of the carriage position.

Carriage speed control section 30C receives the speed command from the bus and supplies the carriage drive control signal on line 36 to the carriage motor amplifier 38.

The line feed control section 30D receives line feed step instructions from the data bus and supplies a line feed control signal on line 32 to line feed amplifier 34. The line feed control section also supplies a line feed interrupt to the processor, via the data bus.

The bell control section 30E drives a bell amplifier and loud speaker to provide an audio signal responsive to a bell command.

The frequency generation section 30F contains an oscillator and countdown chain which provides required clocking signals most of which feed elements internal to the PCC. The frequency generation section also provides tick interrupt signals at 2.5 ms intervals to the data bus. In addition, it supplies baud rate clocks directly to the input interface 48 responsive to baud rate selection signals received from the bus.

Microprocessor 52 receives interrupt requests and interrupt vectors from the printer control circuit (PCC) 30 and input interface 48 via bus 58. When powering up, the microprocessor reset line is asserted, thus starting program execution from location 0 with interrupts disabled. The PCC 30 will cause the processor to vector to one of four interrupt service routines, depending upon the source of the interrupt request. These are indicated by the table below:

| Interrupt Service Routine | PCC Dot Print | Input Interface | PCC 2.5 ms Clock Tick |
|---|---|---|---|
| Tick Service | F | F | T |
| Input Service | F | T | F |
| Tick Service | F | T | T |
| Dot Service | T | F | F |
| Dot Service | T | F | T |
| Dot Service | T | T | F |
| Dot Service | T | T | T |

As the above table indicates, the input interface interrupt is masked by either or both of the PCC interrupt sources, and the 2.5 ms clock tick interrupt is masked by the dot print control interrupt.

The PCC 30 is addressed by being mapped into a portion of the available memory address space of the processor. Memory references to addresses 0111 xxxx xxxx xxxx will select the PCC 30. Address bits A2–A11 are ignored for both read and write operations; A0 and A1 are also ignored for read operations. Due to the slow internal operation of the PCC 30 relative to the speed of bus transactions, write accesses must be at least 7 microseconds apart; there is no similar restriction on read operations. Most write operations to the PCC pass additional sub-addressing data in the data field.

In order to concentrate all of the control functions for the printer into one integrated, circuit, the PCC has been designed to include the following functions, in addition to the dot print control function which is disclosed in detail later in this document: carriage speed control, line feed control, frequency generation, tick alarm (i.e. a processor integrity check), and interrupt vector generation.

Carriage Speed Control

The voltage supplied to the carriage DC motor 26A is controlled by a pair of pulse streams. The first pulse stream has a duty cycle which is proportional to the binary value of a microprocessor-supplied speed command. The second pulse stream has a duty cycle which is proportional to motor speed. The integrated pulse streams are subtracted and integrated outside the PCC to yield an error signal which is fed to the motor. A steering circuit interchanges the roles of the two pulse streams to provide direction control, as a function of the directions of the speed command and the motor speed.

Line Feed Control

The line feed stepper motor is controlled by a 2-bit state word which controls the polarity of the voltage to the motor windings and the third bit which controls the amplitude of the current in the windings. Higher current is used for running the motor than for holding a steady position.

The timing of state changes during line feeding is completely under control of the microprocessor with the aid of a programmable timer interrupt which is made available by utilizing the countdown timer of the dot print control circuit in a timer mode rather than in a printing mode.

Frequency Generation

Many processes in the printer depend upon timing signals for proper operation. The master source of timing is an 18 MHz crystal which drives the clock. The clock provides a 2 MHz signal which is used by the microprocessor, the input interface, and the printer control circuit as their primary timing inputs. The 2 MHz clock input to the PCC is divided by a factor of 13, yielding approximately 153.6 kHz, to provide the clock which is used to drive most of the sequential logic in the PCC. A divider chain also produces 76.8 kHz, 38.4 kHz, 19.2 kHz, 9.6 kHz, 4.8 kHz, 2.4 kHz, and 1.2 kHz signals. A divide-by-three circuit produces 400 Hz. The signals from 153.6 kHz to 1.2 kHz drive a bit rate multiplier (BRM) in the carriage speed control circuit for the purpose of producing the signal whose duty cycle is proportional to the speed command. The 400 Hz signal provides an interrupt to the microprocessor every 2.5 ms which allows firmware-implemented, microprocessor-controlled processes to run periodically and thus be capable of performing time dependent operations.

A baud rate generator circuit further divides various outputs of the divider chain in order to produce baud rate clock signals for lower baud rates and split baud rates. A baud rate selector circuit allows the microprocessor to select various outputs of either the divider chain or the baud rate generator to be supplied as baud rate clock signals to the input interface.

Tick Alarm

In order to prevent a microprocessor failure from causing physical harm to power circuits or electromechanical components, the PCC has a special monitoring function which requires the microprocessor to prove its integrity by responding to a clear tick command (i.e., interrupt signal) every 2.5 ms. Failure to respond is proof of a malfunction and results in the disabling of most PCC outputs. The PCC powers-up with this so-called tick alarm activated, so that outputs are disabled until a programmed initialization sequence has been completed.

Firmware Overview

Scheduling

Firmware processes run at one of four priority levels, at any instant of time; they are, in descending order: interrupt level (with interrupts disabled), tick level, interlaced tick level and background level. Except for interrupt service routines, interrupts are normally kept enabled. The hardware interrupt vector scheme subdivides interrupts into two priorities, with input interface interrupts below all others. Firmware then further divides the higher level so that dot or timer interrupts take priority over tick interrupts.

Processes that run at background are the least time-critical, since background may be locked out by higher priority processes for short periods of time. On the whole, though, background gets the lion's share of processor time, typically more than 50%. Tasks that run in background include line image formatting and print scheduling. All printing, slewing and vertical motion is originally scheduled by background level routines even though executed at higher priority. When the processor is idle, it will be looping at background level.

Interlaced tick level processes execute periodically after non-interlaced tick. Every interlaced tick process runs once every one, two, four or eight ticks, where a tick is 2.5 ms. This is accomplished by a round-robbin scheduler, where each of eight phases is executed in turn on successive ticks. Each phase runs to completion before the next phase is begun. Examples of interlaced tick processes are the communications protocol handler for the input interface and the polling of interlock switches and operator controls and indicators.

Non-interlaced tick processing is begun immediately after taking a tick interrupt; interlaced tick follows its completion.

Servo control comprises all of non-interlaced tick processing. This level of processing must be guaranteed to finish before the next tick interrupt comes along.

Interrupt service routines are the most time critical and are kept as short and fast as possible. They include the dot buffer interrupt, timer mode interrupt, and input interface receiver ready interrupt.

Processes like initialization require that interrupts be off while running and thus effectively run at highest priority.

Print Control Firmware

One of the more complicated operations in the printer firmware is the starting of the print operation after a carriage return or tab. The PCC will only begin the printing operation after it has been given a print start command. This command will be executed at the next point at which printing legitimately can be started.

Starting the printing operation

The task of starting the print operation is handled in two steps. The first step is to prepare the PCC to begin printing. This is done once for every print start. On the next and subsequent ticks, tests are run to see whether the carriage has arrived at the proper location to begin printing and that it is travelling at the proper speed. These tests are repeated until printing is begun.

The forward printing process is begun by obtaining the first character to be printed from the line buffer and loading its dots into the dot buffer. The first four sets of dots are then loaded into the fifo of the PCC, the dot interrupt is enabled and the carriage is started on the approach to the starting point of the print string.

The reverse printing process is begun the same as that described above, except that all operations are for backward printing. The right-most character in the line is loaded into the dot buffer.

Print start is enabled by a print start command which is stored by the PCC and printing is begun when the print head wires cross the boundary of the intercharacter space in either direction. To initiate a forward print start properly, the command must be given before the impact point crosses from the intercharacter space of the previous character into the cell of the character to be printed. (The impact point is defined as the point on the paper at which the print wire would strike if its solenoid were energized at the then current position of the print head.)

As a practical matter, the print start command is given only when the impact point is in the Safe Print Start Zone and the carriage is moving in the proper direction. The Safe Print Start Zone begins three transitions to the right of the left hand cell boundary of the previous character and ends three transitions to the left of the intercharacter space of the same character cell.

This scheme assures that the print start is only executed when the impact point crosses the left hand cell boundary of the character to be printed. Premature print starts are thus avoided, as are print starts in the reverse direction which might otherwise be induced by unintended motions in the reverse direction. Such undesirable print starts would cause the characters printed subsequently to be displaced. Tests are therefore made by the microprocessor to assure that the carriage is travelling to the right at a speed which does not exceed the print speed by more than a small amount, that the impact point is in the Safe Print Start Zone, and that other conditions outlined below are met.

Other tests must be made before forward printing may actually be started. The first test is to see whether a vertical motion is in progress or pending, a cover is opened, paper is out, etc. If any of these conditions are true, the routine is aborted. Next the direction in which the carriage is travelling is checked. If it is negative, the routine is aborted, otherwise the tests are continued by computing the maximum permissible approach speed as a function of the print speed limit currently in effect. Then the position counter is read and a projected impact point is computed. If the impact point is to the right of the Safe Print Start Zone, the carriage has overshot the mark and the routine is aborted. If the impact point is more than 255 transitions to the left of the right hand border of the Safe Print Start Zone, the routine exits and no further tests are made during this tick interval, since there is time to do the tests during the next tick interval. If the impact point is within range, the following tests are made:

1. a check that the carriage speed is less than the maximum allowed;
2. a determination that the impact point is less than 34 transitions to the left of the right hand border of the Safe Print Start Zone; and
3. a test that the print head is not likely to stop or change direction in the near future.

If any of the above tests are failed, printing cannot be started at the current tick time, and the routine exits; otherwise, a go ahead for printing is issued and a final test is made to assure that the impact point is to the right of the left hand boundary of the Safe Print Start Zone. In the event that this test is failed, the routine aborts. If the test is passed, the print start command is given to the PCC and the address of the dot service routine is set up in the dot interrupt service routine and the printing operaiton is finally begun.

The procedure for initiating a reverse print start is the same as that used for the forward print start except that direction of motion is from right to left instead of from left to right.

Carriage Servo Firmware

The carriage servo firmware ascertains the current position of the carriage and generates the speed commands needed by the carriage servo to move the carriage to the position where it should be. Actual and desired positions are determined every time a tick interrupt is received, which is every 2.5 ms. The speed command given to the servo is then updated on the basis of these position determinations. This command is such that the carriage servo moves the carriage toward the desired position as rapidly as possible. As the carriage approaches the desired position, the speed is reduced to allow for a smooth stop.

The position of the carriage is measured by an incremental two-channel encoder mounted on the back of the carriage servo motor. Each channel has a square-wave output which produces 660 cycles per revolution, in phase quadrature. A transition is defined as the change of the output of one channel from the logical zero level to the logical one level, or vice versa. Thus, there are two transitions per cycle in each channel and since there are two channels, there are a total of four transitions per cycle and 2640 transitions per revolution.

The motor moves the carriage 4 inches per revolution. Hence, there are 660 transitions per inch of carriage motion and one transition equals 0.001515 inches. The carriage servo routines are entered every time a tick interrupt is received. The tick interrupt is cleared and the actual position of the carriage is determined. Speed, flight time correction, carriage position, and error are determined. A real time clock is also incremented.

Upon entry, the position counter in the PCC chip is read. Interrupts are then enabled. The previous reading of the position counter is retrieved and subtracted from the current reading of the counter and the difference stored for use in subsequent calculations. Since readings are made at fixed time intervals, the difference is a measure of the carriage speed. The value of the current counter reading is stored for use during the next tick interrupt service. The calculation is valid as long as the carriage did not move more than 127 transitions during the preceeding tick interval.

The determination of the command speed for the carriage servo is begun on the basis of how far the carriage is from where it is supposed to be. The actual target speed for the servo is obtained from a look-up table. This target speed is the speed input for a subsequent routine, where it is processed to generate the actual servo command. The sign of the target speed is chosen so that the carriage moves toward the point at which it is supposed to be and the target speed decreases as the carriage approaches its destination, so that it arrives there at a reasonable speed.

In general, the speed command is based on the target speed unless the change from the previous target speed was too large, in which case an acceleration limit is applied.

A speed error is computed by comparing measured carriage speed with the target speed. If this error exceeds the limit, it is an indication that the carriage is not moving as fast as it should be and that it may in fact be stopped completely. If the error exceeds the limit for a predetermined number of ticks in succession, it is presumed that the carriage is stuck. This causes a pause flag to be set; other pause flags are set when there is no paper or when the cover is opened. Before a speed command is sent to the PCC, the pause flags are examined. If no pause flag is set, the speed command determined as previously described is sent. If any pause flag is set, a speed command of zero is sent.

Dot Rate Limiting

As described above, there is a possibility that the print head could overheat if called upon to print excessively dot-dense text. Provision is therefore made in the firmware to monitor the rate at which dots are printed. If the rate exceeds a predetermined limit, the print speed is lowered. A suitable integration is performed to prevent short bursts of heavy printing from causing an unnecessary reduction in speed.

Character Processing

When a character is received and fully assembled by the input interface, an interrupt is sent to the microprocessor. This interrupt is serviced by the character reception routine. This routine reads the character from the input interface and checks for parity errors. If a parity error is detected, the character is converted to a SUB character. If the character is neither NUL or DEL (the all zeros and all ones codes, respectively) it is stored in the input buffer in RAM to be processed by the background executive routine.

Characters are processed by the background executive routine. The source of characters may be either the input buffer or (optionally) the local character slot, which may contain characters generated by operator controls. Local form feed and local line feed keys (typically found on terminal-type-printers) use the local character slot to merge their requests with characters from the input interface.

When the background executive has a character to process, depending on the mode and state of the printer, it forwards it to either the print line builder, escape sequence or the command processor, which interprets escape sequence commands which forwards it to either the print live builder or the escape sequence processor, which interprets escape sequence commands. Escape sequence commands are the user's means of specifying parameters such as character pitch, margins, tab stops, line spacing, and page length.

Principal characters are routed to the print line builder. Upon receiving a character, the first task performed by the print line builder is to determine if it is a control character or a graphic character. If the character is a control character, it is used to index a table of control routine addresses and an appropriate control routine is executed. For example, routines are required for handling horizontal and vertical tabs. They call other sub-routines which search a tab bit map table to find the first tab set past the current printing position. Each routine returns with a value that specifies what the active line or columns would be when the routine has finished. If the character is a graphic character, it is moved into one of two print line buffers after a certain amount of processing.

The processing of a graphic character requires look-up tables to convert certain codes in the various national languages to an internal code which will point to dot matrix representation of the character. Also, if the printer is in the alternate character set, the character is converted so that it points to the alternate character set dot table.

The print line buffer is then checked to be sure that the active column (i.e., the column in which the character is supposed to be deposited) is within the left and right margins. If it is outside these margins and auto-new-line is enabled, the character is not deposited in the current print line. The current print line is forced to be printed followed by a line feed. The active column is returned to the left margin. The result is as though a carriage return and line feed sequence was received just before the character. The character is then put into the next print line buffer at the left margin. If the character is outside the margin and the auto-new-line is disabled, the presence of the character means that printing is being attempted beyond the right margin. The character is discarded and an alarm is sounded.

Before attempting to deposit a character in the print line buffer, a test is made to be sure that there isn't a character already in the buffer at the active column. If there is, an overprint condition exists. Detection of an overprint prevents adding any more characters to the print line buffer until it has been emptied. A new print line buffer is made available and the character is written into the new buffer at the active column. Depositing a character in the print line buffer causes the active column to be incremented by one. Tests are performed to determine if the right margin warning alarm should be sounded and to see if the right margin has been reached. Other types of information stored in the print line buffers have to do with producing vertical motion between lines and sounding an alarm. Thus, a complete print line contains three types of information: alarm count, line feed step count and character codes. The character codes are positioned in the print line buffer at the same spot that they would appear on the paper. When a print line buffer is full or its printing is forced (due to overprinting, etc.), then the print line buffer is given up by the print line builder and traded for an empty print line buffer. When the full print line buffer is acted on by the printing routines, it has to be prepared before it can be used to start printing characters.

When a line is to be printed, a decision has to be made as to which direction the line is to be printed. A line is always printed forward unless it has vertical motion both before and after it. Also, a line is never printed in reverse which contains overprinting (i.e., a slash over a 0). Recall that a print line buffer is forced to print when overprinting occurs. When forced to print, the buffer is swapped with the empty buffer and the printing routines take over. Since the forced-to-print-buffer is not full, it doesn't have a vertical motion code at the end of the buffer. It has been sent to the printer for overprinting, not because there is a terminating line feed character at the end of the line. Consequently, the direction decision algorithm would find that this print line buffer does not have vertical motion both before and after it.

If the print line buffer is a complete line bracketed by vertical motion on both sides, then the print direction is decided by the direction algorithm. The algorithm remembers the last column printed on the previous line. If the previous line had characters from columns 1 to 100 and was printed from left to right, then the last column was 100. If the next line has columns from 25 to 125, the direction algorithm finds which of the limits is closest to the last column of the previous line. In this example, 100 is closer to 125 than 25, therefore the new print line is printed from right to left.

After the print direction has been established, it is necessary to look at the print line buffer in the interval between left-most and right-most characters to determine if a long sequence of empty positions is in the print line. The interrupt routine could search through as many as 215 empty positions to locate the next printable character. To prevent this, the firmware performs a housekeeping routine which scans the print line and converts the empty positions to real spaces (octal code 40) or inserts a special tabing command. The tabbing commands are interpreted by the printing routine to indicate that there is a long sequence of white space, to stop printing and start slewing the printhead. The routine also specifies where to stop slewing and again start printing characters. As an example, let us suppose a print line has characters from columns 1-10, then blanks from columns 11-100, and characters again from columns 101-110. The housekeeping routine would search the columns until it got to the blank in column 11. It would then start to count blanks. If it finds five empty positions in a row, the routine leaves the printing mode and executes a high speed slew to the next column in which characters will be found. When it finds the next character (in column 101), it will go back to column 11 and write a $-1$ value in that slot. This flags the column as the beginning of a high speed slew. During printing, when the print routine encounters the $-1$, it causes the print routine to stop and pass control to a high speed slew routine. The next column (12) contains the address of the column (101) in which is located the next printable character. Thus, the "look-ahead" housekeeping routine functions to speed up the rate or printing.

When the print line buffer is completely filled and the printing interrupt routine is free, the filled print line buffer is passed over the background printing routine. If there are any alarm signals specified in the print line, the code is passed over to the alarm or bell handling routine to sound a bell at a 400 to 2400 Hz rate at the proper time. If there are any line feed steps to be performed, the line feed routine will be called, at the appropriate time, to index the stepper motor. Any characters contained with the print line will call the printing routines which will be scheduled at the appropriate column and printing will occur. When the print line buffer has been completely processed by the printing routines, an executive routine pointer will exchange the empty print line buffer for the buffer just filled. The empty buffer will be zeroed and returned to the background where it will start accepting new characters.

Having thus described the operation of the printer and the PCC, in particular, and the relationship between the processor/firmware and the PCC, a detailed explanation of the PCC hardware follows.

Figure 15:
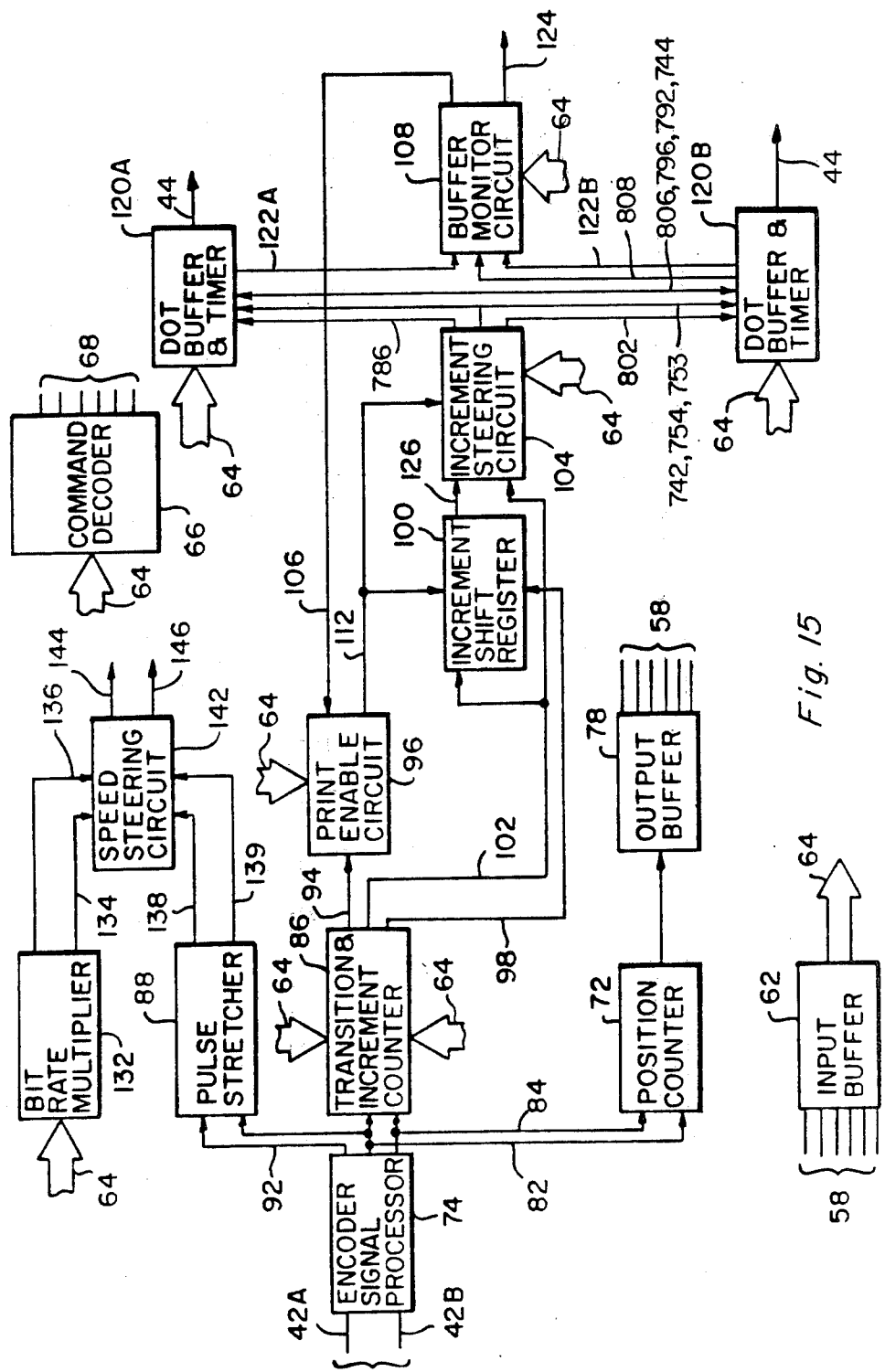
FIG. 15 is a modified version of FIG. 4, showing in greater detail the signal paths related to the control of the dot buffers and timers.

Attention is first directed to FIG. 15. FIG. 15 is a slightly modified version of FIG. 4 which more explicitly shows the interconnection paths between the increment steering circuit 104 and the dot buffers and timers 120A and 120B. Both FIG. 4 and FIG. 15 are functional block diagrams which are highly useful in explaining the operation of the PCC. The circuit structural elements of the PCC, however, do not correspond exactly, block-for-block, to the functional assemblies illustrated in those figures, since the functional block diagrams were dervied from the actual circuitry in order to facilitate understanding of PCC operation. A corresponding apparatus block diagram for a suitable hardware implementations of the PCC is provided in FIGS. 16A-16D. While all of the functionally of FIGS. 4 and 15 is provided by the apparatus of FIGS. 16A-16D, the apparatus of the latter figures further provides additional functionality which is not shown in FIGS. 4 and 15 and which is not necessary for the proper operation of the printer (e.g., the tick alarm feature, bell generation, etc.).

Figure 16A:
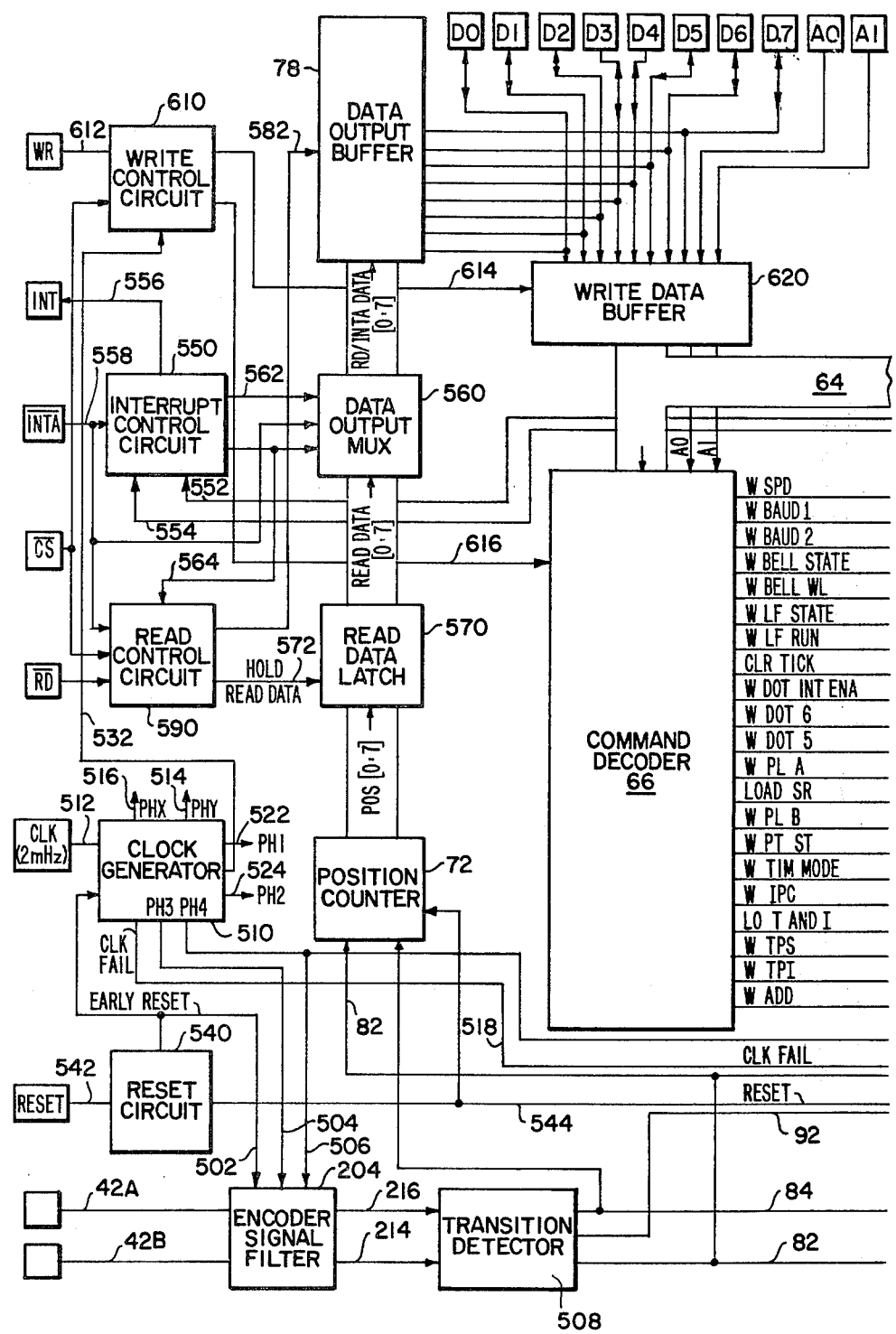
FIGS. 16A-16D comprise a detailed apparatus block diagram for the PCC.

Reference is now made to FIG. 16A. In that Figure, a one block encoder signal filter 204 is shown, corresponding to the two separate encoder signal filters 204A and 204B of prior Figures. Sampling signals for the encoder signal filter are provided on lines 502–506. The outputs from the encoder signal filter 204 are supplied via lines 214 and 216 to the transition detector 508. The latter corresponds to the transition detectors 206A and 206B and the direction decoder 202. Thus, the outputs of the transition detector 508 are provided on the same lines 82, 84 and 92 which are shown as the outputs in FIG. 7.

Clock generator 510 receives as an input on line 512 a 2 MHz nominal square wave signal designated CLK. From this input, the clock generator provides non-overlapping 2 MHz clock signals, PHY and PHX which appear, respectively on lines 514 and 516. The PHX and PHY signals comprise the internal 2 MHz clock signals used by the various elements of the PCC. The rising edge of CLK generates the falling edge of PHY. The falling edge of PHY generates the rising edge of PHX. The falling edge of CLK generates the falling edge of PHX. The falling edge of PHX generates the rising edge of PHY.

In the clock generator, a pair of capacitors are slowly charged toward a high level by the PCC supply voltage, Vcc, and are rapidly discharged to a low level via PHX and PHY, respectively. If either capacitor ever charges to a high level, then a high level is presented as an output signal, designated CLK FAIL, on line 518, to indicate a failure of PHX or PHY clock signals. So long as the CLK input signal continues to oscillate at or near a 2 MHz rate and the PHX and PHY signals are generated, the CLK FAIL output signal will remain at a low level.

Four additional clocking signals, designated PH1, PH2, PH3 and PH4 are also generated on lines 522, 524, 504 and 506, respectively. The signals PH1–PH4 are generated by a four-bit shift register whose states can be represented by the numbers 0 through 15 and whose major state transition sequence is 0-14-7-11-13-6-3-9-4-10-5-3-1-0. Minor sequences of 8-12-14 and Reset-15-7 both enter the major sequence. State transitions occur every 500 ns, thus providing a major sequence repetition period of 6.5 ms. The states are decoded to provide the PH1–PH4 clock signals at a rate of approximately 153.6 Khz. State 3 provides PH3, state 9 provides PH4, and state 0 provides PH2. PH1 is provided by a one-bit delay of PH2. A further output signal, PH1 DUE is provided on line 532 to provide an indication that a PH1 pulse is about to occur; this signal is used to reset the write control circuit 610.

The reset circuit 540 samples a RESET input signal on line 542 at the 2 MHz clock rate of the PHX and PHY signals. It provides an EARLY RESET signal to the clock generator 510 and encoder signal filter 204 via line 502 when a reset triggering signal is impressed on line 542. In addition, the early RESET signal causes the reset signal on line 544 to be on, to reset counters and logic throughout the PCC. When the early reset signal is off, it allows the clock generator to begin issuing PH1 and PH2 clock pulses. The second occurence of the PH1 clock pulse causes the RESET signal on line 544 to be turned off. This event terminates the reset state at all circuits that use the reset signal and allows normal operation to commence.

The interrupt control circuit 550 is the gateway through which interrupt request signals leave the PCC. Two type of interrupt request signals are generated in the PCC, tick interrupt requests and dot buffer/timer interrupt requests, designated respectively TINT REQ and DINT REQ. The TINT REQ signal is provided to the interrupt control circuit on line 552 and the DINT REQ signal is provided on line 554. The interrupt control circuit 550 samples these two interrupt request signals and the logical OR of the samples is presented on the interrupt (INT) output line, 556. The sampling occurs at the PHX-PHY clock rate, except during the interrupt acknowledge (INTA) pulse received in inverted state on line 558. The samples are held steady during the INTA pulse to provide steady interrupt vectors on lines 562 and 564 during the interrupt acknowledge cycle. Line 562 provides the interrupt vector from the dot buffer and timer upon request, designated D/T INT, and line 564 conveys the tick interrupt vector, designated TICK INT. These interrupt vectors are supplied to the data output multiplexer (MUX) 560, through which they are placed on the data bus to be read by the processor.

Data output multiplexer 560 comprises an 8-bit, 2-to-1 multiplexer which propagates the read data from read data latch 570 to the data output buffer 580 except during the INTA pulse, when it propagates the interrupt vector instead. For this purpose, the data output multiplexer receives the −INTA signal on line 558 and the D/T INT and TICK INT signals on lines 562 and 564. The interrupt vector consists of all one's except bits 4 and 5, which represent the TICK and DOT/TIMER interrupts, respectively.

The data output buffer 78 is a buffer comprised of 3-state drivers which present the position counter reading (through read data latch 570) or the interrupt vector onto the data output lines D0–D7 of the PCC, when enabled by an output enable signal on line 582 from the read control circuit 590.

Read control circuit 590 provides the output enable signal on line 582 which allows the data output buffer 580 to drive the data output lines D0–D7 during read and interrupt acknowledge cycles. It also provides a HOLD READ DATA signal on line 572 which strobes the read data latch 570 and thereby captures the position indicated by the position counter and prevents the position counter reading in the read data latch from changing during a read cycle or at any time that a tick interrupt request is pending. Holding the position count for reading purposes while a tick interrupt is pending makes the firmware speed calculations independent of interrupt service latency time.

As implied above, the read data latch 570 is simply a buffer for reading in parallel the position counter reading. The read data latch continuously keeps track of the position counter reading except during the on condition of the HOLD READ DATA signal, during which time its reading is frozen.

The position counter 72 is an 8-bit binary up/down counter which is set to all one's by the reset signal on line 544. The signal on line 84 provides the events that are counted. The signal on line 82 provides the direction or sign of the event.

Write control circuit 610 samples the signal on line 612, designated −WR, at the clock rate of the PHX and PHY signals, responsive to the PH1 DUE signal on line 532. The event of writing a command is detected and held until the next cycle at the PH1, PH2 clock rate. The write signal causes the command decoder 66 to issue a pulse on one of its 21 output lines, thus writing the data into one of the circuits. A write edge signal is provided to cause the write data buffer 620 to latch the address and data inputs for subsequent use during the assertion on the write signal or line 616.

Write data buffer 620 monitors the address lines A0, A1 and data lines D0–D7 and latches them during the occurrence of the write edge pulse on line 614. The output of the write data buffer is fed onto the internal PCC bus 64.

Command decoder 66, as its name implies, decodes the signals on lines D0–D7, A0–A1, and provides an output pulse on one of 21 lines during the write pulse on line 616, as a function of the address and data values indicated on the D0–D7, A0–A1 lines. Lines D0–D7 and A0–A1 provide the PCC connections onto the printer bus 58.

Figure 16B:
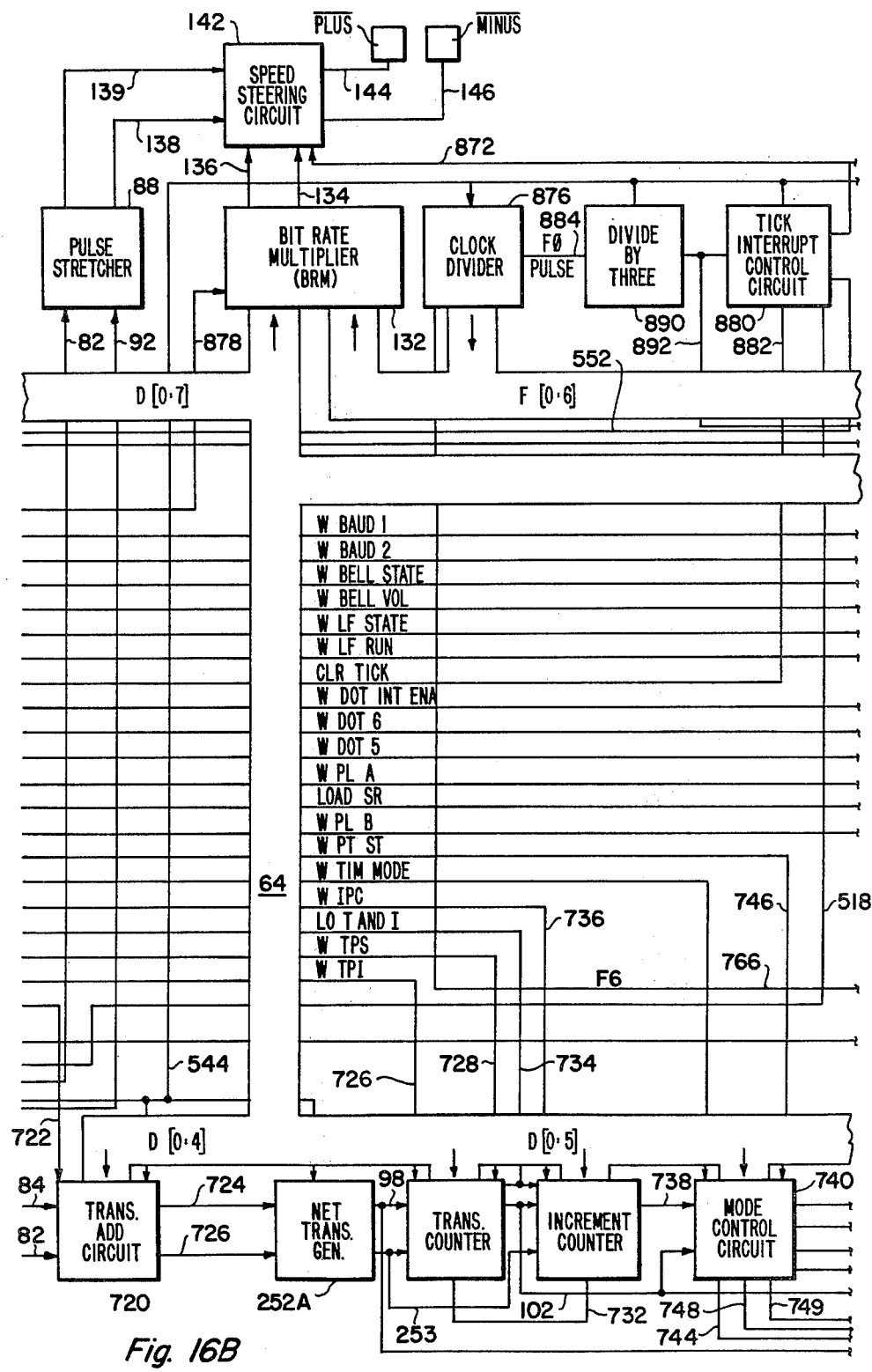

Reference is now made to FIG. 16B. The transition detector 508 from FIG. 16A supplies its output signals on lines 82 and 84 as inputs to transition and circuit 720. Transition add circuit 720 corresponds substantially, but not exactly to transition adder 252 of FIG. 11. The discrepency is principally that the net transition generator 252A is separately shown in FIG. 16B whereas it was included as part of transition adder 252 in FIG. 11.

The transition add circuit 720 is used to change the state of the transition counter 254 under firmware control. This change is effected by causing the transition count in the transition counter to be adjusted by the addition or subtraction of a desired number of transitions.

The transition add circuit 720 (see FIG. 18Z) contains a latch and a 4-bit synchronous counter. The controlling command, W ADD, is provided on line 722 from the command decoder 66. The command is in the sign-magnitude format, with the magnitude being negated in two's complement form. When a command is strobed in by W ADD, ADD PENDING and the transition signal which appears as an output on lines 724 are asserted, causing one transition to be counted by the transition counter for each cycle of the PH1 clock. If there is no transition on line 84 at this time, then output line 726 is set to the states corresponding to the command. The counter is incremented once per cycle of PH1 until a count of zero is reached, at which time the internal ADD PENDING signal is negated, thereby causing the transition signal on line 724 and the internal ADD-IN-PROCESS signal to be negated. The counter then stops.

It can be seen that in the mode of operation described above, the transition counter and the counter in the transition add circuit both change by one count when PH1 is asserted, as long as the count of the counter in the adder is not zero. In this manner, the comand is transferred to the transition counter 254.

If there should be an encoder transition during the process described above, the ADD-IN-PROCESS signal is negated and counting by the up counter is suspended. Line 726 is set to the state of line 82 and the encoder transition is counted. When there are no more encoder transitions, the transition add process is resumed, as described above.

Net transition generator 252A samples the TRANSITION RIGHT signal on line 726 whenever a transition occurs. The sample forms NET RIGHT and NET LEFT signals which are provided on line 253.

A 1-bit toggle to allowed to toggle each time the direction of a transition differs from the stored direction of the previous transition. The output of the toggle forms a REVERSAL PENDING signal. (The initial value of the REVERSAL PENDING signal is false.) Any transition which causes the REVERSAL PENDING signal to toggle is not allowed to propagate to the NET TRANSITION signal on line 98. Any transition which occurs while the REVERSAL PENDING signal is true (and which was allowed to propagate to the NET TRANSITION signal) causes the NET TRANSITION signal to be asserted for an additional clock period, thus propagating the transition that was stored in the reversal pending memory. The propagation of this transition clears the reversal pending memory.

Transition counter 254 receives preload values for assigning values to the parameters TPI and TPS from bus 64 responsive to the W TPI and W TPS signals on lines 727 and 728, respectively. The latter two command signals are provided under firmware control, over the bus 58, and are detected and decoded by the command decoder 66. The increment couner 256 provides a signal, SEL ICS, to the transition counter 254 on line 732. The SEL ICS signal controls a 4-bit multiplexer in the transition counter for presenting either TPI or TPS to that counter as radix information. The transition counter includes a 4-bit up/down counter which contains an exclusive-OR function in each stage. This exclusive-OR function compares the counter bit value with the radix bit value for that stage. When all four such states detect a matched condition, an internal signal designated T=MAX is true. When all four bits are zero, a signal T=0 is true. The control inputs of the counter are a toggle command, an up/down indication and reset and load commands. The NET RIGHT signal on line 253 provides the up/down count control indication. According to the convention adopted, counting up corresponds to rightward motion of the print head.

A net transition is counted by causing a toggle command, unless the T=MAX signal is true and the count direction is up, in which case the counter is reset to zero; if the T=0 signal is true and the count direction is down, the radix data from the multiplexer is loaded into the counter.

Figure 16C:
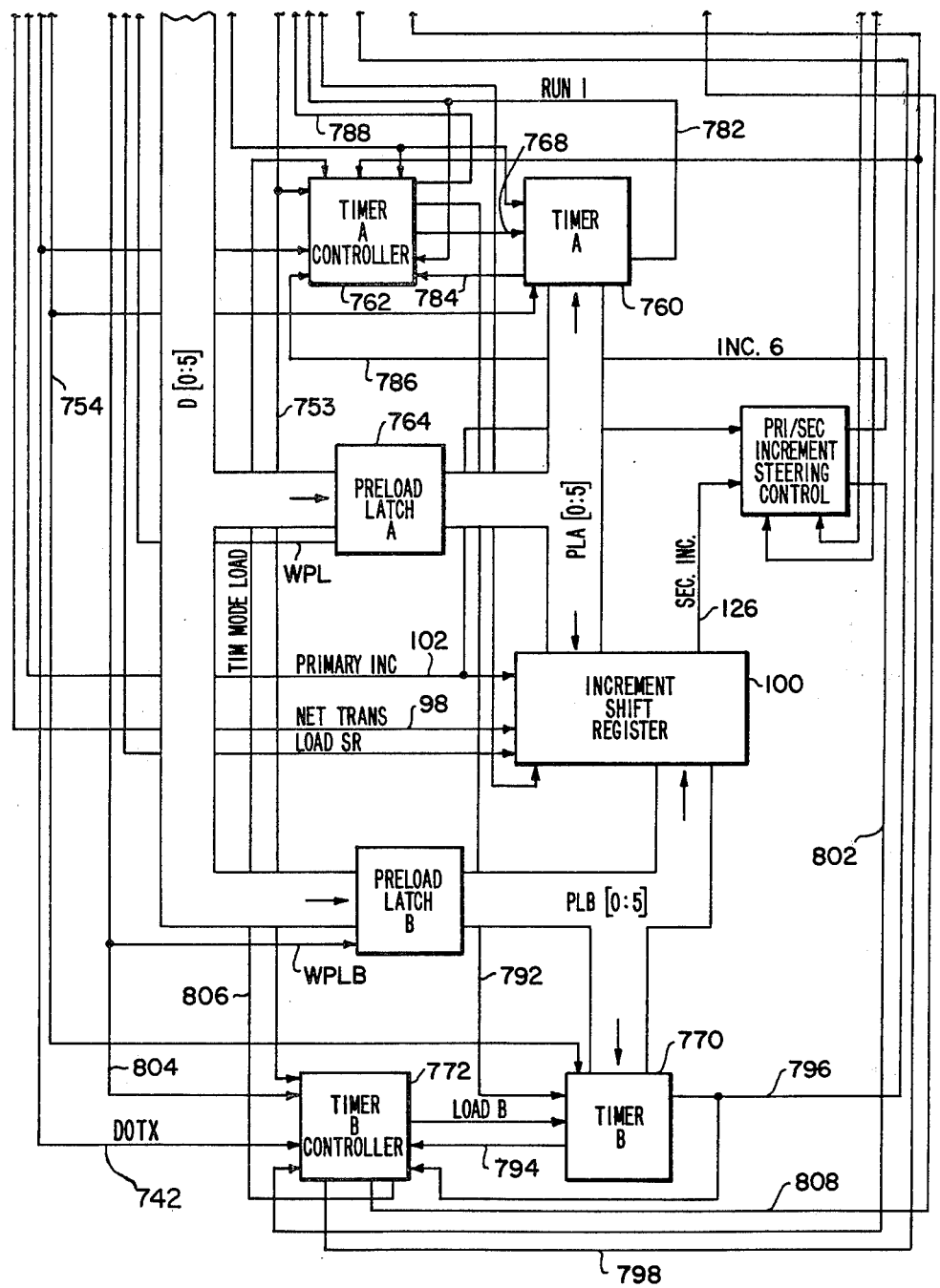
Figure 16D:
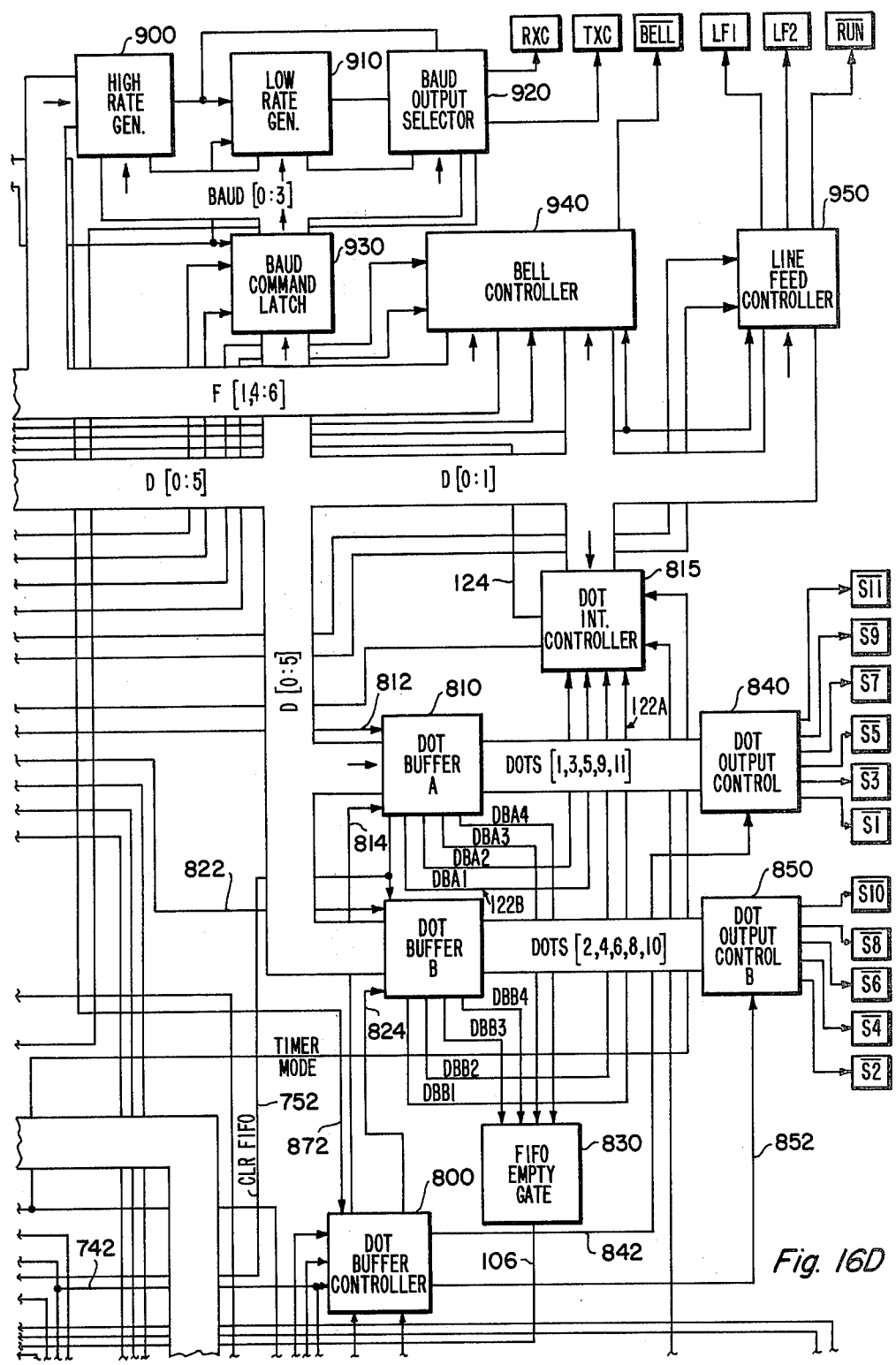

Either of the above exception events, (i.e., load or reset) constitutes a primary increment and is propagated to the PRIMARY INC signal on line 102 for use by the increment counter 256, the print enable function of mode control circuit 740, the increment steering circuit 750 and the increment shift register 100, the later two blocks being shown on FIG. 16C.

The LD T and I signal provided by the command decoder on line 734 allows the firmware to initialize the transition counter to any desired value. (Note that when the state of the signal on line 732 is not known, the TPI and TPS values must be identical for this operation.)

Increment counter 256 corresponds to that previously shown in FIG. 11. The desired increment counter preload value to set the radix of the counter equal to the parameter IPC is loaded under firmware control. The command signal is given through the command decoder on line 736 and is designated W IPC. The actual radix value is transmitted to the increment counter via bus 64. The increment counter comprises a 5-bit up/down counter which contains an exclusive-OR function in each stage. The exclusive-OR function compares the counter bit value with the radix bit value for that stage. When all five gates detect a match, the I=MAX signal, provided as an output on line 738, is true. When all five counter bits are 0, the I=0 signal is true. The control inputs of the counter are a toggle command, an up/down indication, and reset and load commands. The net right signal on line 253 provides the up/down indication, with counting up corresponding to rightward motion of the print head. The print enable function in the mode control circuit 740 receives a character boundary indication whenever a primary increment occurs with the I=MAX signal being true. Thus, printing begins when exiting the intercharacter space in either the forward or reverse direction.

An increment is counted by causing a toggle command, unless the I=MAX signal is true and the count direction is up, in which case the counter is reset to 0, or unless the I=0 signal is true and the count direction is down, in which case the IPC value is loaded into the counter.

Either of the above exception events (i.e., load or reset) constitutes an intercharacter space and is propagated to the SEL ICS signal for use by the transition counter.

The LD T & I signal allows the firmware to initialize the increment counter to any desired value.

Departure from the functional block diagram of FIG. 4 has heretofore been minor. In the following discussion, however, more significant departures will be made in presenting the circuitry which performs the functions implemented by the blocks in FIG. 4.

By way of introduction to the explanation which follows, it will be observed that the dot buffer and timer blocks 120A and 120B are broken down into separate dot buffers and timers and that the control signals for those elements are shown in greater detail. Also, there is no print enable circuit standing alone, as the enabling of printing is a function performed by block 740, the mode control circuit, which includes within it a print enable circuit and elements of the increment steering function of block 104.

Timers 760 and 770 can be operated in different modes, responsive to signals provided by mode control circuit 740. Five modes are available, but only the three modes which constitute active print modes are necessary to the present explanation. The functionality provided by the other modes is not necessary to the printer operation and will be described out in passing. Mode control circuit 740 performs the print enable function, as above noted, as well as providing mode selection for both the primary/secondary increment steering control 750 and timers 760 and 770.

The print enable function has a single latched output, the DOTX signal, provided on line 742 to timer A controller 762 and timer B controller 772. The DOTX signal is off when printing is not enabled. When one of three printing modes is selected, the first primary increment that appears while the increment counter is at its maximum value will cause DOTX to turn on. DOTX remains on until either a fifo empty indication occurs or the printing mode is cancelled. The FIFO EMPTY signal is received by mode control circuit 740 on line 106, while printing mode initiation and cancellation signals are received on line 746 as the state of the W PT ST signal from the command decoder.

Operation of the primary/secondary increment steering control is governed by of a 2-bit start command ( W PT ST) which provides the data for the PRIM 6 and PRIM 5 output signals on lines 748 and 749, respectively. The PRIM 6 and PRIM 5 signals inform the primary/secondary increment steering control 750 as to which of the two columns of the print head (in a two column embodiment) is the leading column, so that it can direct the primary and secondary increment signals to the appropriate columns.

Mode selection is defined by the combination of states of the PRIM 5 and PRIM 6 signals. If either of these signals is on, a printing mode is selected. A print start command of 00 (i.e., both PRIM 5 and PRIM 6 in a 0 state) is interpreted as a print stop signal and is additionally decoded to provide a signal, CLR FIFO, on line 752, to initialize the dot buffers 810 and 820.

Mode selection for the timers is provided by the printing mode selection circuit 740 and an additional 1-bit command, W TIM MODE, which is used to initiate a general purpose timer mode of operation for the timers. It is an undefined condition for both the timer mode and a printing mode to be on at the same time. If both the timer mode and all of the printing modes are off, a NO MODE signal is presented on line 754, to reset the timers to the done state when they are not in use.

The operation of timer A, 760, is further controlled by timer A controller, 762, and preload latch A, 764. Correspondingly, timer B, 770, is also controlled by timer B, controller 772 and preload latch B, 774. Preload latch A, 764, is used mainly to hold a preload count for timer A, 760. However, it is also used to preload the six low-order bits of the increment shift register 780 when required. The preload latch 764 is loaded from the internal PCC bus 64 in the usual and conventional manner. The outputs of preload latch 764 go to timer 760 and to the low-order six bits of increment shift register 780.

Timer 760 is a 6-bit preloadable up counter used to generate a predetermined time interval by counting cycles of the 76.8 kHz clock signal F6, appearing on line 766. The load input of timer 760 is controlled by the signals supplied by timer A controller 762 on line 768. When the signal on line 768 is asserted, the counter is loaded from preload latch 764 with the desired number of cycles to be counted, in two's complement form. The contents of the counter are sampled by an OR circuit which asserts a signal, RUN 1, on line 782 as long as any stage of the counter is not 0. The RUN 1 signal gates the F6 signal, causing the counter to run until the count reaches 0, signifying that the preloaded number of cycles have been counted and that the desired time has, therefore, elapsed. At that time, a pulse is placed on line 784 which provides a signal, designated CARRY 1, to indicate the end of the interval. The NO MODE signal resets the counter to the all 0 state.

The basic function of timer A controller 762 is performed by circuitry which accepts an enable, a run status, and a start command as input, and delivers a load command on line 768 as output. The additional logic of timer A controller allows timer A to work either in printing mode or timer mode, as explained earlier. In printing mode, the INC 6 signal on line 786 starts the timer. The INC 6 signal is supplied by the primary/secondary increment steering control 750. The starting of the timer consists of waiting until the timer is not running (which requires a 1-bit memory), then issuing a pulse on the LOAD 1 signal on line 768; this pulse loads the output of the preload latch 764 into the timer 760, which is actually only an counter. The carry output of the high order bit of the timer, supplied on line 784 as the CARRY 1 signal, propagates through the timer A controller 762 to become the DONE PULSE 1 signal on line 788.

There is a provision for overrunning start requests which can occur if the instantaneous print speed is too high. If a second start request occurs with the timer running, a load occurs immediately and a DONE PULSE is produced, thus aborting a dot enable cycle early, but never missing a complete cycle due to the overrun.

In timer mode, the special circuitry which delivers the load command is disabled and timer A runs any time that timer B, 770, is running. Each time that timer A stops running, if timer B is still running, a load pulse is produced, thus causing timer A to run again. Also, a pulse is produced on the COUNT 2 signal on line 792, which is supplied to timer B to cause it to count.

Timer B is similar to timer A except that it is also used as the high order part of a 12-bit counter used for timing long time intervals for line-feed control. The signal to be counted and the gating function for this counter are therefore generated outside timer B. The preload is obtained from preload latch B, 774. The outputs of timer B are a CARRY 2 signal supplied on line 794 to timer B controller 772 and a RUN 2 signal provided on lines 796 to timer B, timer No. A and dot buffer control circuit 800. The CARRY 2 signal propagates through timer B controller 772 to become the DONE PULSE 2 signal supplied to dot buffer control circuit 800 on line 798.

The timer B controller 772 contains separate circuitry for timer mode operation and printing mode operation. In printing mode, the circuitry for the timer mode is disabled and operation is similar to the operation of the timer A controller. The INC 5 signal on line 802 provides a start request which is combined with the RUN and CARRY inputs to yield load and done pulse outputs.

In timer mode, a command signal, W PL B, received on line 804, provides the start request, one cycle delayed from the loading of the preload latch 774, so that the data will be available to be loaded into the timer. The TIMER MODE LOAD signal provided by timer B controller 772 to timer A controller 762 on line 806 allows timer A to get loaded each time timer B gets loaded. Timer B controller 772 also provides a signal designated TIM BUF EMPTY on line 808 to dot interrupt control circuit 810, to request an interrupt, which is the ultimate output of the timers in timer mode.

Preload latch B, 774, is functionally the same as preload latch A, 764, except that it is used to preload timer B and the high order six bits of the increment shift register 780.

Increment shift register 780 is composed of dual input flip-flops configured into a 12-bit shift register (only 10 bits of which are actually used) with both serial and parallel input. This shift register is what makes it possible to print dot matrix characters with a print head having two vertical columns of print wires displaced from each other in the direction of travel. Primary increment information is feed serially into the shift register and shifted to the right every time there is a net transition and the printer is in the print mode. The primary increment signal which appears at the output after ten shifts is termed the secondary increment signal and is used to activate the trailing column of print wires. This shifting of information goes on even when a single column head is used, in which case the secondary increment information is not utilized.

When a font is selected, the shift register is preloaded with the increment pattern of that font, allowing secondary increment information to flow to the trailing wires as soon as printing has begun. The length of the shift register can be varied to accommodate different spaces between columns of print wires.

Primary/secondary increment steering control 750 consists of two simple AND/OR gates which direct the primary and secondary increments to the proper dot buffer. If the PRIM 6 signal on line 748 is asserted and the PRIM 5 signal on line 749 is not, the primary increment will appear on line 786 which carries the INC 6 signal, which will send it to dot buffer A 810, while the secondary increment will go to the dot buffer B 820. If the PRIM 5 signal on line 749 is asserted and the PRIM 6 on line 748, is not, the reverse distribution of increments takes place. If both are asserted, both dot buffers receive the primary increment.

Dot buffer controller 800 prevents timer run indications and Done Pulses from propagating to the dot buffers when the timers are operating in the timer mode. It also turns off the dot enable signals when a tick alarm occurs. Dot buffer A, contains a four-level, 6-bit wide, fifo buffer. Data enter the buffer during the W DOT 6 command which appears on line 812. The DONE 6 signal supplied by the dot buffer controller 800 on line 814 signifies that the output of the buffer 810 is no longer needed, and causes the data in each level of the buffer to advance to the next level. The presence of data in a particular buffer level is indicated by the Q-output of an internal fifo controller associated with that level. These Q-outputs are selectively referred to as DB1 [1:4] and individually as DB11–DB14; they correspond to the signals on lines 122A in FIG. 4. These signals are used by other circuits to monitor the activity in the buffer. The CLR FIFO signal on line 752 clears the Q-outputs of the fifo controllers, thus forcing a buffer empty indication on the DB1 [1:4] lines.

Dot buffer B, contains a four-level, 5-bit wide fifo buffer. Data enters this buffer during the W DOT 5 line command signal on line 822. The DONE 5 signal on line 824 signifies that the output of the buffer is no longer needed and causes the data on each level of the buffer to advance to the next level. The presence of data in a particular buffer level is indicated by the Q-output of an internal fifo controller associated with that level, as in dot buffer 810. The Q-outputs are collectively referred to as DB 2 [1:4] and individually as DB21–DB 24, corresponding to line 122B in FIG. 4. They are used by other circuits to monitor the activity in the buffer.

The CLEAR FIFO signal clears the Q-outputs of the fifo controllers, thus forcing a buffer empty indication on the Db2 [1:4] lines.

Fifo empty gate 830 consists of a 4-input AND circuit which samples the state of the two blocks or columns in each fifo which are nearest to the output. If none of these blocks contains any information, the FIFO EMPTY signal is asserted on line 744. The FIFO EMPTY signal is sent to the mode control circuit, which then issues a command to stop printing. Dot interrupt control circuit 815 issues interrupts for both the timer mode and the print mode. The dot interrupt is enabled by setting a latch to 0 from the data bus and is disabled by setting the latch to 1. In timer mode, an interrupt is issued when the TIM BUF EMPTY signal is asserted on line 808, indicating that an input is needed for the timers. In dot mode, the interrupt is issued when Db11, Db12, Db21, and Db22 are all asserted, indicating that there is room in the dot buffers for two complete columns of data. The interrupt is cleared by loading data into either the timer buffers (preload latches) or dot buffers, as appropriate.

Dot output control circuit 840 allows the data in dot buffer 810 to propagate to the output pins of the PCC when commanded to do so by the ascertion of a DOT ENA 6 signal on line 842 from the dot buffer controller 800. Sampling transistors are used between the AND circuit and output devices to eliminate transients in the output when the input data is switched.

Dot output control circuit 850 is similar to dot output control circuit 840 except that it controls only five outputs. Its input is obtained from dot buffer 820 and is controlled by the DOT ENA 5 signal on line 852.

Carriage motor control is effectuated through speed steering circuit 142 by the provision of control signals on lines 144 and 146. Speed steering circuit 142 accepts command signals from bit rate multiplier (BRM) 132 and speed feedback signals from pulse stretcher 88, and routes them to the proper output leads. If the command sign signal on line 134 from the BRM is high, signifying that the motor is to turn in a positive direction, the command pulses on line 136 are gated to the plus lead, 144, to cause the motor to turn in the positive direction. If the feedback sign signal on line 138 is high, it signifies that the motor and encoder are turning in the positive direction. The feedback pulses carried in the feedback magnitude signal on line 139 are therefor routed to the minus lead 146 so that a signal opposing the motor rotation is generated.

If the TICK ALARM signal on line 872 (from tick interrupt control circuit 880) is asserted, all of the outputs of the speed steering circuit are disabled.

BRM 132 receives data over the internal PCC bus 64 and clocking signals over PCC clock bus 874. The signals F [0:6] on bus 874 are square waves obtained from the clock divider 876. Their frequency decreases in binary progression, with F7 having a frequency of 76.8 kHz, F6 having a frequency of 38.4 kHz, etc. F0 has a frequency of 1200 Hz. The input to the BRM is the speed command transmitted on bus 64, i.e., bus data lines D [0:7]. The command is in the sign-magnitude format, with D7 carrying the sign and the remaining bits carrying the absolute value of the speed.

Upon receipt of a write speed (W SPD) pulse on line 878 from the command decoder, the data on bus 64 is stored in latches within the BRM. The sign bit on bus line D7 is sent immediately to the speed steering circuit. Nand circuits combine the remaining digits with the square wave signals on the frequency bus 874 to produce the BRM output pulse train. Thus, if bit D6 is asserted, a pulse is injected every time F6 is high. Since F6 is a 76.8 kHz square wave, there will be 76,800 pulses per second, each being 6.5 microseconds wide.

If F5 is asserted, there will be a pulse when F5 is high and F6 is low, forming a train of pulses 6.5 microseconds wide with a pulse repetition frequency of 38.4 kHz. The remaining data bits are treated in a similar maner. Thus, if D0 is asserted, there will be an output only if F0 is positive and F [1:6] are all negative. The net result is a train of 6.5 microsecond pulses with a pulse repitition frequency equal to the frequency of F0. Since none of the pulses generated by the clock divide overlap, the average duty cycle of the signal supplied to center the speed steering circuit by the BRM is directly proportional to the speed magnitude information contained on the lines D [0:6] of data bus 64.

Pulse stretcher 88 produces a 52 microsecond pulse for every speed transition received, except for the first transition following areveral in direction, which reversal is signalled by a change in state of the signal on line 82.

The operation of the pulse stretcher is otherwise as indicated above in connection with the description of prior figures.

Tick interrupt control circuit 880 generates a tick interrupt request on line 552 every 2.5 ms and monitors the acknowledgement of this interrupt request.

A positive edge detector generates a pulse every 2.5 ms. This sets a tick interrupt flip-flop, causing a tick interrupt request be asserted in the TINT REQ signal on line 552. The pulse also causes a tick alarm flip-flop to sample the state of the tick interrupt flip-flop. If the tick interrupt flip-flop had not been cleared by the CLR TICK signal from the command decoder on line 882, the tick alarm flip-flop is set to indicate that the previous tick interrupt request had not been processed in a timely manner. The tick alarm signal on line 872 disables all outputs of the PCC going to hardware devices, such as motors, print solenoids, etc. The TICK ALARM signal is also asserted by the RESET and CLK FALL signals, which indicate a failure of the basic clock signals of the PCC.

Clock divider 876 is a 7-bit synchronous binary counter used to generate the frequencies required by the BRM, baud rate generator, etc. A toggle accepts the 153.6 kHz frequency of the PH1 and PH2 clocks and divides it by a factor of 2 to produce a frequency of 76.8 kHz. This frequency is divided further by the up counters constituting the remaining six stages of the counter. The outputs F [0:6] provided on clock bus 874 are square wave signals that appear as the Q output of the stages of the divider. The output signal on line 884, designated F0 PULSE, supplied to a divide-by-3 stage 890 is the carry output of the last stage of the clock divider and constitutes a pulse train with a pulse repetition frequency of 1200 Hz. The RESET signal on line 544 sets the divider to the 1111111 state.

Divide-by-3 stage 890 produces a 400 Hz signal on line 892 from the 1200 hertz signal of line 884. The counting sequence is 00,01,10. The RESET signal sets the circuit to the 11 state, which is not reached in the counting operation.

High rate generator 900 and low rate generator 910 provide baud rate clocking signals at standardized baud rates by decoding the signals on the clock bus 874. Baud output selector 920 provides as an output either the high baud rate from high rate generator 900 or a low baud rate from low rate generator 910, the latter resulting from further division of the signals provided by the high rate generator. Baud command latch 930 receives baud rate selection commands over bus 64 and decodes them to control the selection of the baud rate clocks.

Bell controller 940 drives an audio alarm signal, such as a bell, to indicate various conditions which may be signalled to a user.

Line feed controller 950 generates the signal required by the line feed stepping motor. The desired state of the phase windings of that motor is stored under firmware control in internal latches. The desired state of the run transistor is similarly stored in a flip-flop. If the TICK alarm signal is asserted, the −R run output is disabled.

Figure 18A:
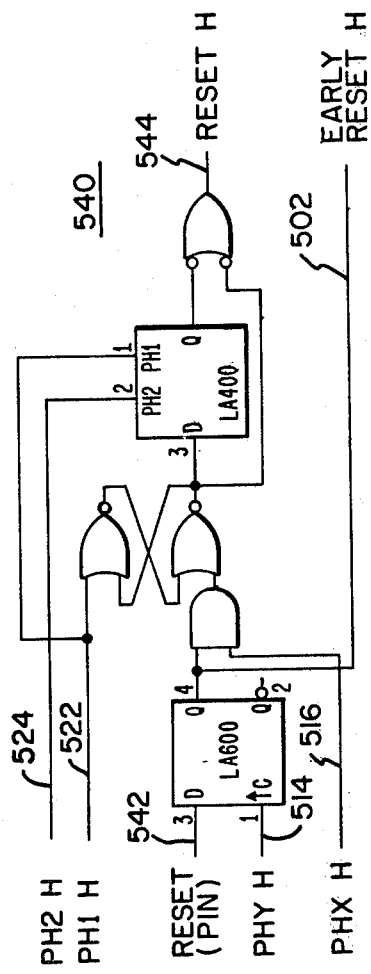
FIGS. 18A-18AR are circuit diagrams for the blocks in FIGS. 16A-16D, using circuit modules further shown in FIGS. 19A(1)-19AB(2) and FIGS. 19A(1)-19AB(2) are detailed circuit diagrams for the circuit modules identified in FIGS. 18A-18AR by the designations LAxyz, where xyz is a three digit number.
Figure 18B:
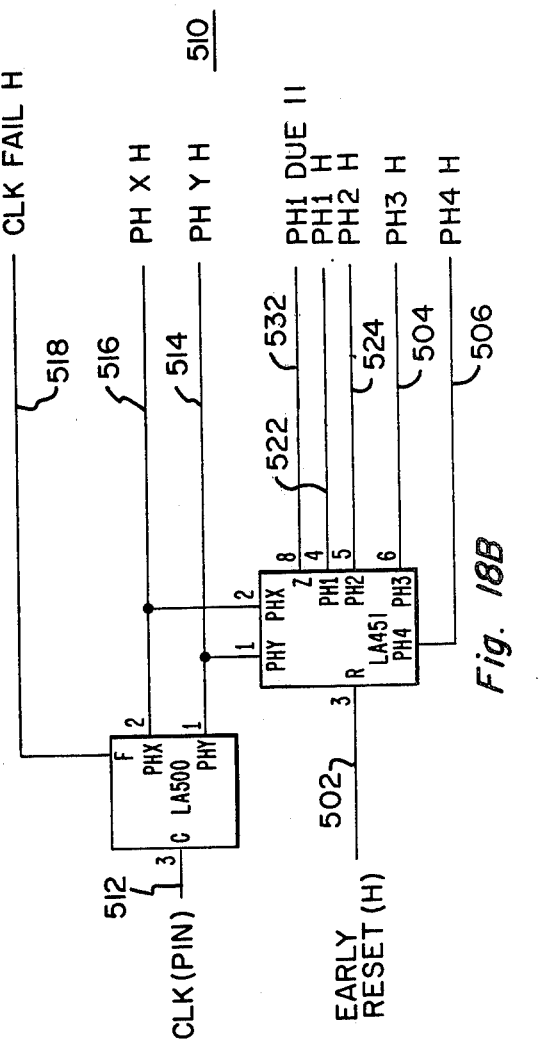
Figure 18C:
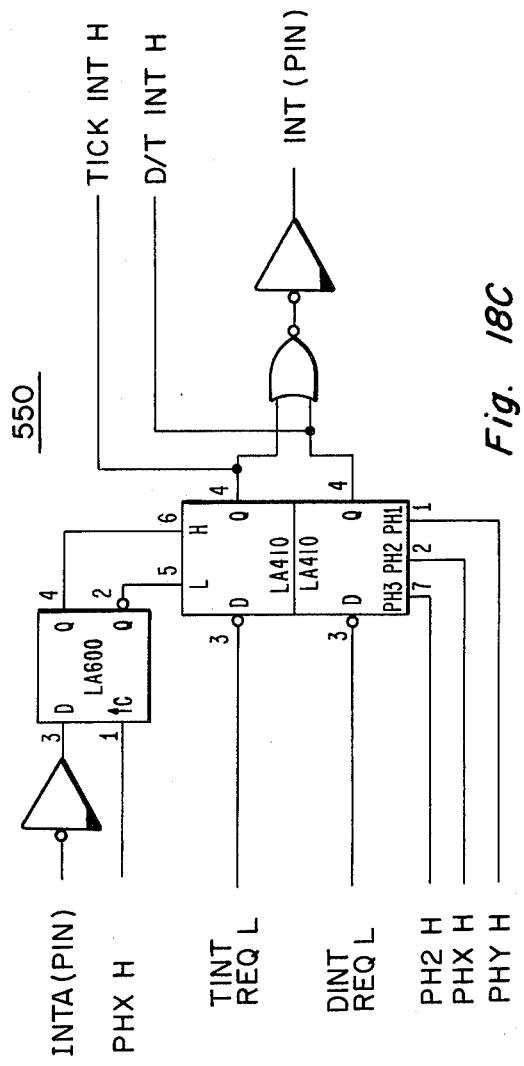
Figure 18D:
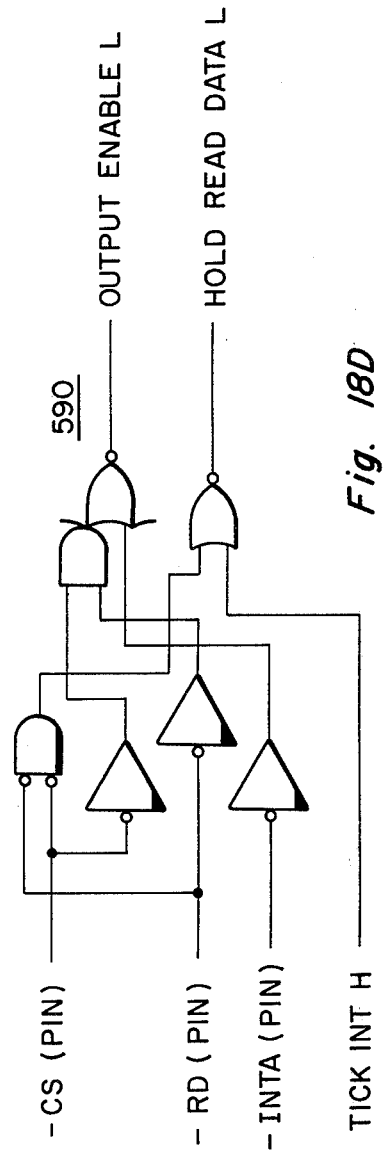
Figure 18E:
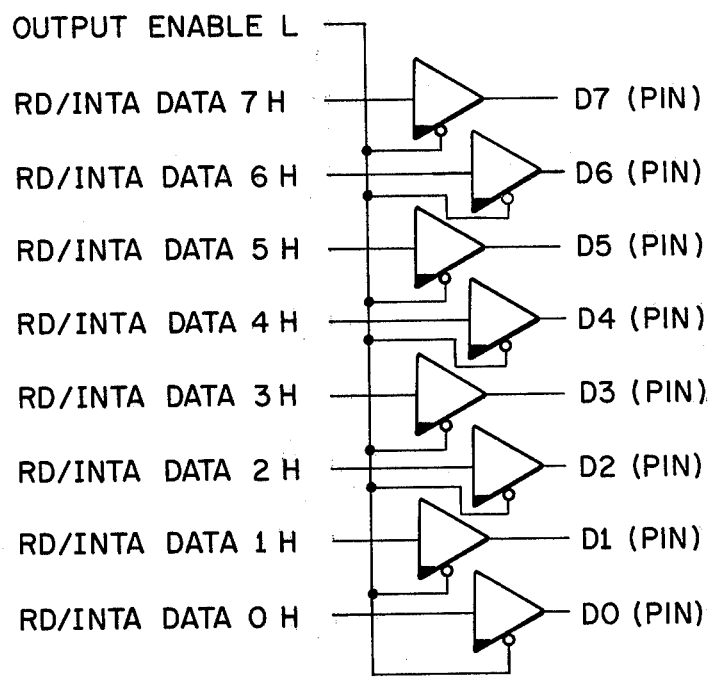
Figure 18F:
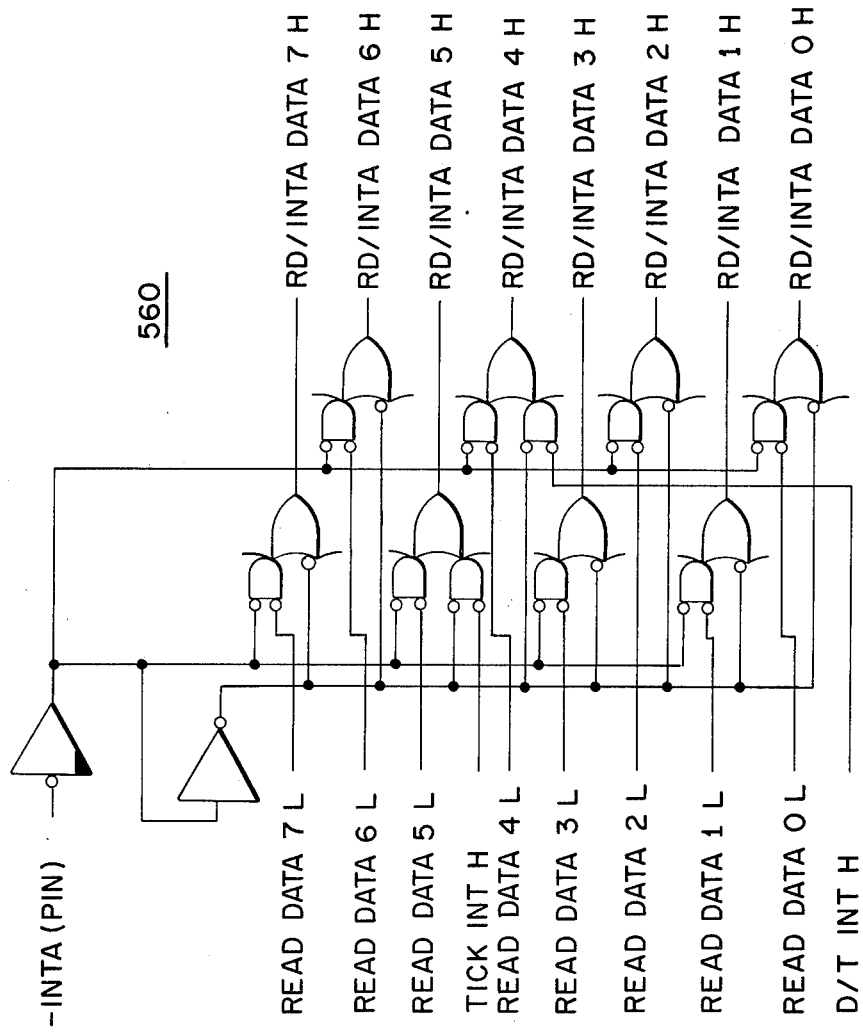
Figure 18G:
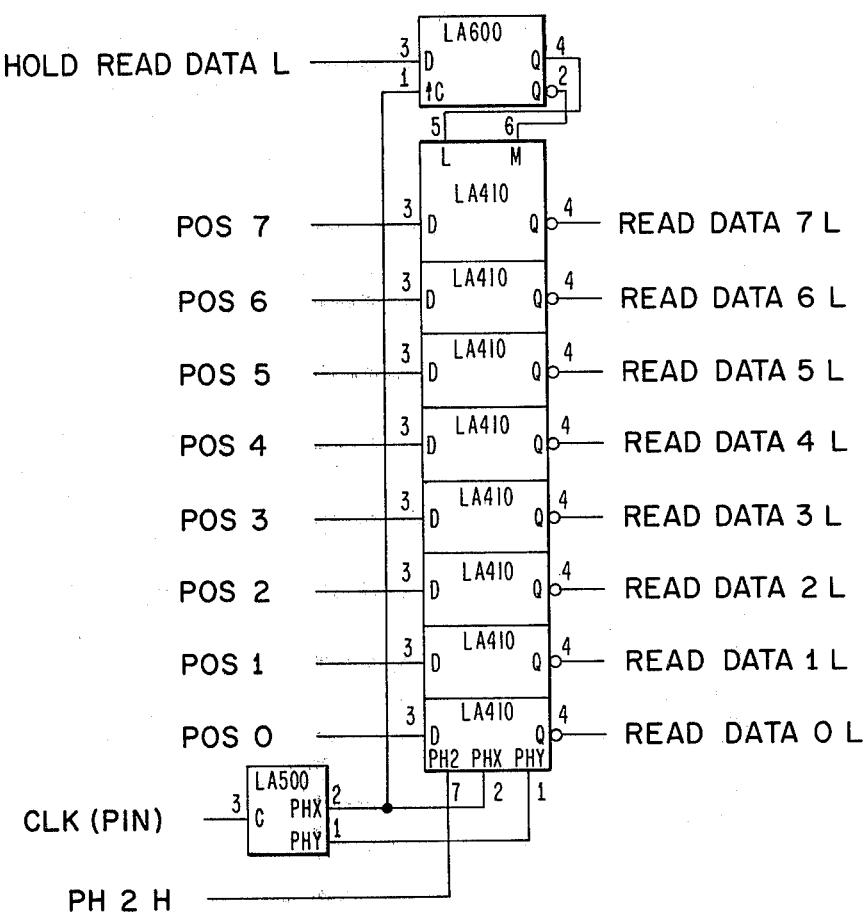
Figure 18H:
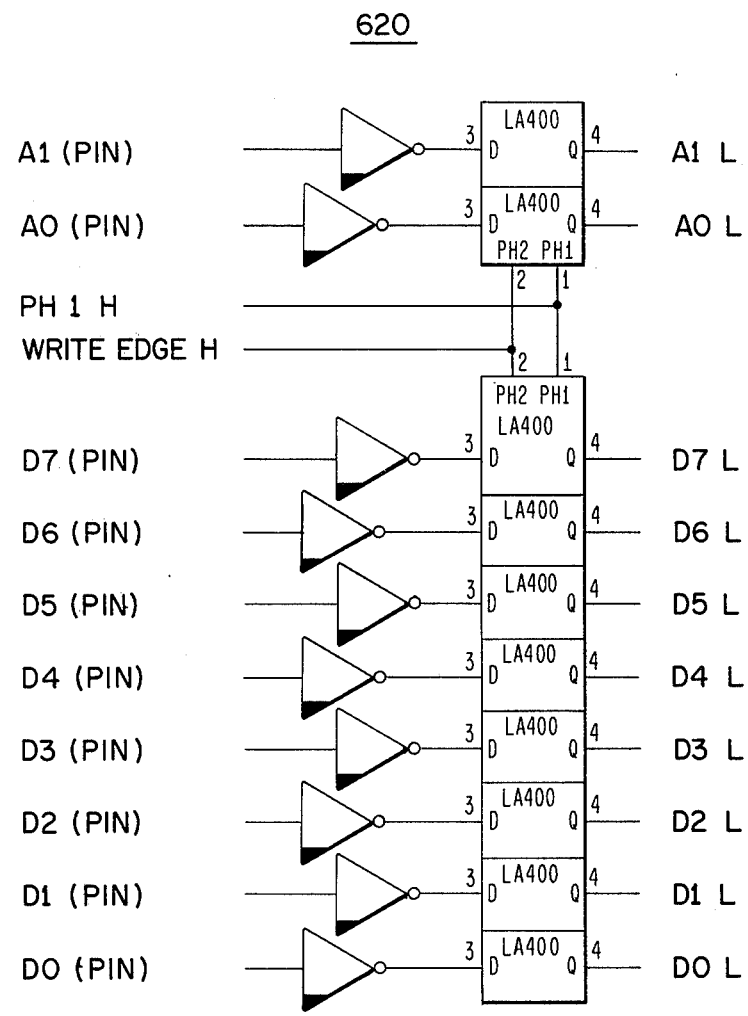
Figure 18I:
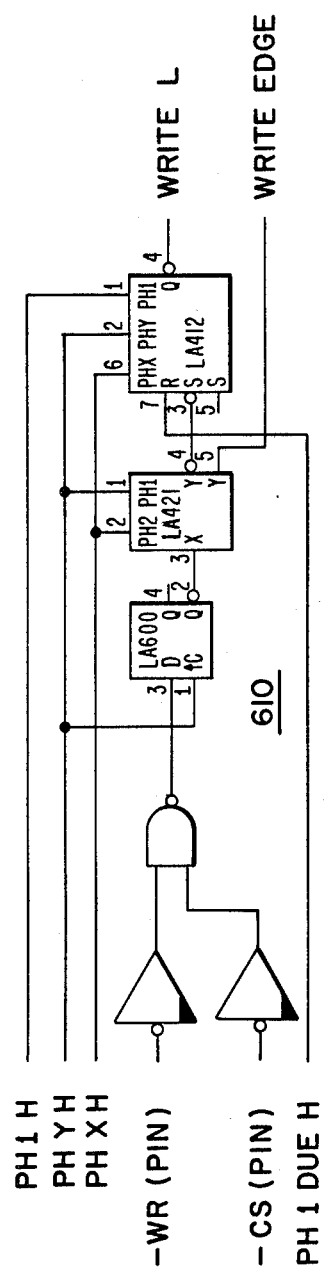
Figure 18J:
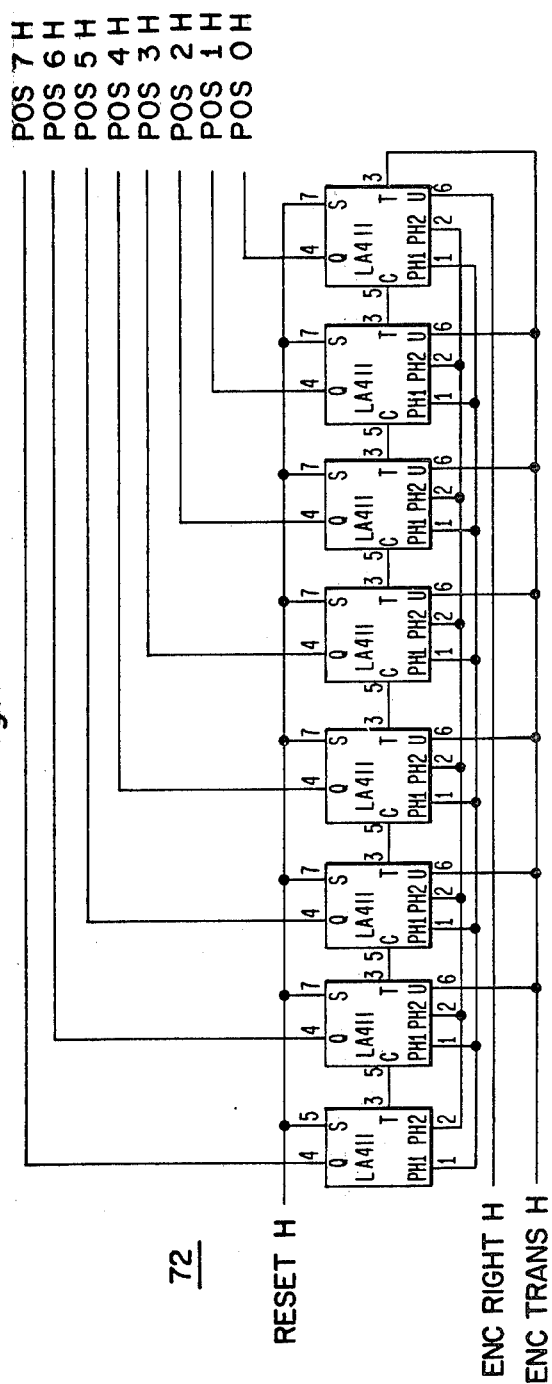
Figure 18K:
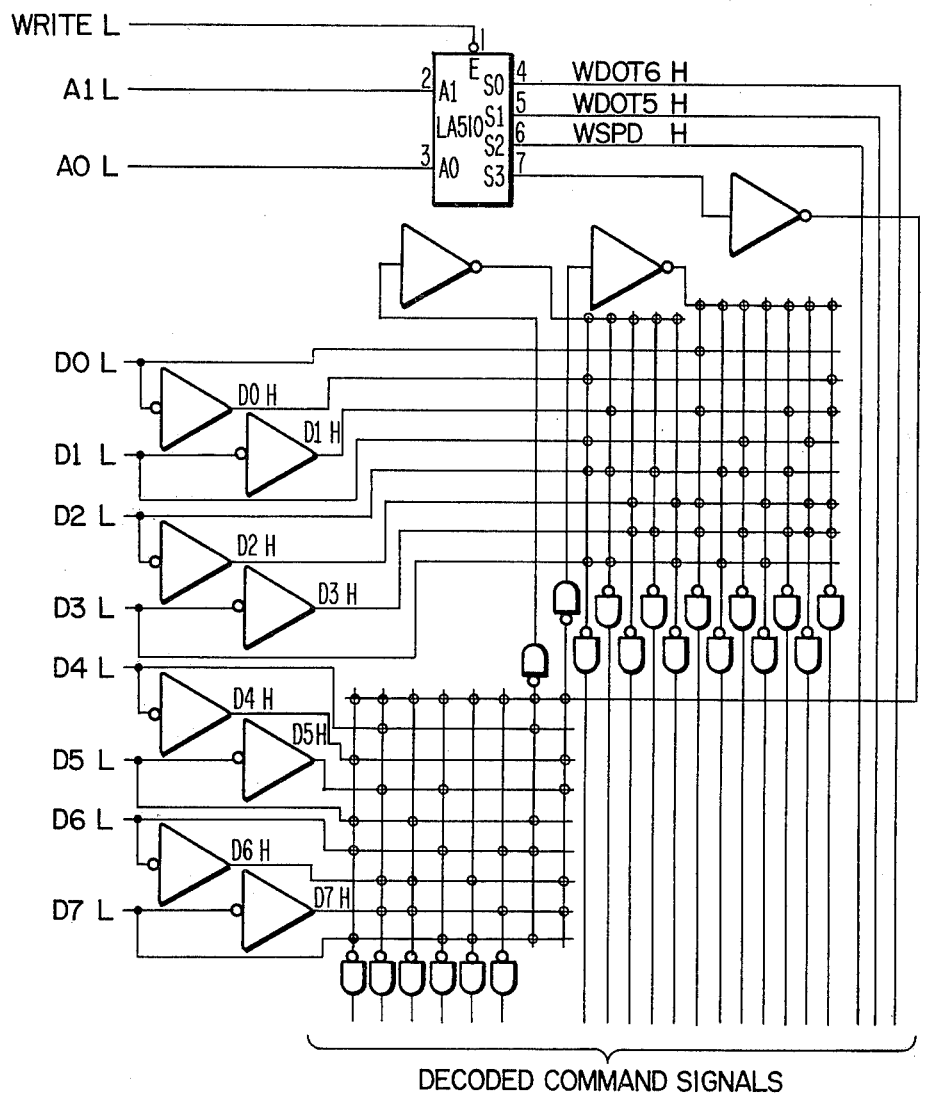
Figure 18L:
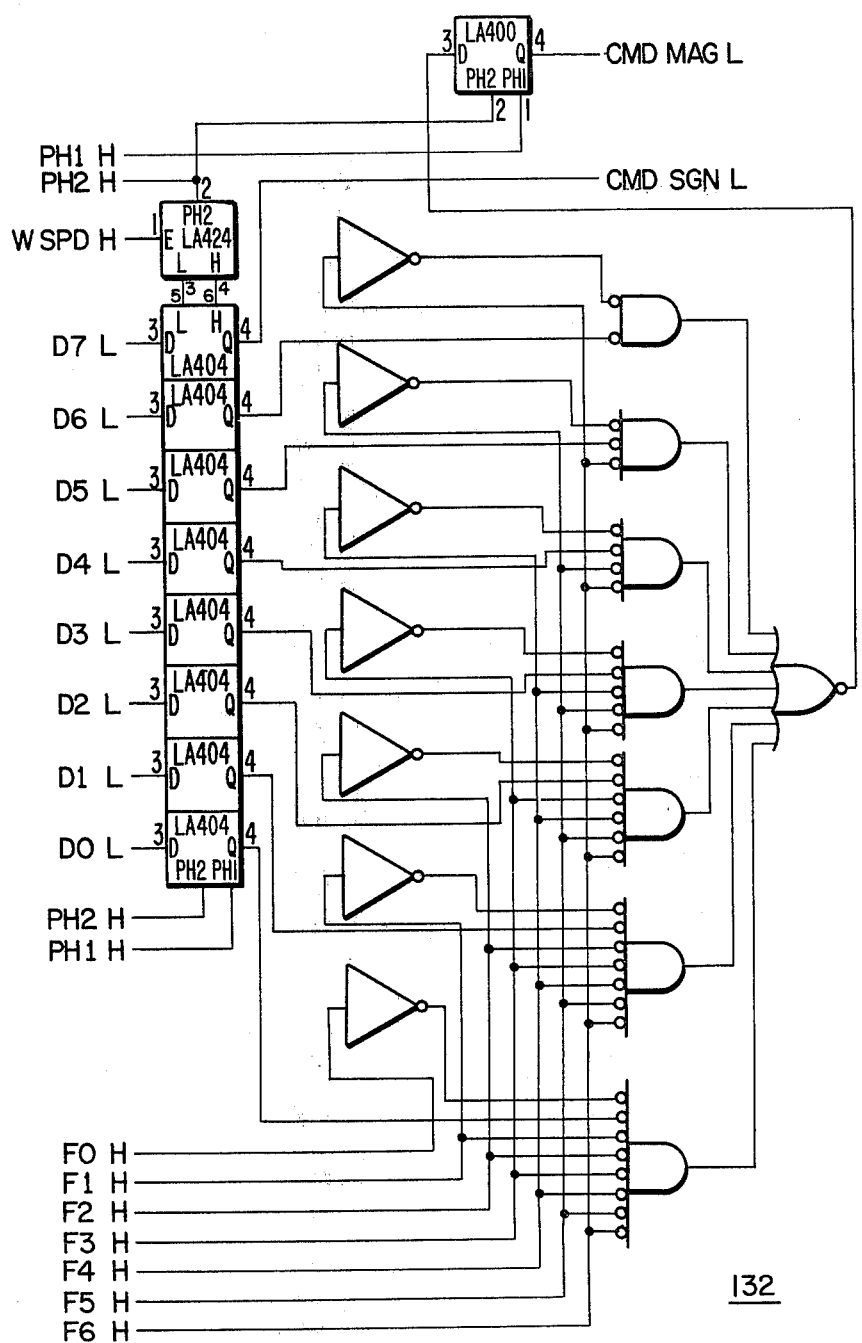
Figure 18M:
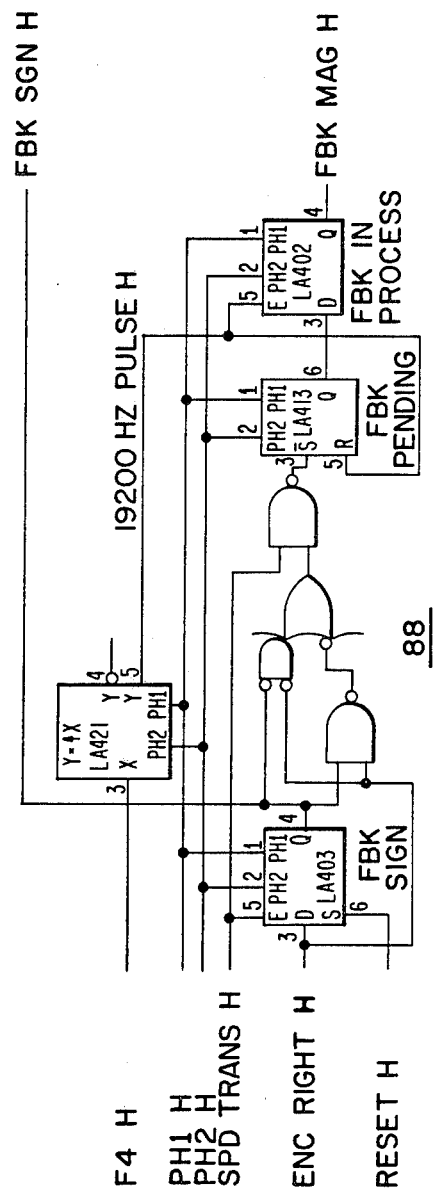
Figure 18N:
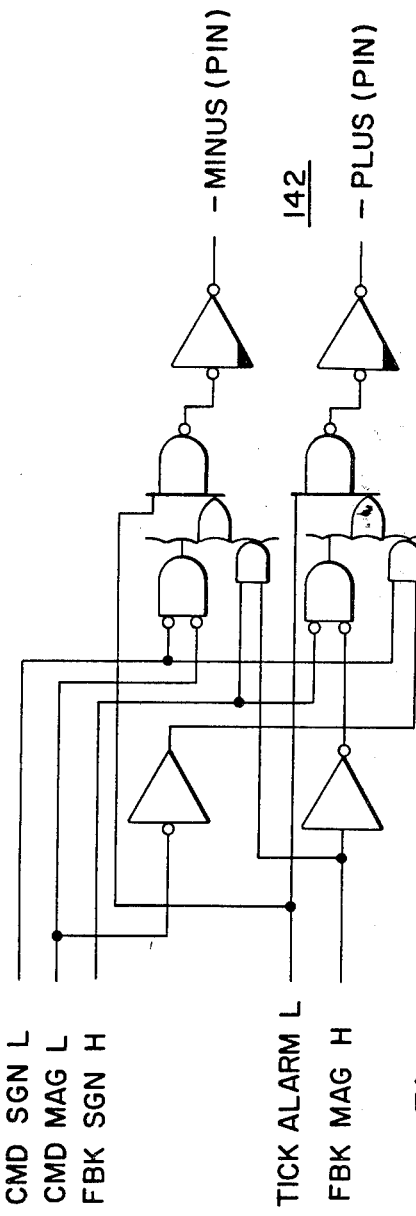
Figure 18Q:
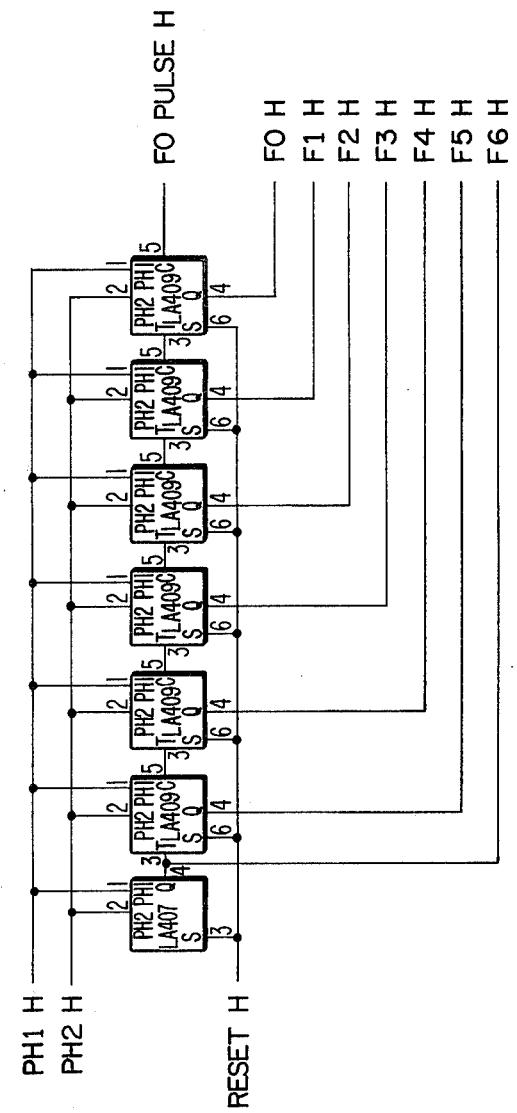
Figure 18R:
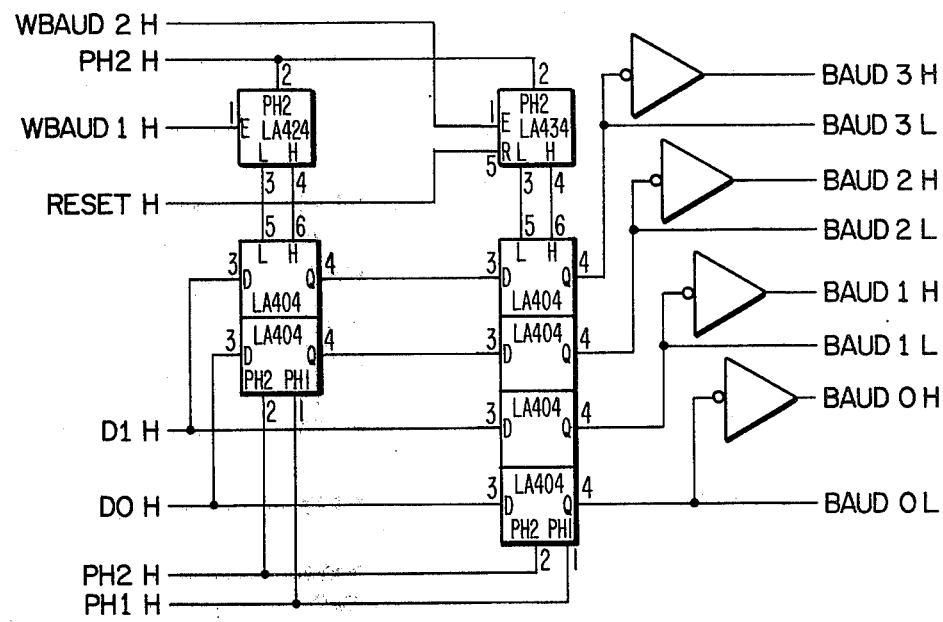
Figure 18S:
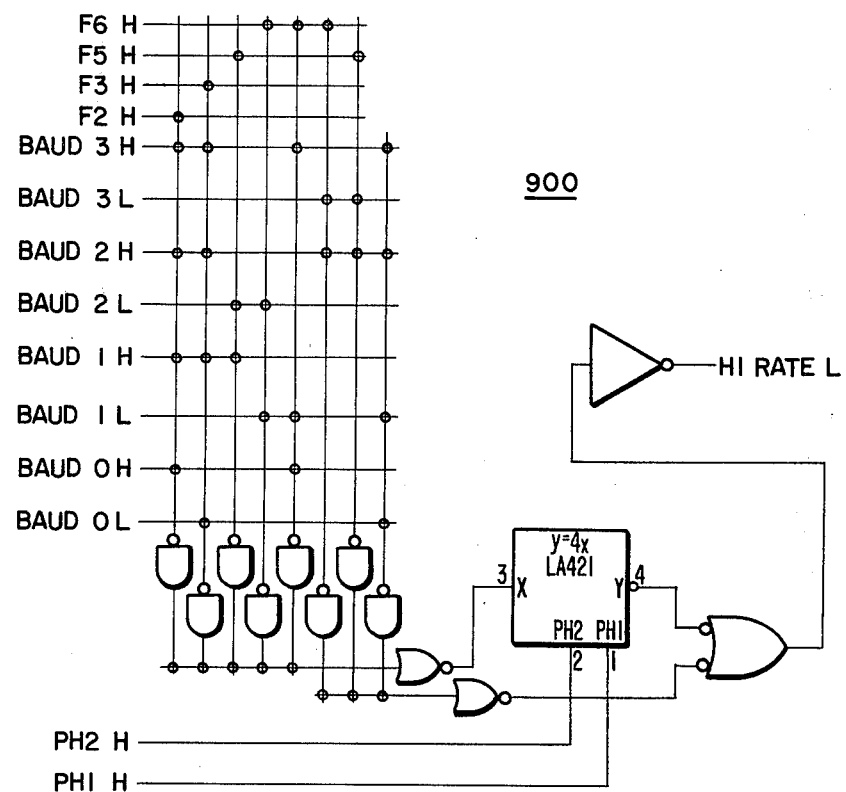
Figure 18T:
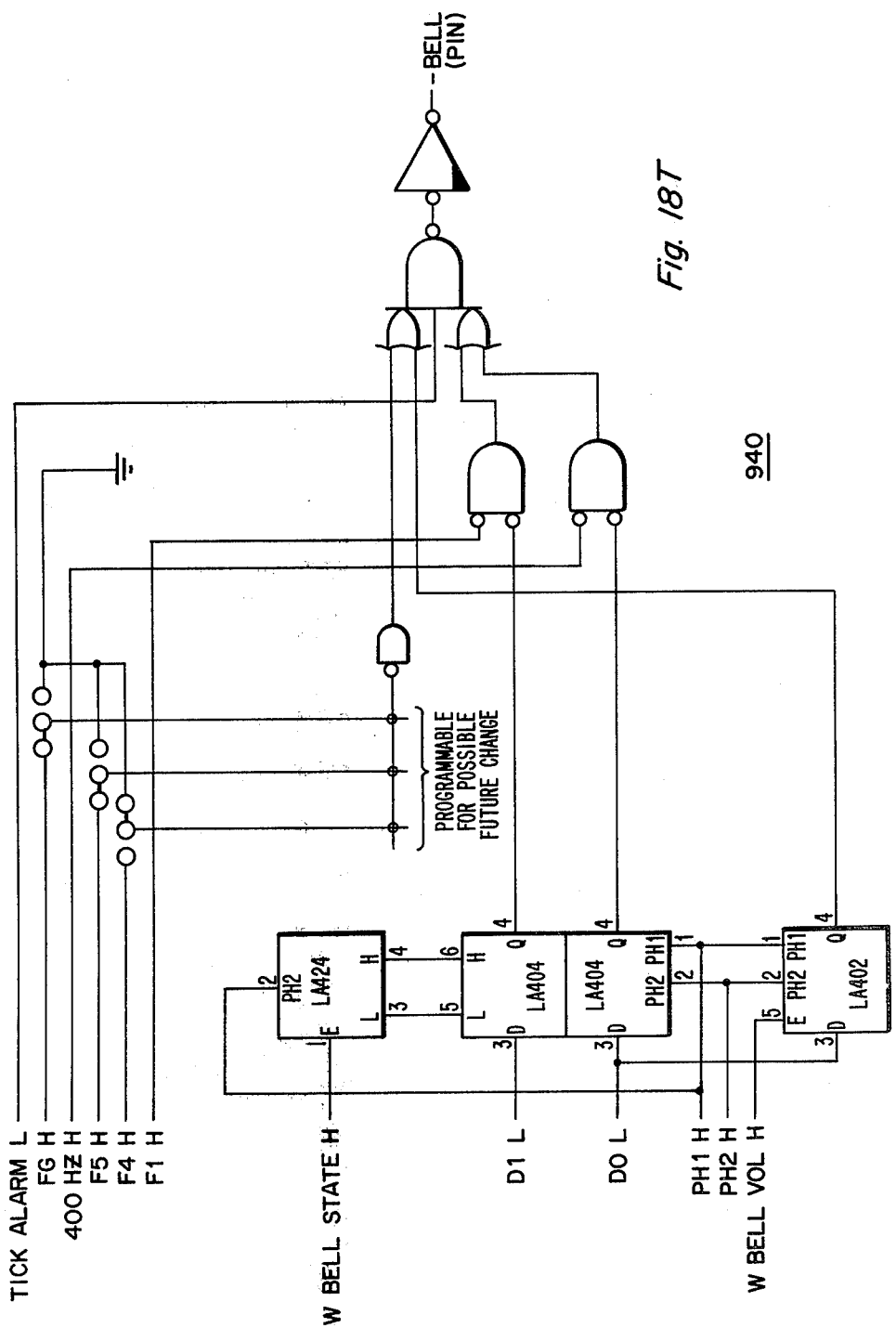
Figure 18U:
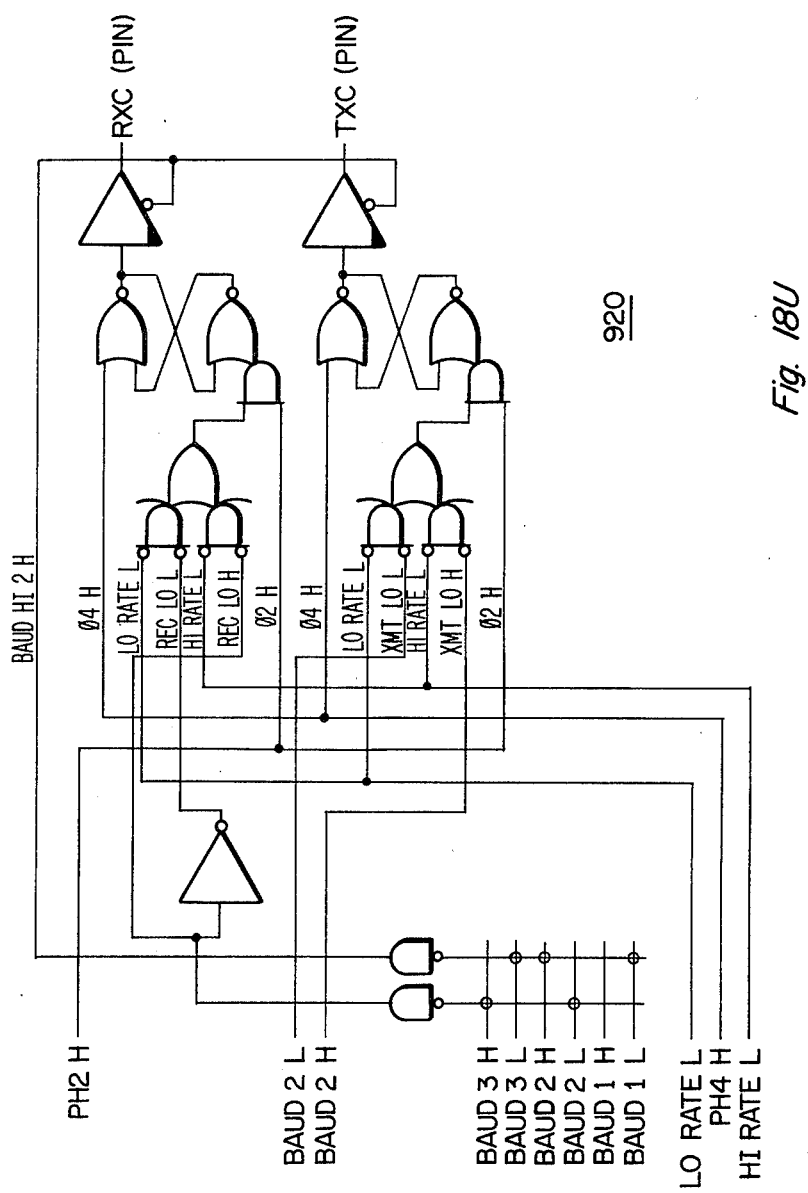
Figure 18V:
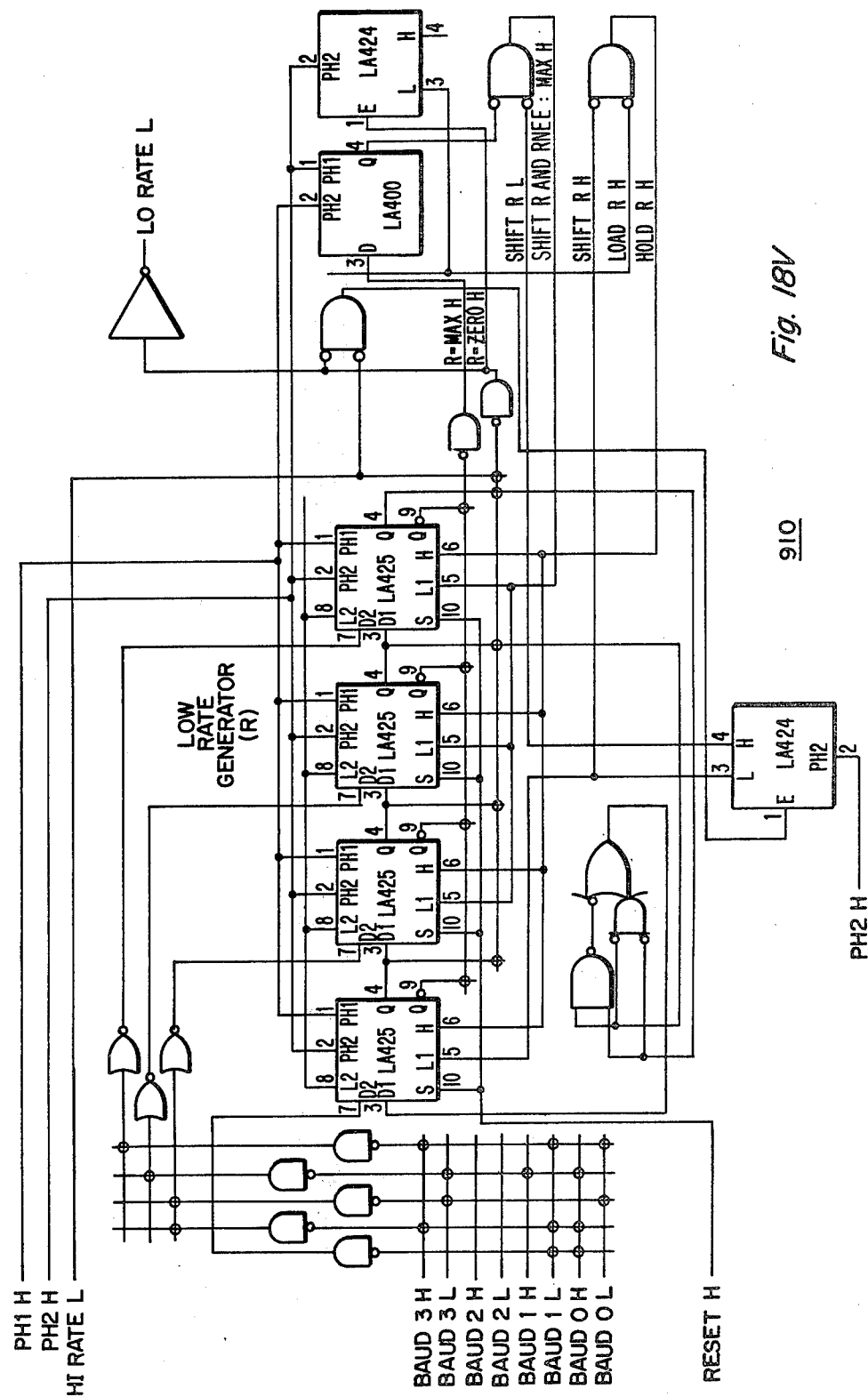
Figure 18W:
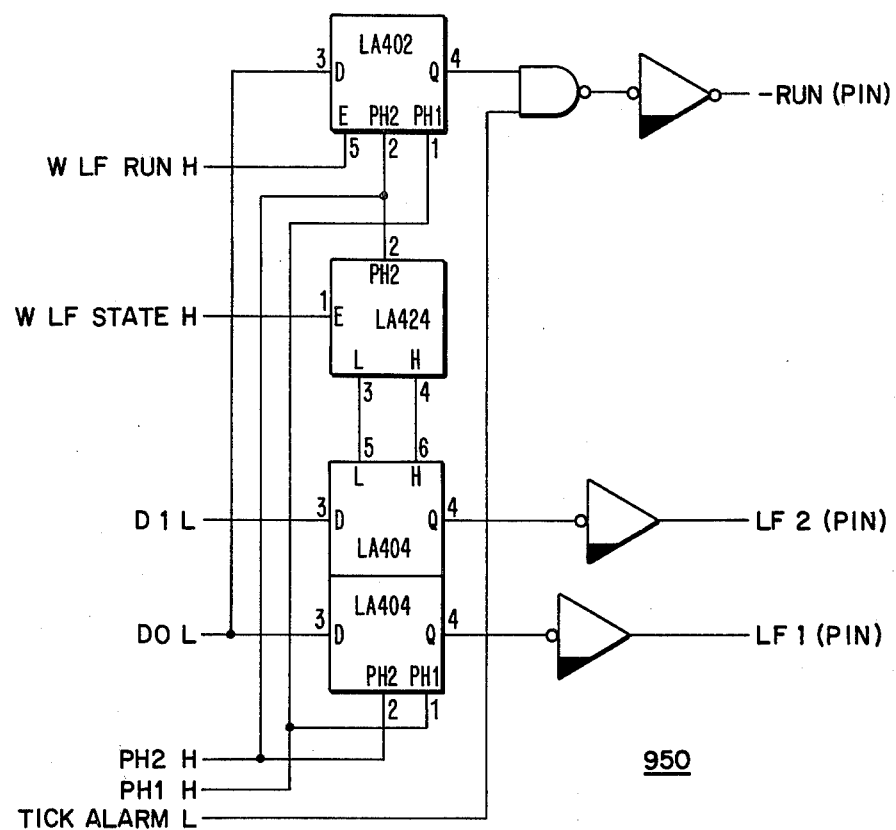
Figure 18X:
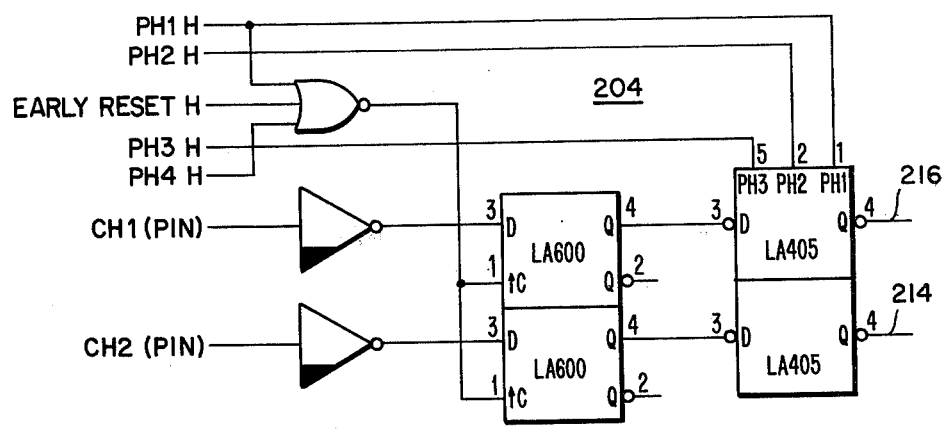
Figure 18Y:
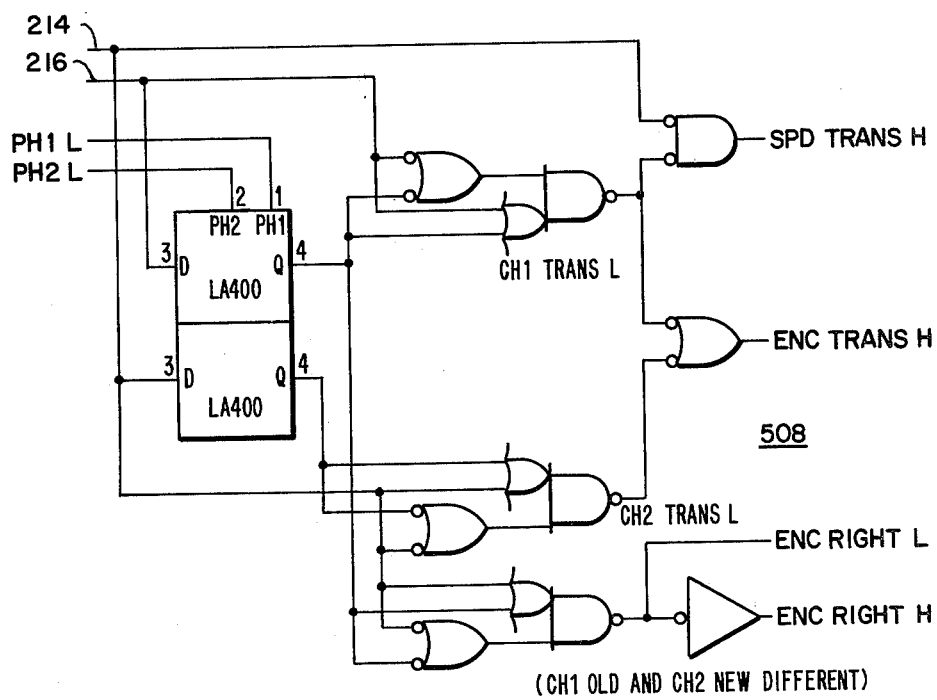
Figure 18Z:
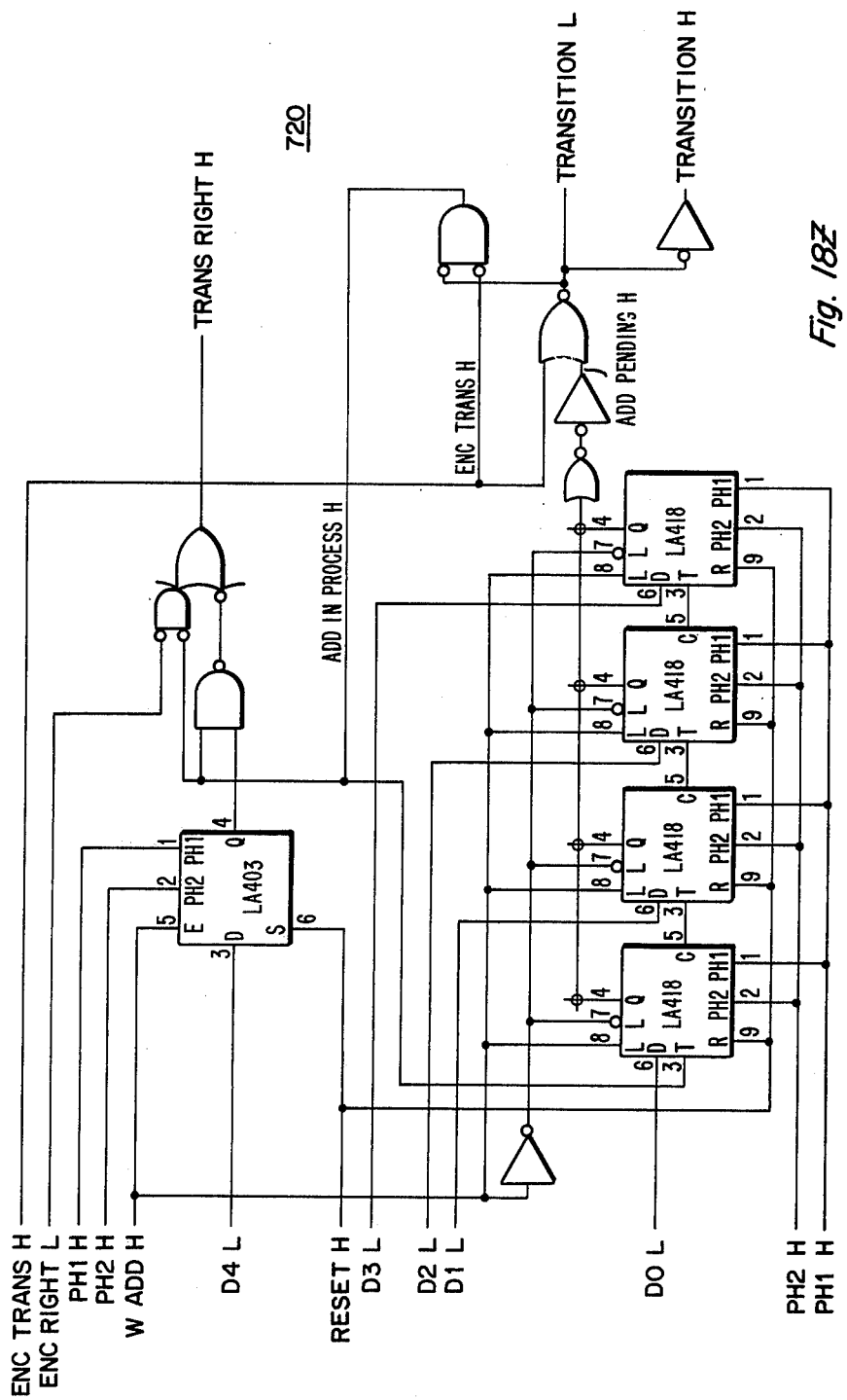
Figure 18A:
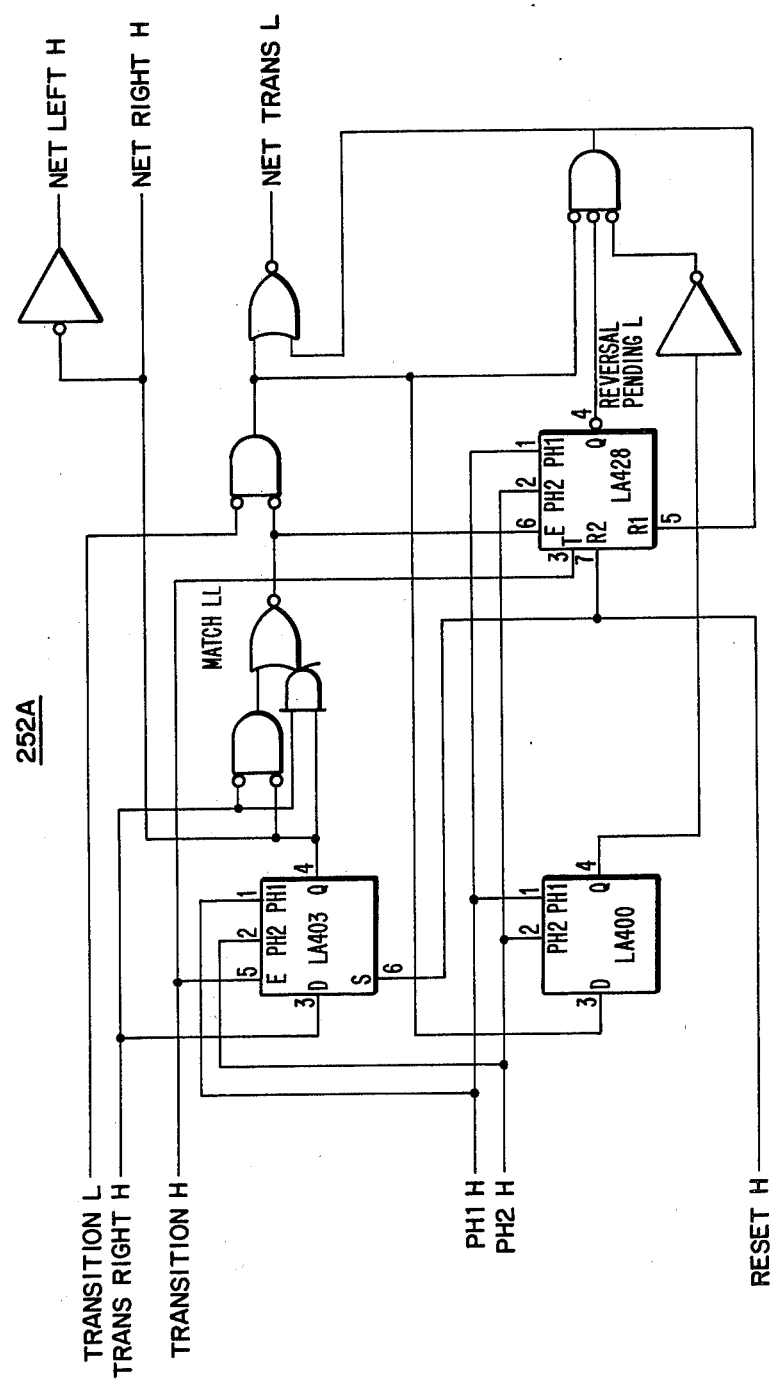
Figure 18A:
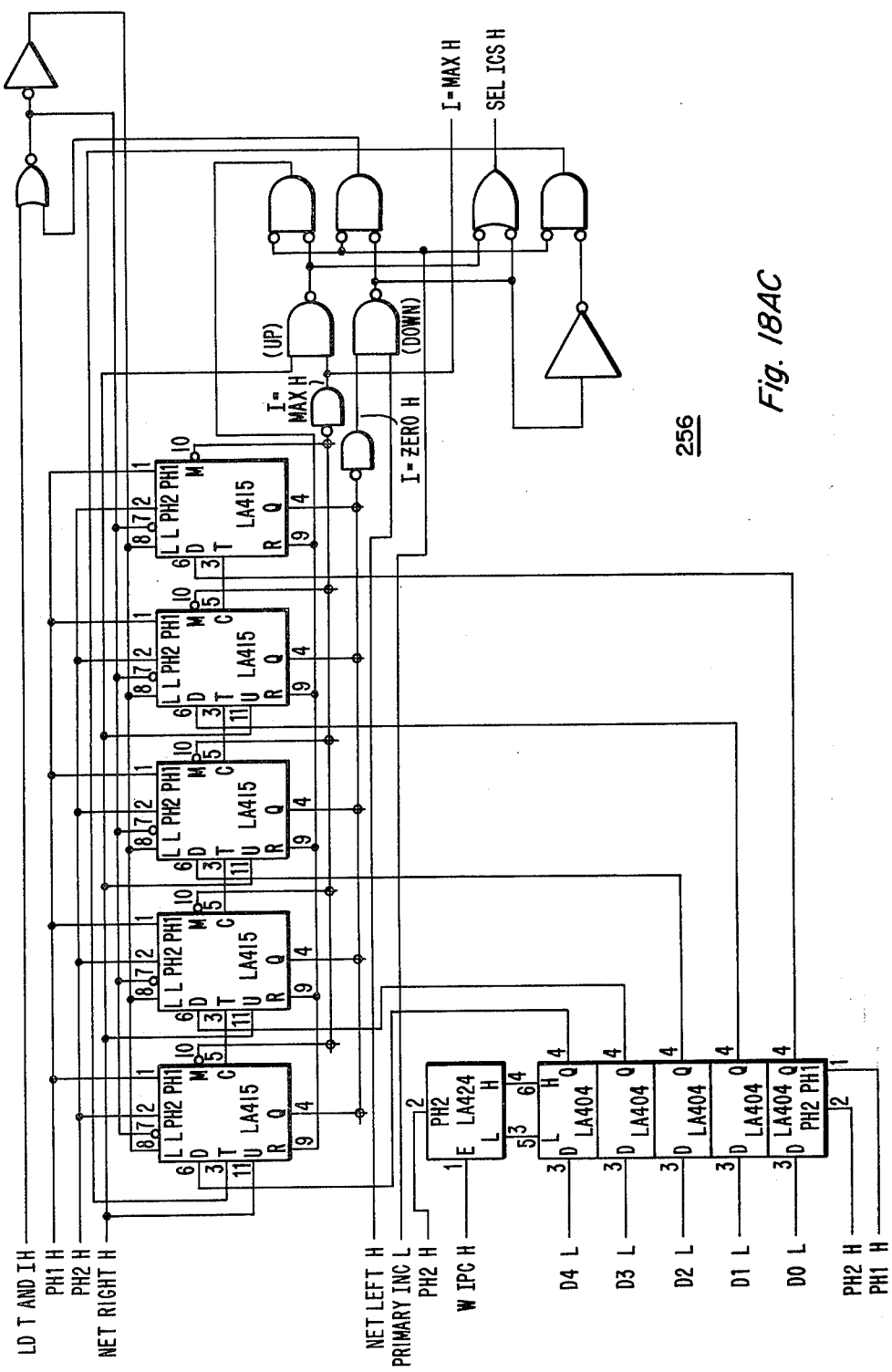
Figure 18A:
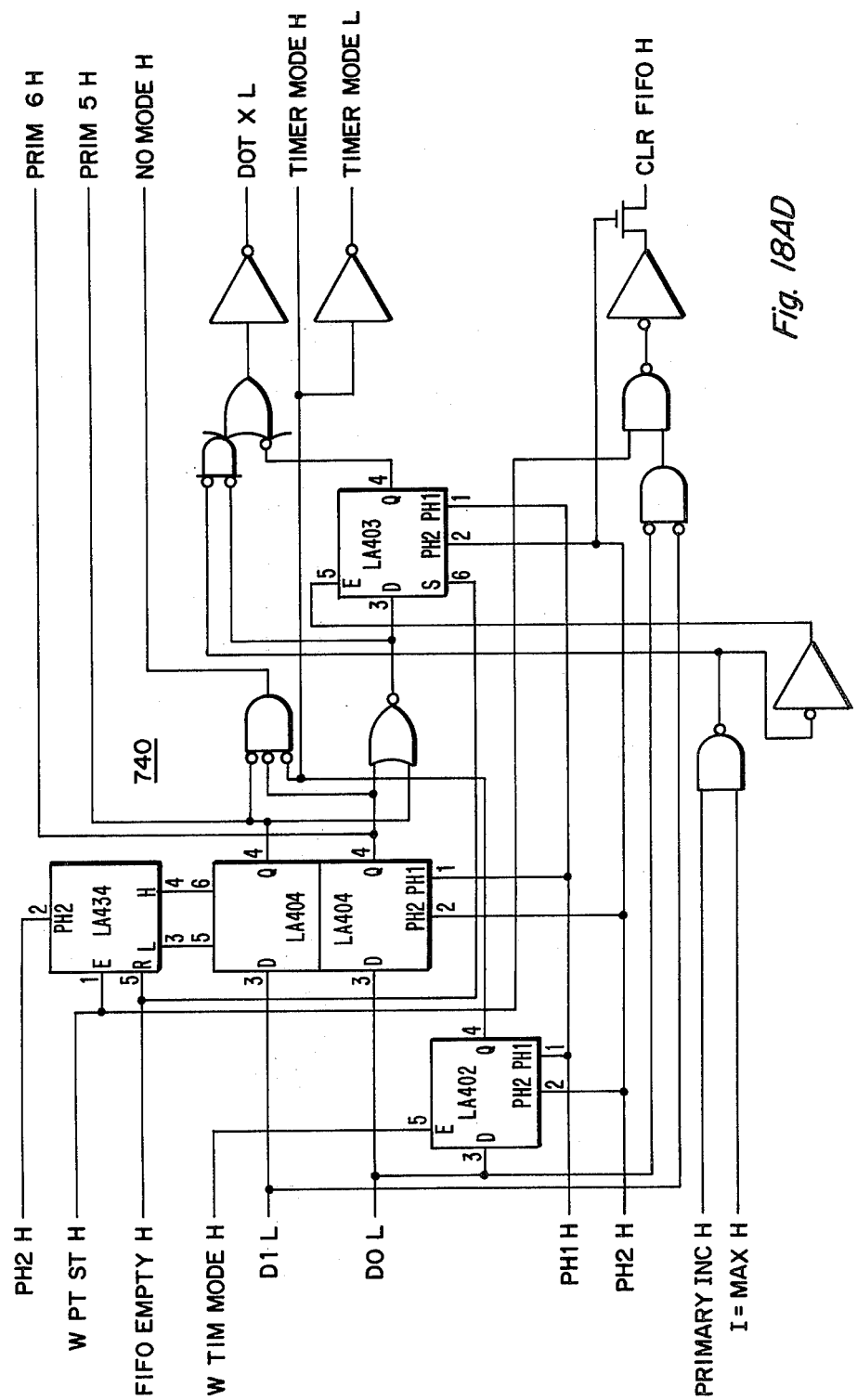
Figure 18A:
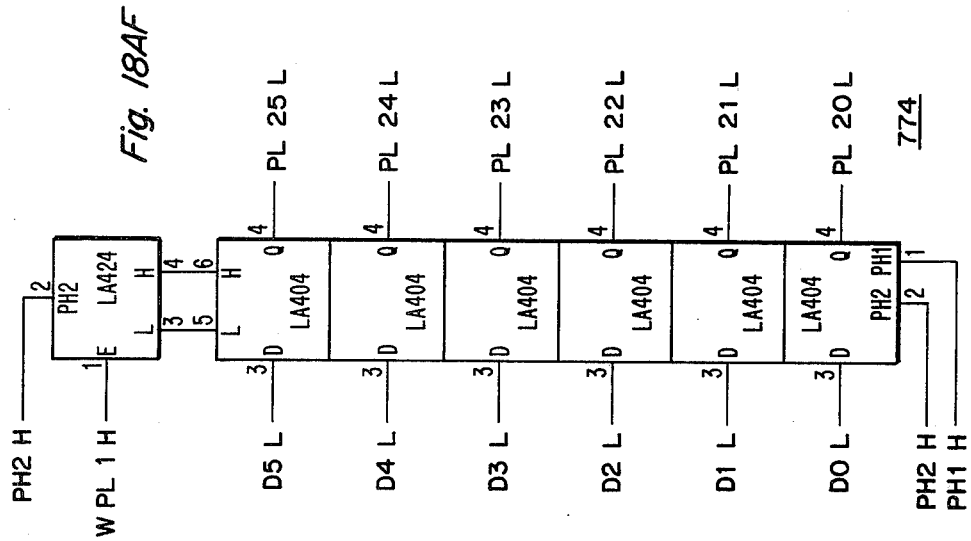
Figure 18A:
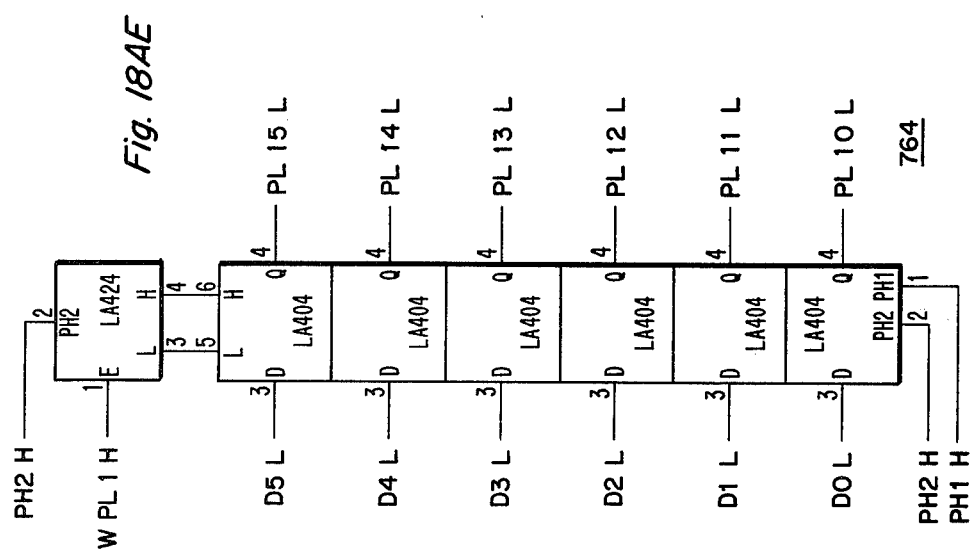
Figure 18A:
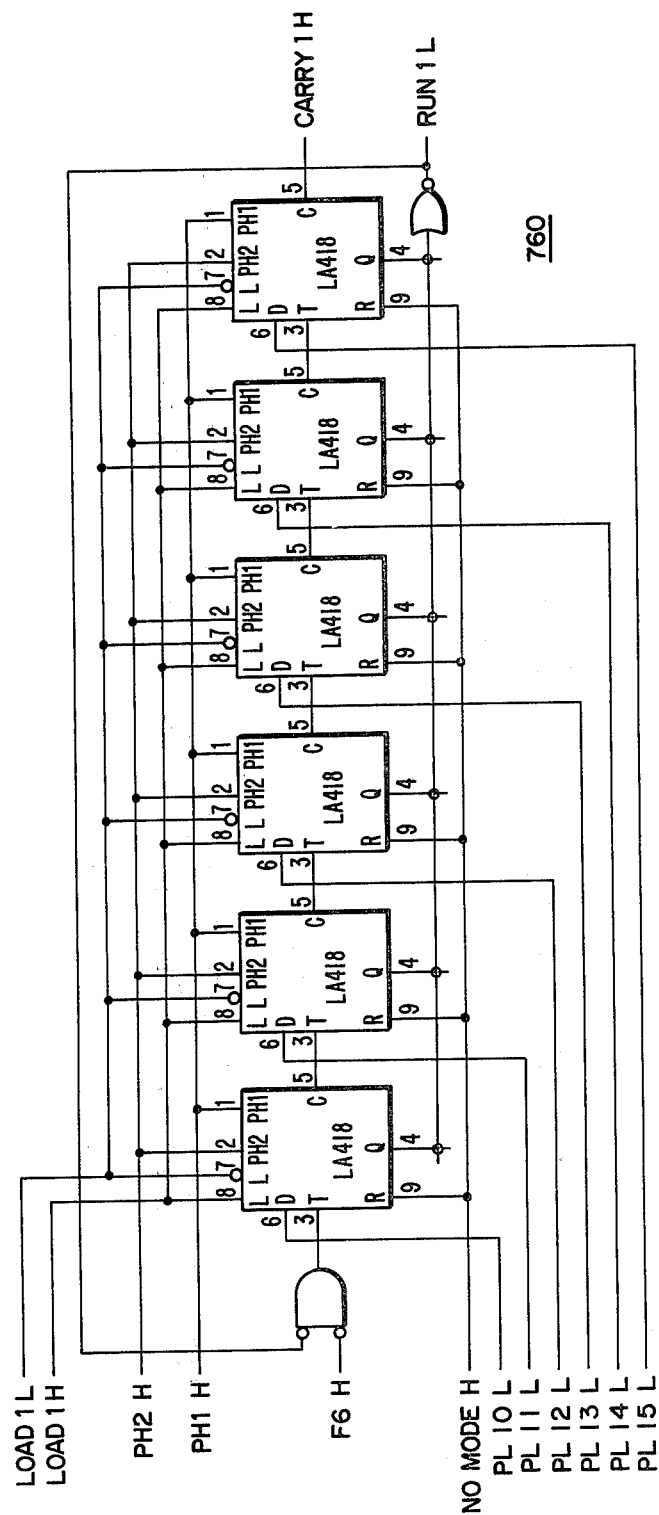
Figure 18A:
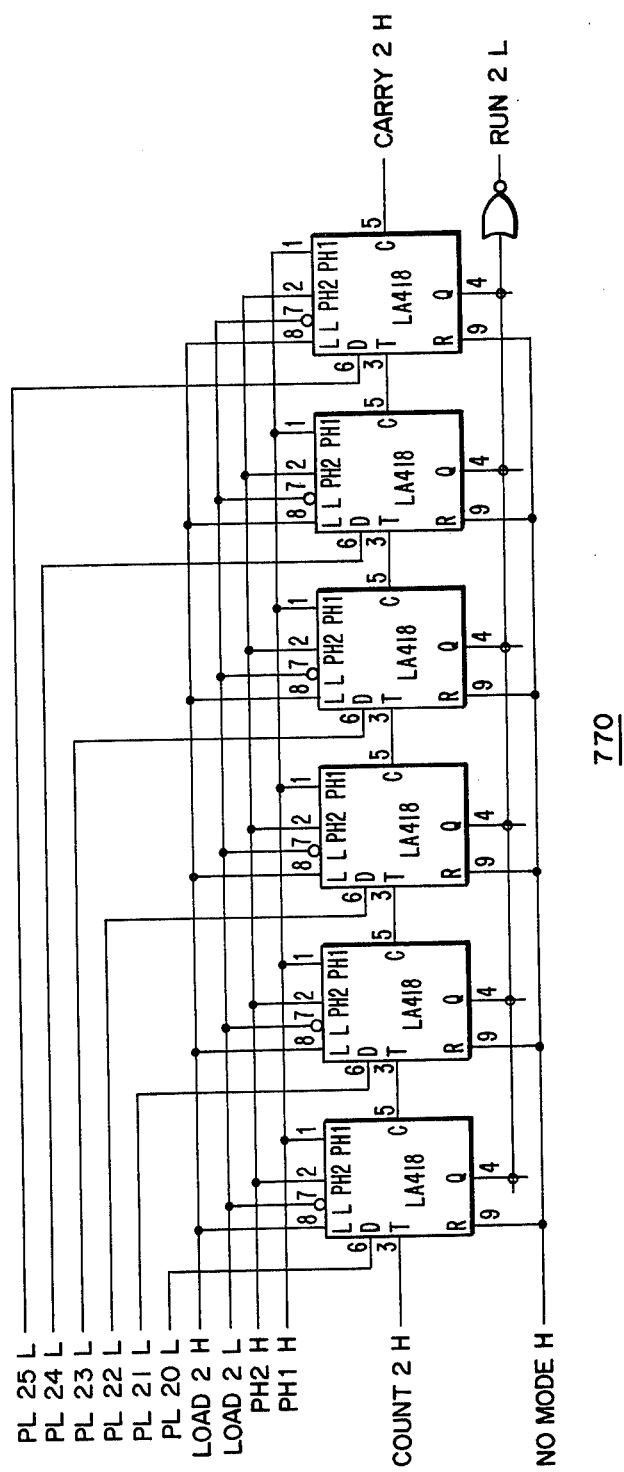
Figure 18A:
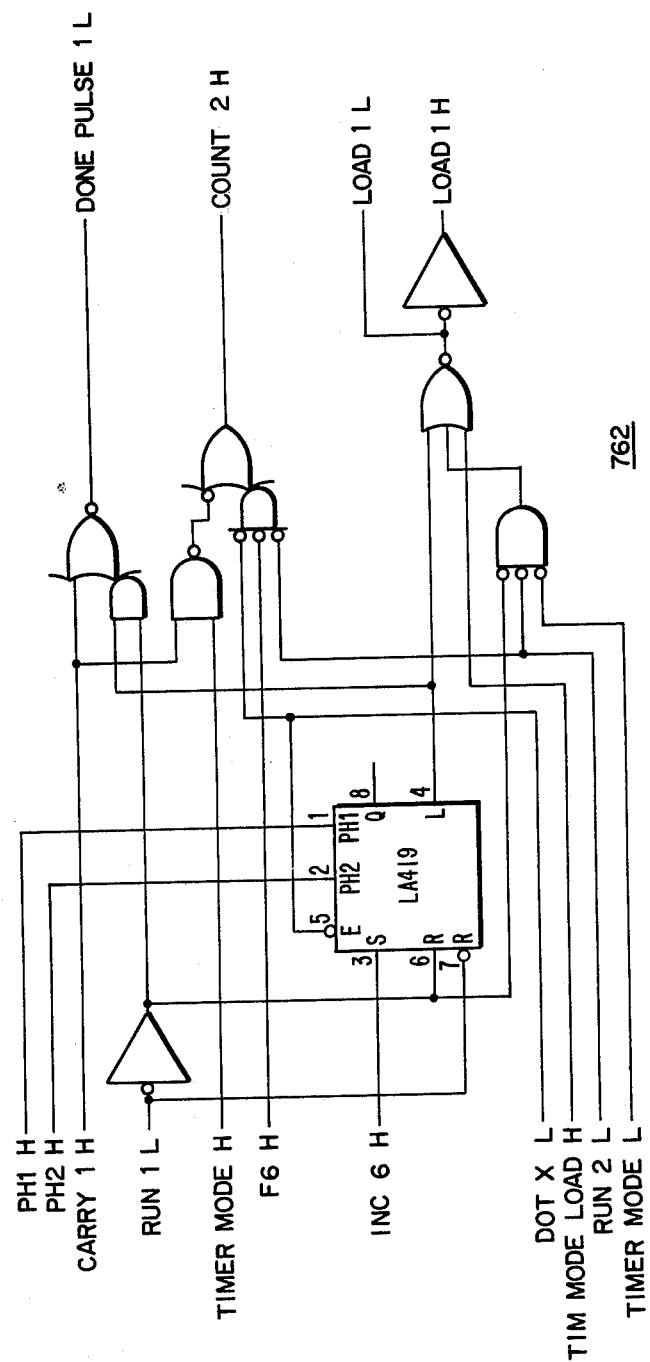
Figure 18A:
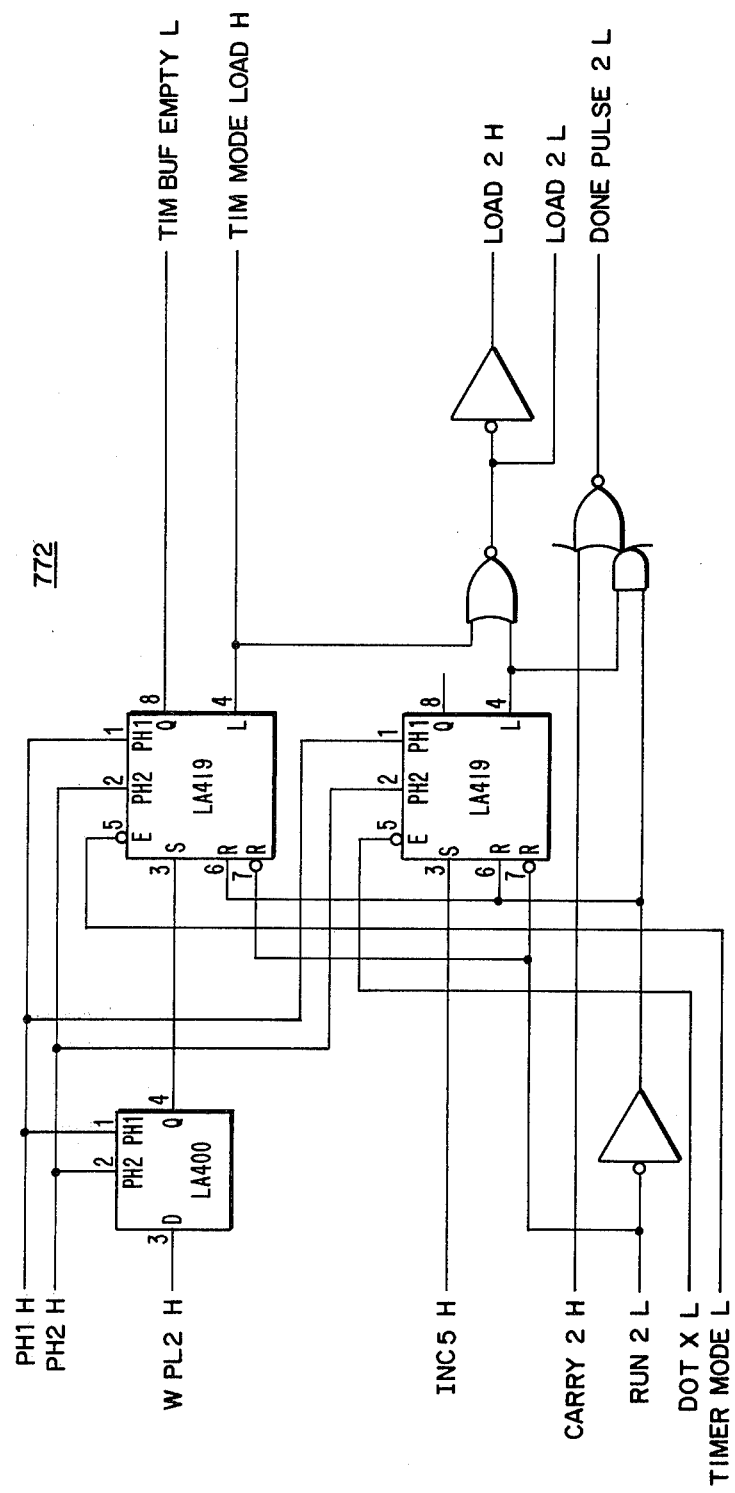
Figure 18A:
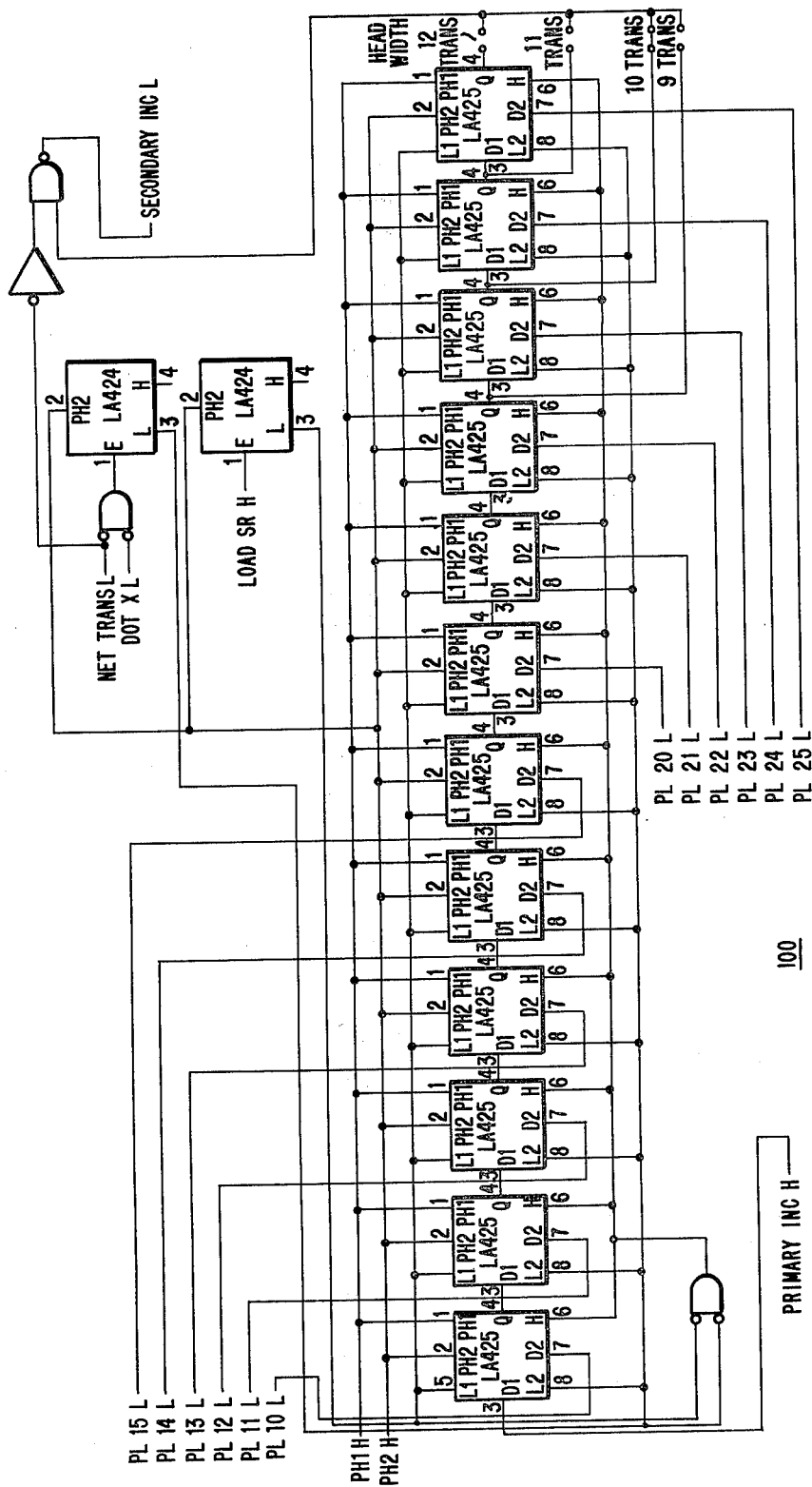
Figure 18A:
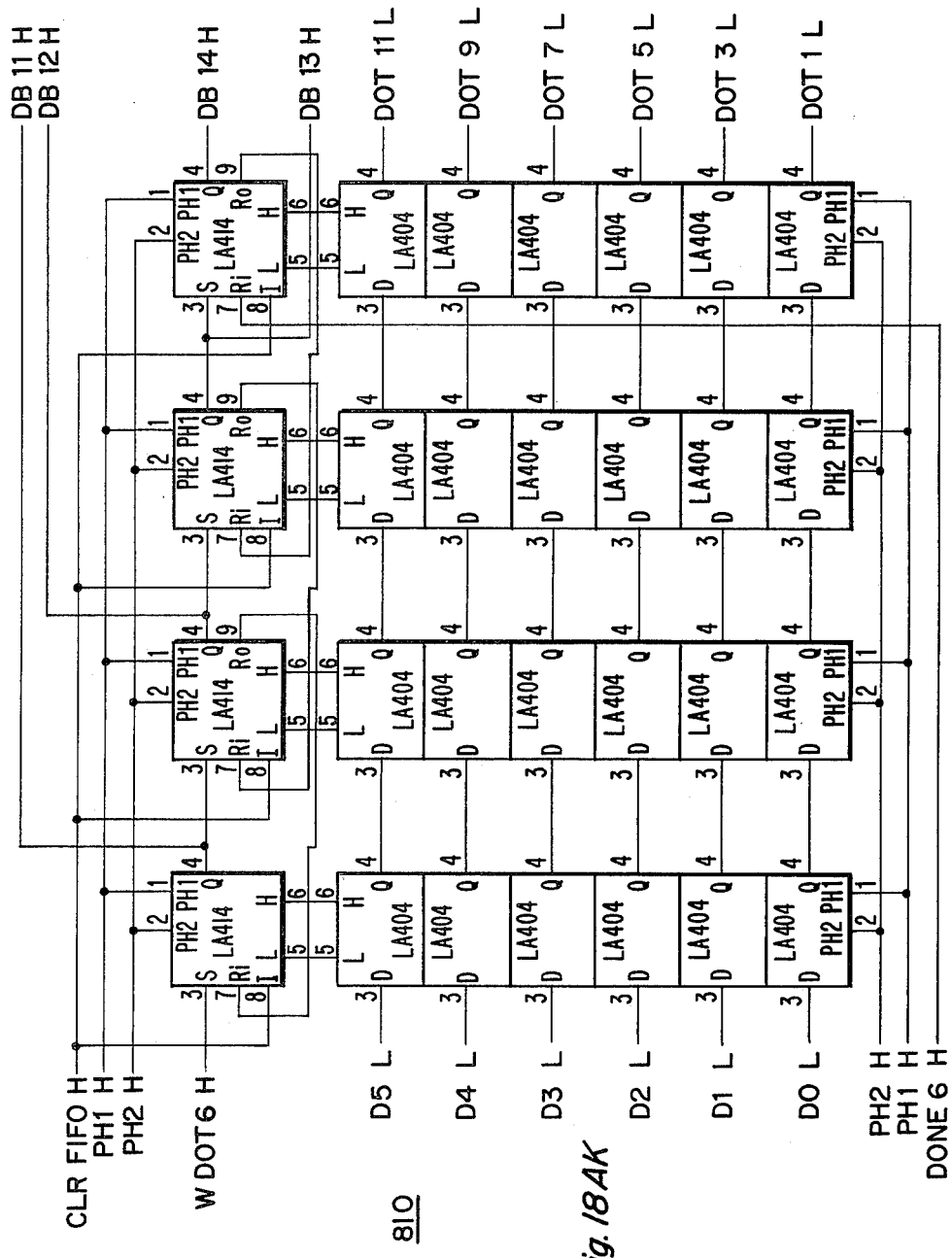
Figure 18A:
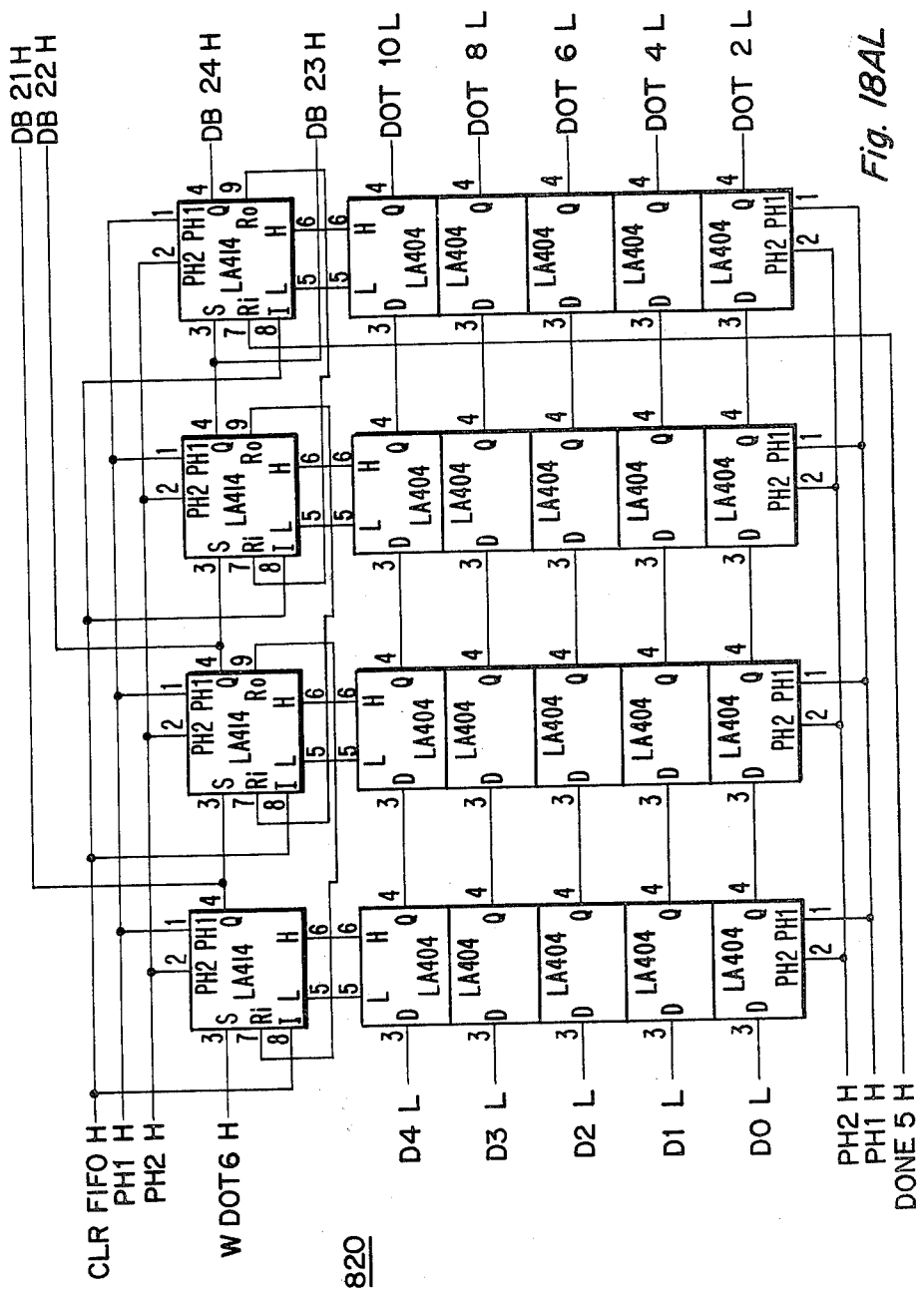
Figure 18:
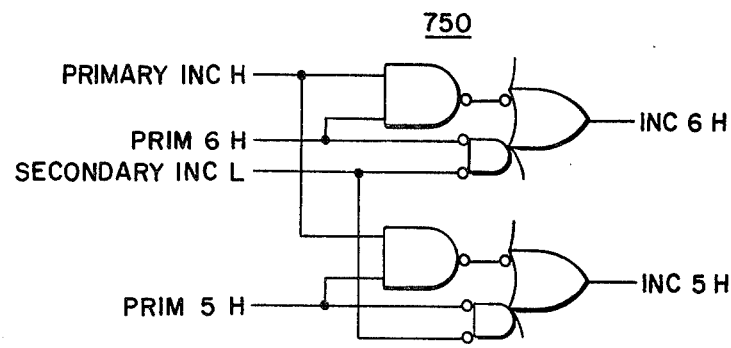
Figure 18:
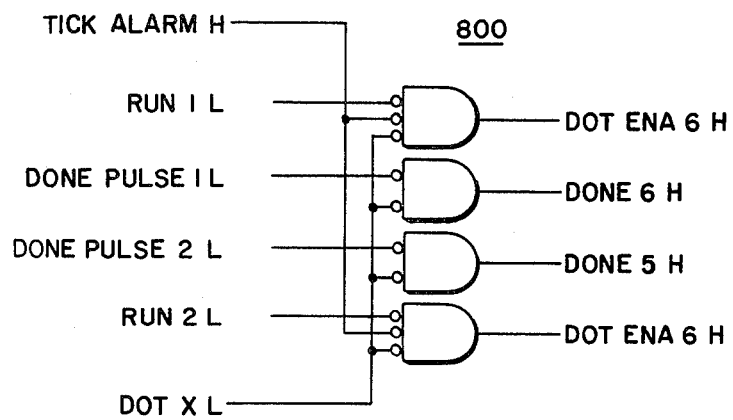
Figure 18:
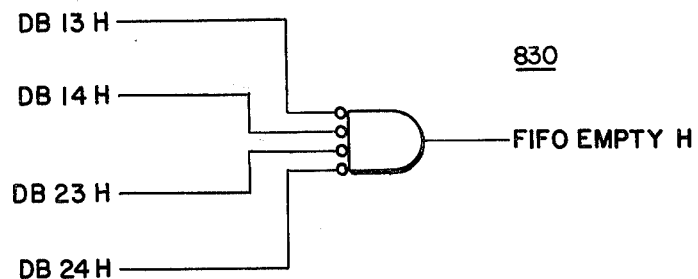
Figure 18:
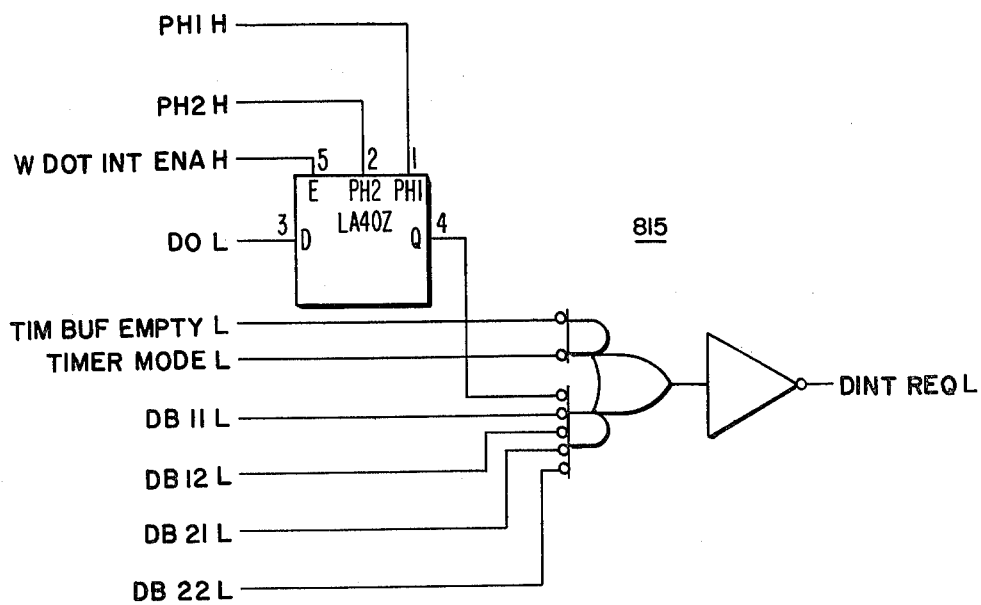
Figure 18:
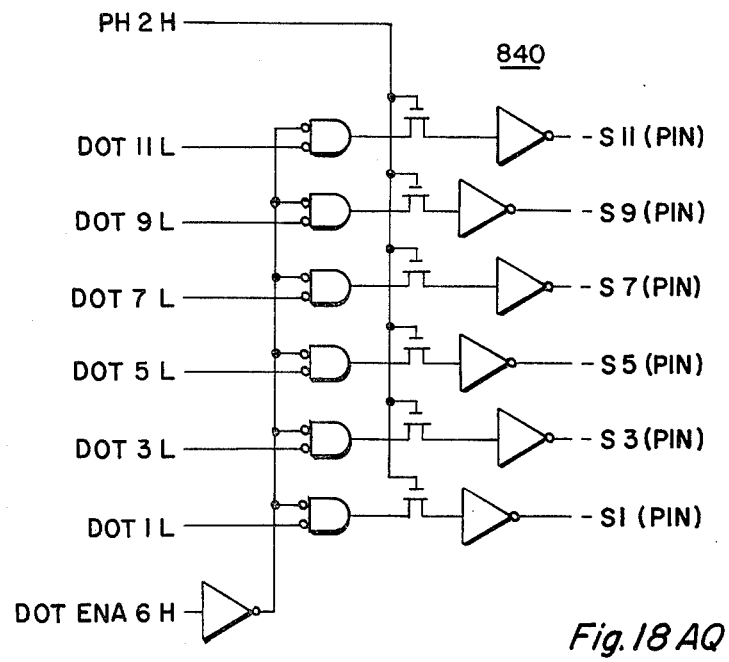
Figure 18:
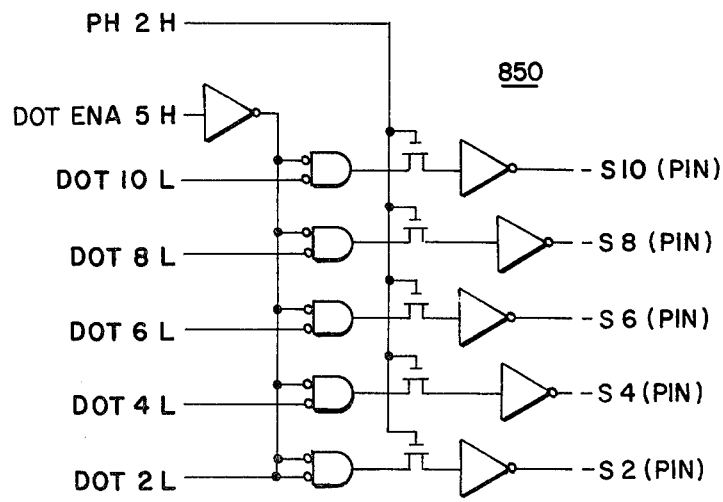

FIGS. 18A–18AR provides circuit diagrams of the apparatus blocks illustrated in FIGS. 16A–16D. Some of these circuit diagrams show circuit construction down to a gate level. In other cases, however, various functional circuit modules are shown. These modules are indicated by the designation LAxyz, where xyz indicates a three digit module type designation. Detailed circuit diagrams for each of these modules or cells are provided in FIGS. 19A(1)–19AB(2), together with truth tables where appropriate, to indicate the logic functions of the cells. (All FIGS. 19*(*) relate to the same module, where the * symbol indicates any letter or number.)

It is believed that the circuit diagrams for the apparatus blocks and the modular cells will both be readily understood without a detailed, gate-by-gate explanation, in view of the above detailed discussion of the operation of the PCC.

Nevertheless, to facilitate understanding of the circuit diagrams, the following brief explanations will be given for the circuit modules.

Circuit module LA400, FIGS. 19A(1)–19A(3), is a one-bit shift register for providing a delay function. Specifically, it is used where a 6.5 microsecond delay is needed, such as feedback shift register counting, edge detection, and other timing functions. The data input is simply propagated to the state output Q with a delay of one clock period. Optionally, the −Q terminal may also be used for the complementary state output. The PH1 and PH2 terminals receive those respective signals as clock inputs. At the PH2 time, the D input is sampled. At the PH1 time, the D input is propagated to the Q output and the inverse of the D sample is propagated to the −Q output.

The LA401 circuit module, shown in FIGS. 19B(1)–19B(3), implements a delay with a pre-set provision. The PH1 and PH 2 terminals receive those signals as clock inputs. The D terminal receives the data input, the Q terminal provides the state output and the S terminal is the set input. At the PH2 time, the D and S inputs are sampled. At the PH1 time, if the S sample is high, a high level is propagated to the Q output and a low level is propagated to the −Q output; otherwise, the D sample is propagated to the Q output and the inverse of the D sample is propagated to the −Q output.

Circuit module LA402, shown in FIGS. 19C(1)–19C(3), is a dynamic D-type flip-flop, also termed a sample-and-hold (S&H) circuit. The same terminology applies to its inputs, as above. In addition, there is an E terminal which receives an enable input. At time PH2, the D and E inputs, and the Q output are sampled. At the PH1 time, if the E sample is high, then the D sample is propagated to the Q output; otherwise, the Q output is merely refreshed.

Circuit module LA403, shown in FIGS. 19D(1)–19D(3), is a dynamic D-type flip-flop (i.e., S & H) with a set feature. Terminology is the same for its terminal connections. The R terminal, the use of which is optional, receives a reset input. At time PH2, the D, E, S, and R inputs are sampled, together with the Q output. At the PH1 time, if the S sample is high, the high level is propagated to the Q output; otherwise, if the R sample is high, then a low level is propagated to the Q output; otherwise, if the E sample is high, then the D sample is propagated to the Q output; otherwise, the Q output is merely refreshed.

Circuit module LA404, FIGS. 19E(1)–19E(2), is a data latchbit. Its L input terminal receives a load signal and its H terminal may be provided with a hold input. At time PH2, the D input and Q output are sampled. At time PH1, if the L input is high and the H input is low, then the D sample is propagated to the Q output. Otherwise, if the H input is high and the L input is low, then the Q output is refreshed. If both the H and L inputs are low, a low level is propagated to the Q output. Otherwise, with both H and L inputs high, if either the D sample or the Q sample is high, then the high level is propagated to the Q output.

Circuit cell LA 405, shown in FIGS. 19F(1)–19F(3), is a sampling filter. At time PH3, it samples the −D input and at the PH2 time, it samples both the −D input and −Q output. At time PH1, if any two of the PH3 and PH2 −D samples and −Q sample are low, then a low level is propagated to the −Q output; otherwise, a high level is propagated to the −Q output.

Circuit LA407, shown in FIGS. 19(G)1–19G(3), provides a toggle with set. At time PH2, the S input and the −Q output are sampled. At time PH1, if the S sample is high, then a high level is propagated to the Q output and a low level is propagated to the −Q output; otherwise, the −Q sample is propagated to the Q output and the inverse of the −Q sample is propagated to the −Q output.

Circuit module LA408, shown in FIGS. 19H(1)–19H(3), is a controlled toggle with provision for setting. The T input is the toggle input. At the PH2 time, the S input is sampled and if the T input is low, the Q output is sampled. Otherwise, the inverse of the Q output is sampled, thus forming a Q or −Q sample. At the PH1 time, if the S sample is high, then a high level is propagated to the Q output. Otherwise, the Q or −Q sample is propagated to the Q output. The result is that if the S input is low, then the Q output toggles at PH1 time only if the T input was high at PH2 time.

Circuit module LA409. FIGS. 19I(1)–19I(3), is an up counter with a set feature. The C terminal provides a carry output. This module is used as one stage of a binary up counter. If it is enabled, the output is toggled by the clock. A carry signal is presented to the next higher counter stage just before the output goes low. The carry signal is the enable signal of the next stage.

Asynchronously, if the T input is high, then the Q output is propagated to the C output. Otherwise, a low is propagated to the C output. At PH2 time, the S input is sampled and if the T input is low, the Q output is sampled. Otherwise, the inverse of the Q output is sampled, thus forming a Q or −Q sample. At PH1 time, if the S sampled is high, then a high level is propagated to the Q output. Otherwise, the Q or −Q sample is propagated to the Q output. The result is that if the S input is low, the Q output toggles at PH1 time only if the T input was high at PH2 time.

Circuit module LA410, shown in FIGS. 19J(1)–19J(2), is a data latch with an input clock interface. At the PH3 time the D input is sampled. At the PH2 time, the foregoing sample and the −Q output are sampled. At the PH1 time, if the L input is high and the H input is low, the inverse of the D sample is propagated to the −Q output. Otherwise, if the H input is high and the L input is low, then the −Q output is refreshed. If both the H and L inputs are low, a high level is propagated to the −Q output. Finally, if both H and L inputs are high, and either the D sample is high or the −Q sample is low, then a low level is propagated to the −Q output.

Circuit module LA411, shown in FIGS. 19K(1)–19K(3), is an up/down counter with a set feature. The U input provides up/down control. Asynchronously, if both the T and U inputs are high, then the Q output is propagated to the C output. However, if the T input is high and the U input is low, then the inverse of the Q output is propagated to the C output. If the T input is low, a low level is propagated to the C output. At PH2 time, the S input is sampled and, if the T input is low, the Q output is sampled; otherwise, the inverse of the Q output is sampled, thus forming a Q or −Q sample. At PH1 time, if the S sample is high, then a high level is propagated to the Q output; otherwise, the Q or −Q sample is propagated to the Q output. The result is that if the S input is low, the Q output toggles at PH1 time, but only if the T input was high at PH2 time.

Circuit module LA412, shown in FIGS. 19L(1)–19L(2), is a write pulse generator. At PHX time, if the S input is low, then internal node A is sampled, thus forming an A sample; unless the −S input is low, in which case the A sample is forced high; unless the R input is high, in which case the A sample is forced low. At PHY time, the A sample is propagated to internal node A. At the coincidence of PHX time and PH1 time, the S input and internal node A are sampled, and if either of these samples is high, a low level is propagated to the −Q output; otherwise, a high level is propagated to the −Q output.

Circuit module LA413, shown in FIGS. 19M(1)–19M(3), is a dynamic R/−S type flipflop. At PH2 time, the R input, the −S input and −Q output are sampled. At PH1 time, if the −S sample is low, a low level is propagated to the −Q output. Otherwise, if either the R sample or the −Q sample is high, a low level is propagated to the −Q output. If both the −Q sample and R sample are low, a low level is propagated to the −Q output. The inverse of the −Q output is asynchronously propagated to the Q output, if present.

Circuit module LA414, shown in FIGS. 19N(1)–19N(3), is a fifo controller used in the dot buffers. Each such circuit controls one column in the dot fifo. It generates the necessary signals so that the fifo column can accept dot data from the preceding column and shift it to the next column as required.

The Ri terminal is for a ripple input and, likewise, the Ro terminal, which is optional, is for a ripple output. The I terminal is for an initialization input. The −M terminal provides a match (i.e., compare) output.

Asynchronously, the Ro output, if present, is low, unless the Set input is high and either the input Ri or the −Q signal or both Ri and −Q are high. At PH2 time, the inverse of the Q output is sampled, thus forming a −Q sample, unless either or both the Ri and S inputs are high. If S is high, the −Q sample is forced low regardless of the state of Ri. If Ri alone is high, the −Q sample is forced high. Also at PH2 time, if −Q, Ri, and the −Q sample are all low, a high level is propagated to the L output; otherwise, a low level is propagated. The inverse of the L output is propagated to the H output. At PH1 time, the inverse of the −Q sample is propagated to the Q output, provided that the I input is low. If the I input is high, Q is forced low.

The LA415 circuit module, FIGS. 19O(1)–19O(2), is an up/down counter with load, reset and compare capability. The C terminal provides an optional carry/borrow output and the U terminal provides an optional up/-down control input.

Asynchronously, if the U input and Q output are both high, or the U input and Q output are both low, then the T input is propagated to the C output, if present. Also asynchronously, if the D input and the Q output are both high, or the D input and Q output are both low, then a low level is propagated to the −M output.

At PH2 time, the inverse of the Q output is sampled, unless the T and L inputs are both low, in which case the Q output is sampled, thus forming a Q or −Q sample. However, if the −L input is high, the Q or −Q sample is forced to the level of the D input. But if the R input is high, the Q or −Q sample is forced low. At PH1 time, the Q or −Q sample is propagated to the Q output.

The LA418 circuit module, shown in FIGS. 19Q(1)–19Q(3), is an up counter with load and reset features. Asynchronously, if the Q output is high, then the T input is propagated to the C output. At PH2 time, if the T input is high, then the Q output is sampled; or if the T and L inputs are both low, then the inverse of the Q output is sampled, thus forming a Q or −Q sample. But if the −L input is low, the Q or −Q sample is forced to the level of the D input; and if the R input is high, the Q or −Q sample is forced low. At PH1 time, the Q or −Q sample is propagated to the Q output.

The LA419 cell, shown in FIGS. 19Q(1)–19Q(3), is a timer controller. The S terminal provides a start input and the R terminal provides a run input.

$L = E$ and ($S$ and $Q$ or $-R$ and ($S$ or $Q$)).

$Q[n+1] = E[n]$ and ($S[n]$ and $Q[n]$ or $R[n]$ and ($S[n]$ or $Q[n]$))

Asynchronously, if the −R input is high and either the Q output or the S input is high, or the Q output and S input are both high, regardless of the −R input state, then the inverse of the −E (enable) input is propagated to the L output. Otherwise, a low level is propagated to the L output. At PH2 time, if the R input is high and either the Q output or the S input is high, or the Q output and S input are both high (regardless of R input state), then the inverse of the −E input is sampled, thus forming an E sample, otherwise the E sample is forced low. At PH1 time, the E sample is propagated to the Q output.

The LA421 circuit module, depicted in FIGS. 19R(1)–19R(2), is a positive edge detector. The X terminal receives data input and the −Y terminal provides a −edge output. The complimentary, Y, output is optional.

At PH2 time, the X input is sampled. At PH1 time, if the X sample is high, then the inverse of the X input is propagated to the −Y output. The inverse of the −Y output is propagated to the Y output, if present.

Circuit module LA423, shown in FIGS. 19S(1)–19S(3), is a dynamic R/S flip-flop. S1 and S2 are separate set inputs. At PH2 time, the Q output is sampled, unless the R input is high, in which case the Q output is forced low. But if the S1 or S2 input is high, the Q sample is forced high. At PH1 time, the Q sample is propagated to the Q output and the inverse of the Q sample is propagated to the −Q output.

Circuit cell LA424, FIGS. 19T(1)–19T(2), is a data latch controller. At PH2 time, the E input is propagated to the L output and the inverse of the E input is propagated to the H output.

Circuit module LA425, FIGS. 19U(1)–19U(2), is a dual input data latch bit. At PH2 time, the D1, D2, and S inputs (if present) and Q output are sampled. At PH1 time, if the L1 input is high, then the D1 sample is propagated to the Q output. If the L2 input is high, the D2 sample is propagated to the Q output. If the H input is high, then the Q output is refreshed. Otherwise, a low level is propagated to the Q output. If more than one of the three inputs L1, L2 and H are high, then any attempt to propagate a high to the Q output will override any attempt to propagate a low.

Circuit module LA428, shown in FIGS. 19V(1)–19V(2), is a controlled toggle with enable and reset. At PH2 time, the R1 and R2 inputs are sampled. If the E or T input is low, then the −Q output is sampled; otherwise, the inverse of the −Q output is sampled, forming a −Q or Q sample. At PH1 time, if the R1 sample or the R2 sample is high, then a high level is propagated to the −Q output; otherwise, the −Q or Q sample is propagated to the −Q output. The result is that if the R1 input and R2 input are both low, then the Q output toggles at PH1 time only if the T input and E input were both high at PH2 time.

Module LA434, as shown in FIGS. 19W(1)–19W(3), is a data latch controller with reset capability. At PH2 time, the E input is propagated to the L output and the inverse of the E input is propagated to the H output, unless the R input is high, in which case the H output is forced low.

Circuit cell LA450, shown in FIGS. 19X(1)–19X(2), is a four bit shifter. DA is a data input terminal; QA–QD are state outputs, SB and SC are set inputs, M is a maximum output, Z is a zero output and R is a reset input.

Circuit module LA451, FIGS. 19Y(1)–19Y(2), is a clock generator and divide-by-13 circuit. It generates the PH1–PH4 clock outputs from the PHX and PHY clock inputs. Zero and reset inputs are also provided.

Circuit module LA500, shown in FIGS. 19Z(1)–19Z(2), is a clock driver and clock failure detector. It receives a clock input C, provides the PHX and PHY clock outputs and a clock fail output, F.

Circuit module LA410, shown in FIGS. 19AA(1)–19AA(2) is a 1-of-4 selector. It has two address inputs, A0 and A1, and four selection outputs, S0–S3.

Circuit module LA600, shown in FIGS. 19AB(1)–19AB(2), is a static D-type flip-flop.

What is claimed as new and desired to be secured by Letters Patent of the United States is:

1. A control system for a dot matrix character printer for printing characters of selectable pitch, which includes a print head containing at least one column of dot printing means, means for moving the print head relative to a medium on which characters are to be printed, and transition generator means for providing print head motion signals responsive to movement of the print head, each basic unit of print head displacement defining a transition, the control system comprising:
   sequential controller means for providing signals to effectuate sequential operation of portions of the control system;
   the sequential controller means providing a request-to-print signal indicating the controller's readiness to begin supplying sequential signals for printing a string of columns;
   print head actuation control means for providing print head actuation signals for actuating the dot printing means;
   the print head actuation control means being adapted to enable printing responsive to the concurrence of the request-to-print signal and a print head motion signal indicating arrival of the print head at the location where the column of dot printing means is to be actuated for printing the first column of a string of columns, such location being one of a multiplicity of predetermined locations; and
   the sequential controller means being adapted to provide, and the print head actuation control means being further adapted to accept, a request-to-print signal independent of the position of the print head, whereby a request-to-print signal can be provided at any point to initiate printing at the next one of said predetermined locations reached by the moving print head.

2. The dot matrix character printer control system of claim 1 wherein said multiplicty of predetermined locations are determined by the most recent selection of character pitch.

3. The dot matrix character print control system of claim 1 wherein the location of said concurrence is a function of print head velocity, whereby compensation may be provided for movement of the print head during the time interval between actuation of the dot printing means and the printing of dots, permitting character printing at variable speeds of print head motion.

4. The dot matrix character printer control system of claim 3 wherein the print head actuation signals for the printing of a character are provided only during the interval in which the print head actuation control means enables printing.

5. The dot matrix character printer control system of any of claims 1, 3 or 4 wherein the print head may move in two directions, such as left-to-right and right-to-left, and further including:
   means for signalling in which of said two directions the print head is moving; and
   responsive to the means for signalling, the first column of a character being set to be the left-most column of the character for printing from left-to-right and being set to be the right-most column of the character for printing from left-to-right.

6. A dot matrix character printer for printing characters of a pitch selectable from among a plurality of available pitches, comprising:
   a print head;
   means for moving the print head;
   transition generator means for providing print head motion signals responsive to movement of the print head, each basic unit of print head displacement defining a transition;
   transition counter means for providing print head actuation signals responsive to the print head motion signals, the distance travelled by the print head between successive print head actuation signals defining an increment;
   increment counter means for providing intercharacter space signals responsive to print head actuation signals;
   said transition counter means and said increment counter means being variable radix counters;
   means for accepting signals representing the number of increments per character, the number of transitions per increment and the number of transitions per intercharacter space;

means for setting the radix of the increment counter means to the number of increments per character represented by said signals;

means for setting the radix of the transition counter means, such radix setting means being adapted to set the radix of the transition counter means to the number of transitions per intercharacter space during the intercharacter space and to the number of transitions per increment at all other times; and the increment counter means and the transition counter means being adapted to accept as their radices any values within their respective counting ranges.

7. The dot matrix character printer of claim 6 further including means for setting the radix of the increment counter means to the number of increments per character.

8. The dot matrix character printer of claim 6 further including means for storing a representation of the number of increments per character, the number of transitions per increments and the number of transitions per intercharacter space, responsive to the means for accepting, and the radix setting means further being adapted to selectively provide such stored representations of the number of transitions per increment and transitions per intercharacter space to the transition counter for setting its radix.

9. The dot matrix character printer of either claim 7 or claim 8 wherein the means for setting the radix of the transition counter and the means for setting the radix of the increment counter are adapted to permit the number of increments per character, the number of transitions per increment and the number of transitions per intercharacter space to vary from character to character, thereby permitting character pitch to be altered on a character by character basis.

10. The dot matrix character printer of claim 9 wherein the print head may move to two directions, such as left-to-right and right-to-left, and further including:

means for signalling in which of said two directions the print head is moving; and responsive to the means for signalling, the first column of a character being set to be the left-most column of the character for printing from left-to-right and being set to be the right-most column of the character for printing from left-to-left.

11. A dot matrix character printer for printing characters of a pitch selectable from among a plurality of available pitches, comprising:

a print head including dot printing means for printing dots to form characters;

means for moving the print head;

transition generator means for providing print head motion signals in response to movement of the print head, the basic unit of print head displacement resolved by the print head motion signals defining a transition;

transition counter means for counting transitions to provide print head actuation signals in response to the print head motion signals, the distance travelled by the print head between successive print head actuation signals defining an increment;

increment counter means for counting increments to provide intercharacter space signals;

said transition counter means and said increment counter means comprising variable radix counters;

means for accepting signals representing the number of transitions per increment and the number of transitions per intercharacter space;

means responsive to said intercharacter space signals for setting the radix of the transition counter means to the number of transition per intercharacter space during the intercharacter space and to the number of transitions per increment at all other times, to generate an intercharacter space having at least one transition independent of the number of transitions per increment;

means for setting the radix of the increment counter means to the number of increments per character;

the increment counter means and the transition counter means being adapted to accept at their radices any values within their respective counting ranges; and the provision of print head actuation signals being inhibited at selected times, so that characters are printed on an increment by increment basis, with selected pitch.

12. The dot matrix character printer of claim 11 further including:

transition counter control means for causing the transition count in the transition counter means to be incremented or decremented responsive to a transition add/subtract signal, whereby the print head actuation position may be controlled by the transition add/subtract signal to compensate for movement of the print head during the response time of the dot printing means in the print head and permitting accurate registration of printed characters while printing at variable rates.

13. The dot matrix character printer of either claim 11 or claim 12 further including:

net transition generator means associated with the transition counter for preventing the transition counter from responding to pairs of consecutive single transitions of opposite directions, such net transition generator means including:

(a) means for comparing a subject transition with the next preceding transition;

(b) inhibiting means responsive to the means for comparing, for preventing the transition counter from responding to the subject transition if it represents a reversal of direction from the next preceding transition;

(c) means responsive to the inhibiting means, for storing the direction of the subject transition and the fact that the transition counter was prevented from responding to it;

(d) second comparison means for comparing the next succeeding transition with the subject transition; and (e) means responsive to the second comparison means, for preventing the transition counter from responding to such next succeeding transition if the directions of the subject transition and the next succeeding transition are different and for providing both transitions to the transition counter if such directions are the same.

14. The dot matrix character printer of claim 11 wherein the print head includes two sets of dot printing means, the dot printing means of each set being actuable in response to print head actuation signals supplied to the dot printing means, the print head actuation signals provided by the transition counter means defining primary increment signals, and further including:

primary increment signal storage means responsive to the primary increment signals for producing secondary increment signals, each of said secondary increment signals being displaced with respect to a corresponding primary increment signal by an amount corresponding to the displacement between sets of dot printing means; and a first one of said sets of dots printing means being actuated by the primary increment signals and the other, second set of dot printing means being actuated by the secondary increment signals.

15. The dot matrix character printer of claim 14 wherein the print head may travel in two directions; and according to the direction of travel of the print head, one set of dot printing means is designated the leading set and the other set of dot printing means is designated the trailing set, the leading set being that set of dot printing means which leads in the direction of travel of the print head; and further including:

means for providing a direction signal representative of the direction of print head travel; and means responsive to the direction signal for providing the primary increment signal to the leading set of dot printing means and the secondary increment signal to the trailing set of dot printing means;

whereby characters may be printed with selectable and varying pitches and at variable print head velocities with a print head having two sets of dot printing means while the print head moves to each of said two directions.

16. The dot matrix character printer of claim 14 or claim 15 wherein the primary increment signal storage means for producing secondary increment signals comprises a shift register clocked by print head motion signals and receiving at its signal input the primary increment signals, such shift register producing as its output signal the secondary increment signals, the shift register length in bits being equal to the displacement in transitions between the sets of dot printing means, whereby each secondary increment signal is a displaced counterpart of a primary increment signal, the displacement between them corresponding to the displacement between sets of dot printing means.

17. The dot matrix character printer of any of claims 11, 14 or 15 wherein the dot printing means comprise solenoid driven print wires for impact printing, and the response time of the dot printing means includes the flight time of such print wires.

18. In a dot matrix character printer of the type having a print head positioned by a motor and encoder means for producing an encoder signal responsive to the incremental changes in print head position, said encoder signal alternating between two states and changing state when the print head moves a predetermined distance, the improvement comprising:

encoder signal filter means operable to remove relatively short duration noise signals from the encoder signal and to thereby provide a filtered encoder signal, the encoder filter means comprising means for sampling the encoder signal a plurality of times during the smallest increment of print head movement of interest and for changing the state of the filtered encoder signal only when the encoder signal is in the same state for a majority of such sample times.

19. A printer control circuit for use in a dot matrix character printer for printing characters of a pitch selectable from among a plurality of available pitches, said printer being of the type having a print head which includes dot printing means for generating dots, means for moving the print head, and encoder means for generating signals indicative of relative print head position, the signals generated by the encoded being referred to as transition signals and the smallest unit of print head displacement resolved by the transition signals being referred to as a transition, the control circuit comprising:

transition counter means for counting transitions to provide print head actuation signals in response to the transition signals, the distance travelled by th print head between successive print head actuation signals defining an increment;

increment counter means for counting increments to provide intercharacter space signals during the intercharacter space, which is defined as a buffer zone following a character and during which printing of another character is prohibited;

said transition counter means and said increment counter means comprising variable radix counters;

means for accepting a signal representing the number of increments per character, the number of transitions per increment and the number of transitions per intercharacter space;

means for initializing the transition counter means and the increment counter means;

means responsive to said intercharacter space signals for setting the radix of the transition counter means to the number of transitions per intercharacter space in the intercharacter space and to the number of transitions per increment at all other times, to generate an intercharacter space having at least one transition independent of the number of transitions per increment;

means for setting the radix of the increment counter means to the number of transitions per character;

the increment counter means and the transition counter means being adapted to accept as their radices any values within their respective counting ranges; and means for controlling the position where the printing of a character is to start, including means responsive to the state of a two-state character print signal for inhibiting the provision of print head actuation signals to the print head until such character print signal occurs in a first state, establishing a window during which printing may start, and simultaneously the generation of an intercharacter space is completed, as signified by the intercharacter space signal.

20. The dot matrix character printer control circuit of claim 19 further including:

transition counter control means for causing the transition count in the transition counter means to be incremented or decremented responsive to a transition add/subtract signal, whereby the print head actuation position may be controlled by the transition add/subtract signal to compensate for movement of the print head during the response time of the dot printing means in the print head and permitting accurate registration of printed characters while printing at varible rates.

21. The dot matrix character of either claim 19 or 20 further including:

net transition generator means associated with the transition counter for preventing the transition counter from responding to pairs of consecutive single transitions of opposite directions, such net transition generator means including:
(a) means for comparing a subject transition with the next preceding transition;
(b) inhibiting means responsive to the means for comparing, for preventing the transition counter from responding to the subject transition if it represents a reversal of direction from the next preceding transition;
(c) means responsive to the inhibiting means, for storing the direction of the subject transition and the fact that the transition counter was prevented from responding to it;
(d) second comparison means for comparing the next succeeding transition with the subject transition; and
(e) means responsive to the second comparison means, for preventing the transition counter from responding to such next succeeding transition if the directions of the subject transition and the next succeeding transition are different and for providing both transitions to the transition counter if such directions are the same.

22. The dot matrix character printer of claim 21 wherein the dot printing means comprise solenoid driven print wires and the response time of the dot printing means includes the flight time of such print wires.

* * * * *

UNITED STATES PATENT AND TRADEMARK OFFICE
CERTIFICATE OF CORRECTION

PATENT NO. : 4,326,813
DATED : April 27, 1982
INVENTOR(S) : Roy F. Lomicka, Jr. and Peter N. Heller It is certified that error appears in the above-identified patent and that said Letters Patent are hereby corrected as shown below:

Column 26, line 65, delete "implementations" and insert --implementation--.
Column 30, line 3, delete "to" and insert --is--.

Column 31, line 49, delete "out" and insert --only--.
Column 36, line 28, delete "FALL" and insert --FAIL--.
Column 38, line 38, delete "LA409." and insert --LA409,--.
Column 41, line 43, delete "LA410" and insert --LA510--.
Column 43, line 48, delete "left-to-left" and insert --right to left--.
Column 45, line 29, delete "to" and insert --in--.

Signed and Sealed this

Fourteenth Day of December 1982

[SEAL]

Attest:

GERALD J. MOSSINGHOFF

Attesting Officer   Commissioner of Patents and Trademarks